(12) United States Patent
Zilberman et al.

(10) Patent No.: US 10,694,313 B2
(45) Date of Patent: Jun. 23, 2020

(54) AUDIO COMMUNICATION SYSTEM AND METHOD

(71) Applicant: NOVETO SYSTEMS LTD., Kiryat Arye, Petach Tikva (IL)

(72) Inventors: Silviu Zilberman, Rishon Le-Zion (IL); Tomer Shani, Rishon Lezion (IL); Noam Babayoff, Rishon LeZion (IL)

(73) Assignee: NOVETO SYSTEMS LTD., Petach Tikva (IL)

( * ) Notice: Subject to any disclaimer, the term of this patent is extended or adjusted under 35 U.S.C. 154(b) by 0 days.

(21) Appl. No.: 16/475,956

(22) PCT Filed: Jan. 4, 2018

(86) PCT No.: PCT/IL2018/050013
§ 371 (c)(1),
(2) Date: Jul. 3, 2019

(87) PCT Pub. No.: WO2018/127915
PCT Pub. Date: Jul. 12, 2018

(65) Prior Publication Data
US 2019/0349703 A1     Nov. 14, 2019

Related U.S. Application Data

(60) Provisional application No. 62/531,601, filed on Jul. 12, 2017.

(30) Foreign Application Priority Data

Jan. 5, 2017    (WO) .................. PCT/IL2017/050017

(51) Int. Cl.
*H04R 5/02* (2006.01)
*H04S 7/00* (2006.01)
(Continued)

(52) U.S. Cl.
CPC ............. *H04S 7/303* (2013.01); *B60Q 9/00* (2013.01); *G10K 11/34* (2013.01); *H04R 5/02* (2013.01);
(Continued)

(58) Field of Classification Search
CPC ........................................................ H04R 5/02
See application file for complete search history.

(56) References Cited

U.S. PATENT DOCUMENTS

| 6,975,731 B1 | 12/2005 | Cohen et al. |
| 2004/0247140 A1 | 12/2004 | Norris et al. |

(Continued)

FOREIGN PATENT DOCUMENTS

| WO | 2014/076707 A2 | 5/2014 |
| WO | 2014/147625 A1 | 9/2014 |

*Primary Examiner* — Olisa Anwah
(74) *Attorney, Agent, or Firm* — Browdy and Neimark, PLLC

(57) ABSTRACT

A system and method for producing virtual binaural audio space are disclosed. In some implementations, the method includes providing staged audio data indicative of an audio data piece and of a relative position of a virtual source from which the audio data piece should be perceived by a designated listener; determining a position (e.g. location and orientation) of a head of user, which designated to be the listener; and transmitting one or more ultrasound fields towards a one or more selected audio center points located in the vicinity of the user's head for producing, via sound from ultrasound effect, left and right audible sound fields carrying the audio data piece to the left and right ears of the user respectively. According to some implementations, at least one parameter of the one or more ultrasound fields are controlled based on the relative position of the virtual source and the position of the user's head, such that a difference between the respective left and right audible sound fields is (Continued)

perceived by the user as an audible sound field propagating to the user from the relative position of the virtual source.

25 Claims, 17 Drawing Sheets

(51) Int. Cl.
    *B60Q 9/00*          (2006.01)
    *G10K 11/34*        (2006.01)
    *H04S 3/00*         (2006.01)

(52) U.S. Cl.
    CPC .......... *H04S 3/008* (2013.01); *H04R 2499/13* (2013.01); *H04S 2400/01* (2013.01); *H04S 2400/11* (2013.01); *H04S 2420/01* (2013.01)

(56) References Cited

U.S. PATENT DOCUMENTS

| | | | |
|---|---|---|---|
| 2007/0211574 A1* | 9/2007 | Croft, III | G10K 15/02 367/197 |
| 2012/0051556 A1 | 3/2012 | Pompei | |
| 2014/0307898 A1 | 10/2014 | Norris | |
| 2015/0139439 A1 | 5/2015 | Norris et al. | |
| 2015/0382129 A1 | 12/2015 | Florencio et al. | |

\* cited by examiner

11000

11100 - providing staged audio data

11200 - determining a head positioning of a user's head

11300 - producing audio modulated ultrasound channels adapted for producing, via sound from ultrasound effect, audible sound fields corresponding to the audio data pieces included in the staged audio data

11400 - controlling at least one parameter of the ultrasound channels such that a difference between the left and right audible sound fields captured by the left and right ears of a user is perceived by the user as an audible sound field carrying the audio data pieces from the respective positions of virtual sources associated with the audio data pieces

11500 - transmitting ultrasound field(s) towards audio center point(s) to generate left and right audible sound fields at respective ears of the user

11410A - providing data indicative of the head location

11420 - determining azimuth and elevation of the virtual source relative to the user's head

11430A - defining at least one audio center point located within a perimeter region surrounding the user's head

11440A - adjusting the location of the audio center point within the perimeter region to match the direction {ψ,Θ} of the virtual source relative to the head

FIG. 4B

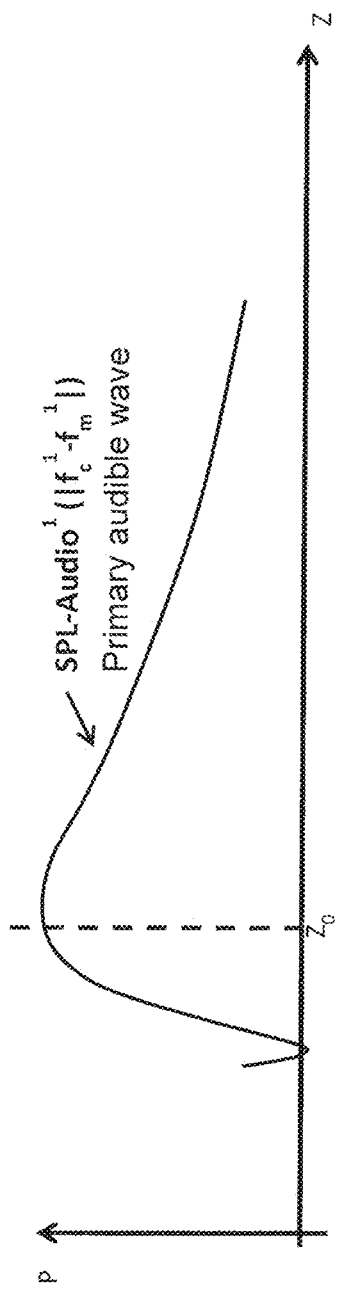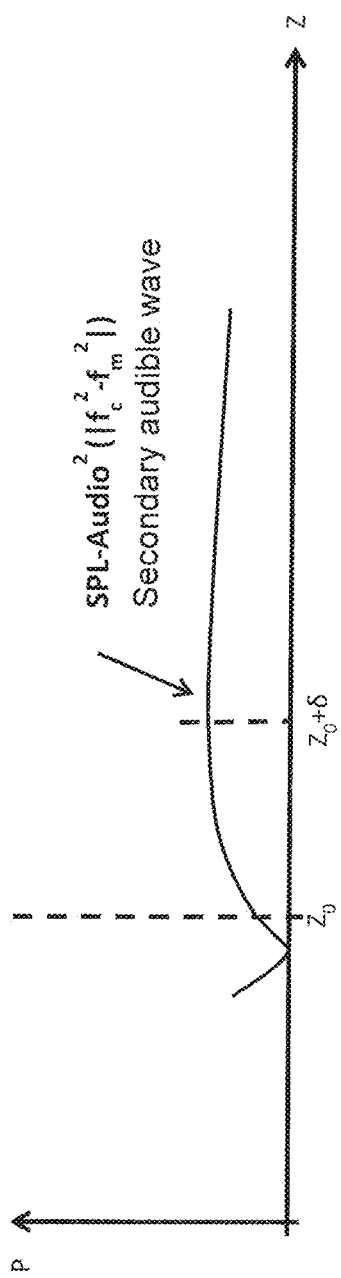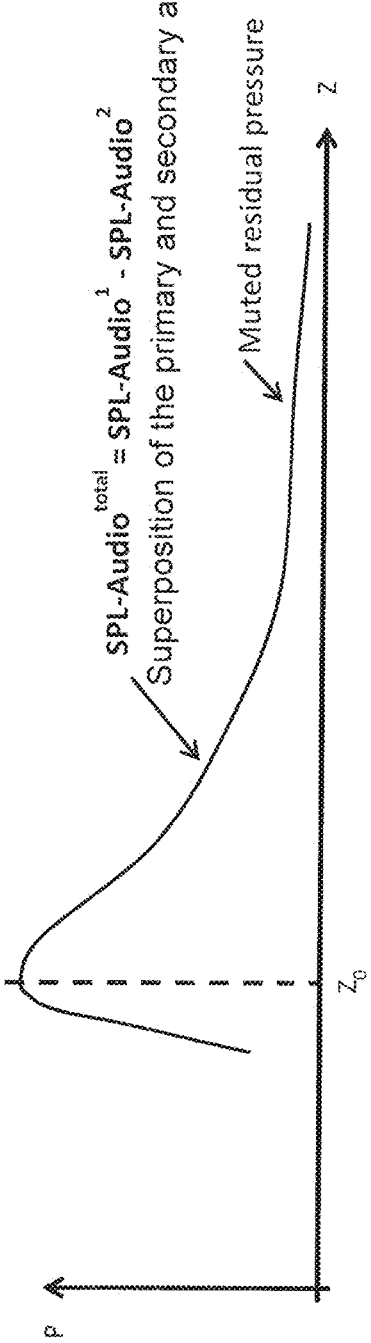

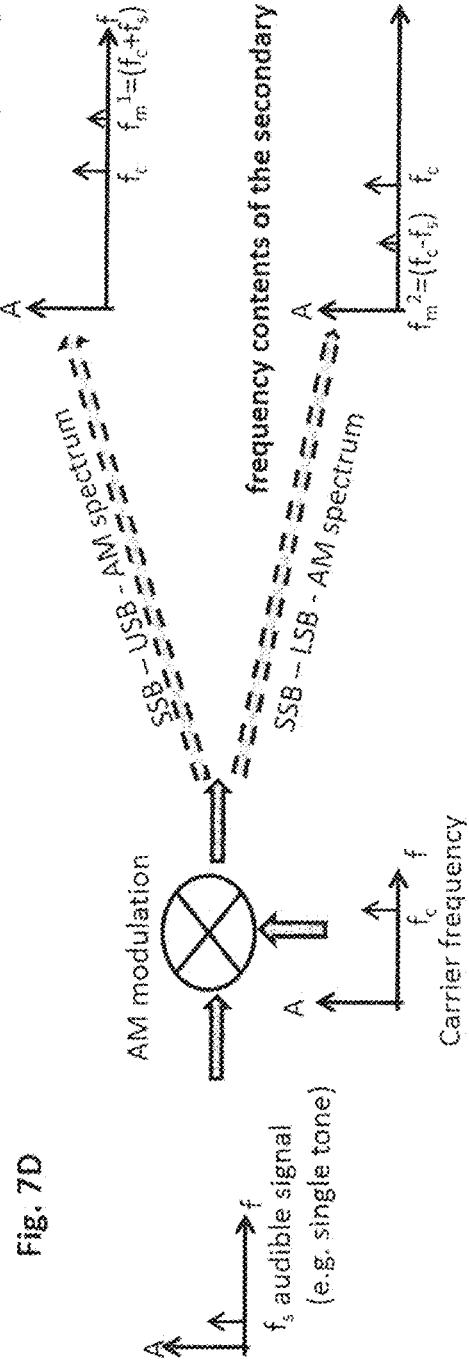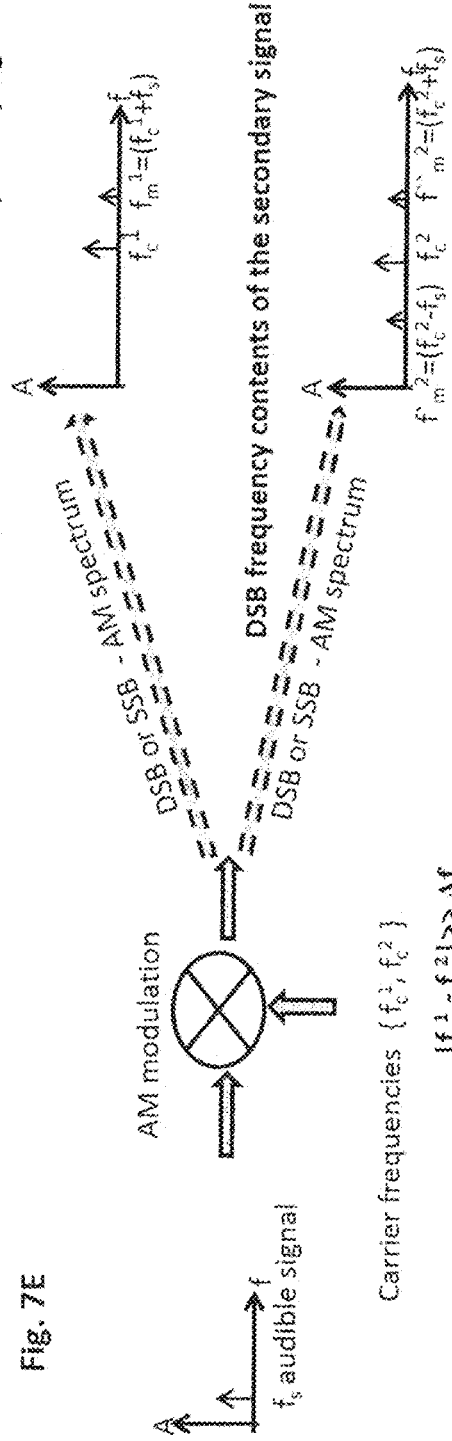
Fig. 7D
Fig. 7E

US 10,694,313 B2

AUDIO COMMUNICATION SYSTEM AND METHOD

TECHNOLOGICAL FIELD

The present invention is in the field of Human-Machine Interface, utilizing audio communication and is relevant to systems and method for providing hands-free audio communication and generation of 3D auditory space.

BACKGROUND

Audio communication takes a large portion of human interaction. We conduct telephone conversations, listen to music or sound associated with TV shows and receive alert such as alarm clock or finish of a microwave oven or dishwasher cycle.

The natural wave behavior of acoustic signals and the relatively long wavelength results with large spreading of the sound waves and allows people located in a common region to hear the sound and perceive the data carried thereon.

Various techniques are known for allowing a user to communication via sound while maintaining privacy of the communication. Between such techniques, best known examples include the telephone receiver and headphones or earphones, all providing relatively low amplitude acoustic signals directed at one or both of the user's ears.

Binaural hearing ability of humans and animals enables them to locate sounds in three dimensions within an auditory space (i.e. to resolve direction and possibly also distance and distinguish between sounds arriving from different locations in the auditory space).

This is possible because the brain infers the direction and possibly also the distance/location of the sound source by comparing the binaural sounds sensed by the left and right ears to identify sound modifications/differences (sound cues) between the two ears that are indicative of the direction/location of the sound source. Among the sound cues included are time difference of arrival, and intensity difference due to a difference in the acoustical paths of propagation of the sound from the source to the two ears respectively, as well as spectral (frequency spectrum) modifications caused by interaction of the sounds arriving from the sound source with the head/ears anatomy, in which the original source sound is modified before it enters the ear canal for processing by the auditory system. The brain processes these modifications of the sounds captured by the two different ears to infer the direction and possibly distance of the sound source(s).

An illusion of three dimensional (3D) auditory space, a so-called virtual auditory space (VAS), can be generated by headphones by utilizing appropriate filtering of sounds presented over the headphones. When utilizing headphones, a head-related transfer function (HRTF) is typically used for carrying out appropriate filtering of the sounds presented over each individual one of the headphones for creating the VAS.

Generally the head-related transfer function (HRTF) is a response function characterizing how an ear of a user receives sound from a point in space. As indicated above, properties of the user's head and ears (e.g. size and shape and/or mechanical properties thereof), transform the sound sensed by the eardrum and thereby affect how sounds from different points in space are perceived, and particularly introduce different spectral modifications to sounds arriving to the user from different directions relative to the user. Typically, some sound frequencies (e.g. from 2-5 kHz) are amplified, while others are attenuated, while the parameters of the of the amplification/attenuation generally depend on the direction and possibly also distance of the sound source. Also as indicated above, time delay and intensity difference are introduced to sounds arriving from the same source to the left and right ears of the user, due to a difference in the acoustical path from the source to the two ears respectively.

A virtual auditory space (VAS) sensation can be created, for example by headphones by utilizing a couple of HRTFs for two ears of the user respectively, to synthesize binaural sound that is perceived by the user as coming from a particular direction/location in space. The HRTFs introduce spectral modifications to the sounds depending on the relative directions from which they arrive to the respective ears. The HRTF presents the spectral modifications applied by the head to sound propagating from a certain direction in free air until the sound arrives and is sensed by the eardrum of a particular ear. Moreover, typically proper relative time delays and intensity differences are also respectively introduced to the sounds transmitted to the two ears whereby the magnitude of the time delay and intensity difference depends on the different trajectories/paths (direct or indirect) of sounds from the particular direction/location of a sound source towards the respective ears.

Recently, novel techniques for producing/generating private/confined sound fields from a remote speaker (i.e. ultrasound traducer(s)) have been developed by the assignee of the present patent application. According to these techniques, a private/confined audible sound field (also often referred to as a "sound bubble") can be generated at a certain location in space, while the sound generator transducer is remotely located.

More specifically, WO 2014/076707 discloses a system and method for generating a localized audible sound field at a designated spatial location. According to this technique, spatially confined audible sound carrying predetermined sound-data is produced locally at a designated spatial location at which it should be heard. Even more specifically, according to the disclosed technique in order to generate the locally confined audible sound carrying the desired sound-data, frequency content of at least two ultrasound beams are determined based on the sound data and the of at least two ultrasound beams are transmitted by an acoustic transducer system (e.g. transducer system including an arrangement of a plurality of ultrasound transducer elements) Then, the spatially confined audible sound is produced at the designated location by the at least two ultrasound beams. For example, the at least two ultrasound beams include at least one primary audio modulated ultrasound beam, whose frequency contents includes at least two ultrasonic frequency components selected to produce the audible sound after undergoing non-linear interaction in a non linear medium, and one or more additional ultrasound beams each including one or more ultrasonic frequency components. Location-data indicative of the designated location is utilized for determining at least two focal points for the at least two ultrasound beams respectively such that focusing the at least two ultrasound beams on the at least two focal points enables generation of a localized sound field with the audible sound in the vicinity of the designated spatial location.

WO 2014/147625, which is also assigned to the assignee of the present application, describes a transducer system including a panel having one or more piezo-electric enabled foils/sheets/layers and an arrangement of electric contacts coupled to the panel. The electric contacts are configured to define a plurality of transducers in the panel. Each transducer is associated with a respective region of the panel and with at least two electric contacts that are coupled to at least two zones at that respective region of the panel. The electric contacts are adapted to provide electric field in these at least two zones to cause different degrees of piezo-electric material deformation in these at least two zones and to thereby deform the respective region of the panel in a direction substantially perpendicular to a surface of the panel, and to thereby enable efficient conversion of electrical signals to mechanical vibrations (acoustic waves) and/or vice versa. The transducer of this invention may be configured and operable for producing at least two ultrasound beams usable for generating the spatially confined audible sound disclosed in WO 2014/076707 discussed above.

GENERAL DESCRIPTION

There is a need in the art for a novel system and method capable of managing private sound (i.e. providing sound to a selected user to be privately consumed/heard by the user) directed to selected one or more users located within certain space. The technique of the present invention utilizes one or more Three Dimensional Sensor Modules (TDSM) associated with one or more transducer units for determining location of a user and determining an appropriate sound trajectory for transmission private sound signals to the selected user, while eliminating, or at least significantly reducing interference of the sound signal with other users, which may be located in the same space.

In this connection it should be noted that the Three Dimensional Sensor Modules may or may not be configured for providing three dimensional sensing data when operating as a single module. More specifically, the technique of the present invention utilizes one or more sensor modules arranged in a region of interest and analyzes and processes sensing data received therefore to determine three dimensional data. To this end the TDSM units may include camera units (e.g. array/arrangement of several camera units) optionally associated/including diffused IR emitter, and additionally or alternatively may include other type(s) of sensing module(s) operable sensing three dimensional data indicative of a three dimensional arrangement/content of a sensing volume.

The technique of the present invention utilizes one or more transducer units (transducer arrays) suitable to be arranged in a space (e.g. apartment, house, office building, public spaces, vehicles interior, etc. and mounted on walls, ceilings or standing on shelves or other surfaces) and configured and operable for providing private (e.g. locally confined) audible sound (e.g. vocal communication) to one or more selected users.

For example, in some implementations of the present invention, one or more transducer units such as the transducer unit disclosed in WO 2014/147625, which is assigned to the assignee of the present application, are included/associated with the system of the present invention and are configured to generate directed, and generally focused, acoustic signals to thereby create audible sound at a selected point (confined region) in space within a selected distance from the transducer unit.

To this end, in some embodiments of the present invention the one or more transducer units are configured to selectively transmit acoustic signals at two or more ultra-sonic frequency ranges such that the ultra-sonic signals demodulate to form audible signal frequencies at a selected location. The emitted ultra-sonic signals are focused to the desired location where the interaction between the acoustic waves causes self-demodulation generating acoustic waves at audible frequencies. The recipient/target location and generated audible signal are determined in accordance with selected amplitudes, beam shape and frequencies of the output ultra-sonic signals as described in patent publication WO 2014/076707 assigned to the assigned of the present application and incorporated herein by reference in connection to the technique for generating private sound region.

The present technique utilizes such one or more transducer units in combination with one or more Three Dimensional Sensor Modules (TDSMs) and one or more microphones units, all connectable to one or more processing unit to provide additional management functionalities forming a hand-free audio communication system. More specifically, the technique of the invention is based on generating a three dimensional model of a selected space, and enable one or more users located in said space to initiate and respond to audio communication sessions privately and without the need to actively be in touch with a control panel or hand held device.

In this connection the present invention may provide various types of communication sessions including, but not limited to: local and/or remote communication with one or more other users, receiving notification from external systems/devices, providing vocal instructions/commands to one or more external devices, providing internal operational command to the system (e.g. privilege management, volume changes, adding user identity etc.), providing information and advertising from local or remote system (e.g. public space information directed to specific users for advertising, information about museum pieces, in ear translation etc.). The technique of the invention may also provide indication about user's reception of the transmitted data as described herein below. Such data may be further process to determine effectiveness of advertising, parental control etc.

To this end the present technique may be realized using centralized or decentralized (e.g. distributed) processing unit(s) (also referred herein as control unit or audio server system) connectable to one or more transducer units and one or more TDSMs and one or more microphone units or in the form of distributed management providing one or more audio communication system, each comprising a transducer unit, a TDSM unit, a microphone unit and certain processing capabilities, where different audio communication systems are configured to communicate between them to thereby provide audio communication to region greater than coverage area of a single transducer unit, or in disconnected regions (e.g. different rooms separated by walls).

The processor, being configured for centralized or distributed management, is configured to receive data (e.g. sensing data) about three dimensional configuration of the space in which the one or more TDSM are located. Based on at least initial received sensing data, the processor may be configured and operable to generate a three dimensional (3D) model of the space. The 3D model generally includes data about arrangement of stationary objects within the space to thereby determine one or more coverage zones associates with the one or more transducer units. Thus, when one or more of the TDSMs provides data indicative of user being located in certain location in the space, a communication session (remotely initiated or by the user) is conducted privately using a transducer unit selected to provide optimal coverage to the user's location.

Alternatively or additionally, the technique may utilize image processing techniques for locating and identifying user existence and location within the region of interest based on input data from the one or more TDSM unit and data about relative arrangement of coverage zones of the transducer array units and sensing volumes of the TDSM units. It should be understood that generally an initial calibration may be performed to the system. Such initial calibration typically comprises providing data about number, mounting locations and respective coverage zones of the different transducer array units, TDSM units and microphone units, as well as any other connected elements such as speakers when used. Such calibration may be done automatically in the form of generating of 3D model as described above, or manually by providing data about arrangement of the region of interest and mounting location of the transducer array units, TDSM units and microphone units.

It should be noted that the one or more TDSMs may comprise one or more camera units, three dimensional camera units or any other suitable imaging system. Additionally, the one or more transducer units may also be configured to periodic scanning of the coverage zone with an ultra-sonic beam and determine mapping of the coverage region based on detected reflection. Thus, the one or more transducer units may be operated as sonar to provide additional mapping data. Such sonar based mapping data may include data about reflective properties of surfaces as well as the spatial arrangement thereof.

Additionally, the one or more microphone units may be configured as microphone array units and operable for providing input acoustic audible data collected from a respective collection region (e.g. sensing volume). The one or more microphone units may include an array of microphone elements enabling collection of audible data and providing data indicative of direction from which collected acoustic signals have been originated. The collected acoustic directional data may be determined based on phase or time variations between signal portions collected by different microphone elements of the array. Alternatively, the microphone unit may comprise one or more directional microphone elements configured for collecting acoustic signals from different directions within the sensing zone. In this configuration, direction to the origin of a detected signal can be determined based on variation in collected amplitudes as well as time delay and/or phase variations.

Generally, an audio communication session may be unilateral or bilateral. More specifically, a unilateral communication session may include an audible notification sent to a user such as notification about new email, notification that a washing machine finished a cycle etc. A bilateral audio communication session of the user generally includes an audio conversations during which audible data is both transmitted to the user and received from the user. Such communication sessions may include a telephone conversation with a third part, user initiated commands requesting the system to perform one or more tasks etc.

Additionally, the system may be employed in a plurality of disconnected remote regions of interest providing private communication between two or more remote spaces. To this end, as described herein below the region of interest may include one or more connected space and additional one or more disconnected/remote location enabling private and hand free communication between users regardless of physical distance between them, other than relating to possible time delay associated with transmission of data between the remote locations.

The technique of the present invention may also provide indication associated with unilateral communication session and about success thereof. More specifically, the present technique utilize sensory data received from one or more of the TDSMs indicating movement and/or reaction of the user at time period of receiving input notification and determine to certain probability if the user actually noticed the notification or not. Such response may be associated with facial of body movement, voice or any other response that may be detected using the input devices associated with the system.

As indicated above, the 3D model of the space where the system is used may include one or more non-overlapping or partially overlapping coverage regions associated with one or more transducer units. Further, the present technique allows for a user to maintain a communication session while moving about between regions. To this end, the system is configured to receive sensing data from the one or more TDSMs and for processing the sensing data to provide periodic indication about the location of one or more selected users, e.g. a user currently engaged in communication session.

Further, to provide private sound the one or more transducer unit are preferably configured and operated to generate audible sound within a relatively small focus point. This forms a relatively small region where the generated acoustic waves are audible, i.e. audible frequency and sufficient sound pressure level (SPL). The bright zone, or audible region, may for example be of about 30 cm radius, while outside of this zone the acoustic signals are typically sufficiently low to prevent comprehensive hearing by others. Therefore the audio communication system may be also configured for processing input sensing data to locate a selected user and identify location and orientation of the user's head and ears to determine location for generating audible (private) sound region. Based on the 3D model of the space where the system is employed, the processing may include determining a line of sight between a selected transducer unit and at least one of the user's ears. In case no direct line of sight is determined, a different transducer unit may be used. Alternatively, the 3D model of the space may be used to determine a line of sight utilizing sound reflection from one or more reflecting surfaces such as walls. When the one or more transducer units are used as sonar-like mapping device, data about acoustic reflection of the surfaces may be used to determine optimal indirect line of sight. Additionally, to provide effective acoustic performance, the present technique may utilize amplitude adjustment when transmitting acoustic signals along an indirect line of sight to a user.

In this regards, it should be also noted that in cases/embodiments where the system is configured to engage with both ears of a user separately, amplitude adjustment and balancing is also carried out for balancing the volume between the two ears (specifically in cases where the ears are at different distances to the transducer units serving them).

In this connection, the above described technique and system enables providing audio communication within a region of interest (ROI), by employing a plurality of transducer array units and corresponding TDSM units and microphone units. The technique enables audio private communication to one or more users, for communicating between them or with external links, such that only a recipient user of certain signal receives an audible and comprehensible acoustic signal, while other users, e.g. located at distance as low as 50 cm from the recipient, will not be able to comprehensively receive the signal.

Also, the technique of the present invention provides for determining location of a recipient for direct and accurate transmission of the focused acoustic signal thereto. The technique also provides for periodically locating selected users, e.g. user marked as in ongoing communication session, to thereby allow the system to track the user and maintain the communication session even when the users moves in space. To this end the technique provides for continuously selecting preferred transducer array units for signal transmission to the user in accordance with user location and orientation. The system and technique thereby enable a user to move between different partially connected spaces within the ROI (e.g. rooms) while maintaining an ongoing communication session.

Another aspect of some embodiments of the present invention provides systems and methods for providing to one or more users private binaural 3D audio from a remote. In this regards the terms private, confined and localized audio are used herein to designate audible sound fields which are produced in the vicinity of the user's ears/head and are hearable to the user but substantially not hearable (or at least not comprehendible) to other persons in the vicinity of the user. For example the private/confined audible sound field can be provided clear and loud to a vehicle's driver while other persons in its vicinity (e.g. passengers in the vehicle) do not hear or barely hear the audio heard by the driver. The audible sound is provided from a remote in the sense that the transducers systems/modules that are used for producing the audible sound need not be located near the user's ears or head by can be distanced therefrom by few decimeters to several meters of even more. None the less, the audible sound is provided privately to the user, as indicated above. To this end, ultrasound transducer(s) are used to generate ultrasound fields (waveforms) producing the audible sound near the user's head/ears based on the audible sound from ultrasound effect.

In this regards it should be noted that in some aspects the present invention is aimed at providing the user with the binaural 3D audio. The term binaural is used herein to designate that the audible sound provided to the different (left and right) ears of the users may be generally different and whereby the difference between the audible sound provide to the different ears of the user is controlled/adjusted by the system, typically by at least the location of the user's head. More over the phrased 3D binaural audio or binaural 3D audio are used herein interchangeably to designate that the differences between the audible sound fields provided to the left and right ears of the user are controlled/adjusted such that they emulate audible sound field(s) of audio data pieces arriving to the user from specific locations of one or more virtual sound sources. This enables the user to estimate the location/direction of the virtual sources of the audio data pieces based on the audible sound that is provided to him in private.

Thus according to one broad aspect of the present invention, there is provided a system for use in audio communication. The system includes:
  one or more (e.g. a plurality of) transducer units to be located in a plurality of sites for covering respective coverage zones in said sites. The sites may be different spaces and/or regions of interest (ROIs) to which audio services should be provided by the system. The at transducer units (e.g. at least some of them) are capable of emitting ultra-sonic signals in one or more general frequencies for forming local audible sound field at selected spatial position within their respective coverage zones; the transducer unit may include an array of transducer elements.
  one or more (e.g. a plurality of) a three dimensional sensor modules (TDSMs; also referred to herein as three dimensional input device, e.g. 3D camera, radar, sonar, LIDAR) configured to provide data about three dimensional arrangement of the surrounding within a field of view of the input device. The TDSMs are adapted to be located in the sites (spaces) to be covered by the system, and each three dimensional sensor module is configured and operable to provide sensory data about three dimensional arrangement of elements in a respective sensing volume within the sites.
  a mapping module providing map data indicative of a relation between the sensing volumes and the coverage zones of said TDSMs and transducer units respectively.
  a user detection module connectable to said one or more three dimensional sensor modules for receiving said sensory data therefrom, and configured and operable to process said sensory data to determine spatial location of at least one user within the sensing volumes of the TDSMs. and
  an output sound generator (also referred to herein as sound processing utility) connectable to said one or more transducer units and adapted to receive sound data indicative of sound to be transmitted to said at least one user, and configured and operable for operating at least one selected transducer unit for generating localized sound field carrying said sound data in close vicinity to said at least one user, wherein said output sound generator utilizes the map data to determine said at least one selected transducer unit in accordance with said data about spatial location of the at least one user such that the respective coverage zone of said selected transducer unit includes said location of said at least one user.

In some embodiments the system includes an audio session manager (e.g. including input and output communication utilities) which is configured to enable communication with remote parties via one or more communication networks; and at least one sound processing utility. The at least one processor utility comprises: region of interest (ROI) mapping module configured and operable to receive three-dimensional input of the field of view from the 3D input device and generate a 3D model of the ROI; user detection module configured and operable to receive three-dimensional input of the field of view from the 3D input device and determine existence and location of one or more people within the region of interest. The processor unit is configured for generating voice data and for operating the at least one transducer unit to transmitting suitable signal for generating a local sound field at close vicinity to a selected user's ear thereby enabling private communication with the user.

The system may further comprise a received sound analyzer connectable to one or more microphone units configured for receiving audio input from the ROI, and adapted to determine data indicative of location of origin of said audio signal within the ROI.

Additionally or alternatively, the system may comprise, or be connectable to one or more speakers for providing audio output that may be heard publicly by a plurality of users. Further, the system may also comprise one or more display units configured and operable for providing display of one or more images or video to users.

It should be noted that the system may utilize data about user location for selection of one or more transducer units to provide local private audio data to the user. Similarly, when speakers and/or display units are used, the system may utilize data about location of one or more selected users to determine one or more selected speaker and/or display units for providing corresponding data to the users.

According to some embodiments the processing unit may further comprise a gesture detection module configured and operable to receive input audio signals and location thereof from the audio-input location module and to determine if said input audio signal includes one or more keywords requesting initiation of a process or communication session.

The processing unit may further comprise an orientation detection module. The orientation detection module may be configured and operable for receiving data about said 3D model of the region of interest and data about location of at least one user, and for determining orientation of the at least one user's ears with respect to the system thereby generating an indication whether at least one of the at least one user's ears being within line of sight with the at least one transducer unit.

According to some embodiments, the processor unit may further comprise a transducer selector module configured and operable for receiving data indicating whether at least one of the at least one user's head or ears being within line of sight with the at least one transducer unit and for determining optimized trajectory for sound transmission to the user's ears. The optimized trajectory may utilize at least one of: directing the local sound region at a point being within line of sight of the at least one transducer unit while being within a predetermined range from the hidden user's ear; and receiving and processing data about 3D model of the region of interest to determine a sound trajectory comprising one or more reflection from one or more walls within the region of interest towards the hidden user's ear.

According to some embodiments, the processing unit may be configured and operable for communicating with one or more communication systems arranged to form a continuous field of view to thereby provide continuous audio communication with a user while allowing the user to move within a predetermined space being larger than a field of view of the system. Further, the communication system may be employed within one or more disconnected regions providing seamless audio communication with one or more remote locations.

According to some embodiments, the processing unit may be configured and operable for providing one or more of the following communication schemes:
  managing and conducting a remote audio conversation, the processing unit is configured and operable for communication with a remote audio source through the communication network to thereby enable bilateral communication (e.g. telephone conversation);
  providing vocal indication in response to one or more input alerts received from one or more associates systems through said communication network;
  responding to one or more vocal commands from a user generate corresponding commands and transmit said corresponding commands to selected one or more associates systems through the communication network, thereby enabling vocal control for performing one or more tasks by one or more associated systems.

According to yet some embodiments, the processing unit may further comprise a gesture detection module configured and operable for receiving data about user location from the user detection module and identify whether one or more predetermined gestures are performed by the user, upon detecting said one or more predetermined gestures, the gesture detection module generates and transmits a corresponding command to the processing unit for performing one or more corresponding actions.

The system may also comprise a face recognition module configured and operable for receiving input data from the a three dimensional input device and for locating and identifying one or more users within the ROI, the system also comprises a permission selector module, the permission selector module comprises a database of identified users and list of actions said users have permission to use, the permission selector module received data about user's identity and data about a requested action by said user, and provides the processing unit data indicative to whether said user has permission for performing said requested action.

According to one other broad aspect of the present invention, there is provided a system for use in audio communication. The system comprising: one or more transducer units to be located in a plurality of physical locations for covering respective coverage zones, wherein said transducer units are capable of emitting ultra-sonic signals in one or more frequencies for forming local audible sound field at selected spatial position within its respective coverage zone; one or more Three Dimensional Sensor Modules (TDSM) (e.g. 3D camera, radar, sonar, LIDAR) to be located in said sites, wherein each three dimensional sensor module is configured and operable to provide sensory data about three dimensional arrangement of elements in a respective sensing volume within said sites; a mapping module providing map data indicative of a relation between the sensing volumes and the coverage zones; a user detection module connectable to said one or more three dimensional sensor modules for receiving said sensory data therefrom, and configured and operable to process said sensory data to determine spatial location of at least one user's ear within the sensing volumes of the three dimensional sensor modules; and a sound processor utility connectable to said one or more transducer units and adapted to receive sound data indicative of sound to be transmitted to said at least one user's ear, and configured and operable for operating at least one selected transducer unit for generating localized sound field carrying said sound data in close vicinity to said at least one user's ear, wherein said output sound generator utilizes the map data to determine said at least one selected transducer unit in accordance with said data about spatial location of the at least one user's ear received from the corresponding user detection module such that the respective coverage zone of said selected transducer unit includes said location of said at least one user's ear.

The one or more transducer units are preferably capable of emitting ultra-sonic signals in one or more frequencies for forming local focused demodulated audible sound field at selected spatial position within its respective coverage zone.

The system may generally comprise a received sound analyzer configured to process input audio signals received from said sites. Additionally, the system may comprise and audio-input location module adapted for processing said input audio signals to determine data indicative of location of origin of said audio signal within said sites. The received sound analyzer may be connectable to one or more microphone units operable for receiving audio input from the sites.

According to some embodiments the system may comprise, or be connectable to one or more speakers and/or one or more display units for providing public audio data and/or display data to users. Generally the system may utilize data about location of one or more users for selecting speakers and/or display units suitable for providing desired output data in accordance with user location.

According to some embodiments, the user detection module may further comprise a gesture detection module configured and operable to process input data comprising at least one of input data from said one or more TDSM and said input audio signal, to determine if said input data includes one or more triggers associated with one or more operations of the system, said sound processor utility being configured determine location of origin of the input data as initial location of the user to be associated with said operation of the system. Said one or more commands may comprise a request for initiation of an audio communication session. The input data may comprise at least one of audio input data received by the received sound analyzer and movement pattern input data received by the TDSM. More specifically, the gesture detection module may be configured for detecting vocal and/or movement gestures.

According to some embodiments, the user detection module may comprise an orientation detection module adapted to process said sensory data to determine a head location and orientation of said user, and thereby estimating said location of the at least one user's ear.

According to some embodiments, the user detection module includes a face recognition module adapted to process the sensory data to determine location of at least one ear of the user. The output sound generator is configured and operable for determining an acoustic field propagation path from at least one selected transducer unit for generating the localized sound field for the user such that the localized sound field includes a confined sound bubble in close vicinity to the at least one ear of the user.

For example the face recognition module may be configured and operable to determine said location of the at least one ear of the user based on an anthropometric model of the user's head. In some cases the face recognition module is configured and operable to at least one of constructing and updating said anthropometric model of the user's head based on said sensory data received from the TDSM.

In some embodiments, the face recognition module is adapted to process the sensory data to determine locations of two ears of the user, and wherein said output sound generator is configured and operable for determining two acoustic field propagation paths from said at least one selected transducer unit towards said two ears of the user respectively, and generating said localized sound field such that it includes two confined sound bubbles located in close vicinity to said two ears of the user respectively, thereby providing private binaural (e.g. stereophonic) audible sound to said user.

In some embodiments, the output sound generator is configured and operable for determining respective relative attenuations of acoustic field propagation along the two propagation paths to the two ears of the user, and equalizing volumes of the respective acoustic fields directed to the two ears of the user based on said relative attenuations, to thereby provide balanced binaural audible sound to said user.

According to some embodiments the user detection module is further configured and operable to process the received sensory data and to differentiate between identities of one or more users in accordance with the received sensory data, the user detection module thereby provides data indicative of spatial location and identity of one or more users within the one or more sensing volumes of the three dimensional sensor modules.

The system may also comprise a face recognition module. The face recognition module is typically adapted for receiving data about the user location from the user detection module, and for receiving at least a portion of the sensory data associated with said user location from the TDSMs, and is configured and operable for applying face recognition to determine data indicative of an identity of said user. In some configurations, the system may further comprise a privileges module. The privileges module may comprise or utilize a database of identified users and list of actions said users have permission to use. Generally, the privileges module receives said data indicative of the user's identity from said face recognition module and data about a requested action by said user, and provides the processing unit data indicative to whether said user has permission for performing said requested action.

According to some embodiments, the sound processor utility may be adapted to apply line of sight processing to said map data to determine acoustical trajectories between said transducer units respectively and said location of the user's ear, and process the acoustical trajectories to determine at least one transducer unit having an optimal trajectory for sound transmission to the user's ear, and set said at least one transducer unit as the selected transducer unit. Such optimized trajectory may be determined such that it satisfies at least one of the following: it passes along a clear line of sight between said selected transducer unit and the user's ear while not exceeding a certain first predetermined distance from the user's ear; it passes along a first line of sight from said transducer unit and an acoustic reflective element in said sites and from said acoustic reflective element to said user's ear while not exceeding a second predetermined distance.

According to some embodiments, sound processor utility utilizes two or more transducer units to achieve an optimized trajectory, such that at least one transducer unit has a clear line of sight to one of the user's ears and the least one other transducer unit has a clear line of sight to the second user's ear.

According to some embodiments, the sound processor utility may be adapted to apply said line of site processing to said map data to determine at least one transducer unit for which exist a clear line of site to said location of the user's ear within the coverage zone of the at least one transducer unit, and set said at least one transducer unit as the selected transducer unit and setting said trajectory along said line of site.

In case the lines of site between said transducer units and said location of the user's ear are not clear, said line of site processing may include processing the sensory data to identify an acoustic reflecting element in the vicinity of said user's; determining said selected transducer unit such that said trajectory from the selected transducer unit passes along a line of site from the selected transducer unit and said acoustic reflecting element, and therefrom along a line of site to the user's ear.

The output sound generator is configured and operable to monitor location of the user's ear to track changes in said location, and wherein upon detecting a change in said location, carrying out said line of site processing to update said selected transducer unit, to thereby provide continuous audio communication with a user while allowing the user to move within said sites. The sound processor utility may be adapted to process said sensory data to determine a distance along said propagation path between the selected transducer unit and said user's ear and adjust an intensity of said localized sound field generated by the selected transducer unit in accordance with said distance. In case an acoustic reflecting element exists in the trajectory between the selected transducer unit and the user's ear, said processing utility may be adapted to adjust said intensity to compensate for an estimated acoustic absorbance properties of said acoustic reflecting element. Further, in case an acoustic reflecting element exists in said propagation path, said processing utility may be adapted to equalized spectral content intensities of said ultrasonic signals in accordance with said estimated acoustic absorbance properties indicative of spectral acoustic absorbance profile of said acoustic reflecting element.

Generally, the sound processor utility may be adapted to process the input sensory data to determine a type (e.g. table, window, wall etc.) of said acoustic reflecting element and estimate said acoustic absorbance properties based on said type.

The sound processor utility may also be configured for determining a type of one or more acoustic reflective surfaces in accordance with data about surface types stored in a corresponding storage utility and accessible to said sound processor utility.

According to some embodiments, the system may comprise a communication system connectable to said output sound generator and configured and operable for operating said output sound generator to provide communication services to said user. The system may be configured and operable to provide one or more of the following communication schemes:

managing and conducting a remote audio conversation, the communication system is configured and operable for communication with a remote audio source through the communication network to thereby enable bilateral communication (e.g. telephone conversation);

managing and conducting seamless local private audio communication between two or more users within the region of interest;

processing input audio data and generating corresponding output audio data to one or more selected users;

providing vocal indication in response to one or more input alerts received from one or more associates systems through said communication network; and responding to one or more vocal commands from a user generate corresponding commands and transmit said corresponding commands to selected one or more associates systems through the communication network, thereby enabling vocal control for performing one or more tasks by one or more associated systems.

The system 1000 may comprises a gesture detection module configured and operable for receiving data about user location from the user detection module, and connectable to said three dimensional sensor modules for receiving therefrom at least a portion of the sensory data associated with said user location; said gesture detection is adapted to apply gesture recognition processing to said at least a portion of the sensory data to identify whether one or more predetermined gestures are performed by the user, upon detecting said one or more predetermined gestures, the gesture detection module generates and transmits a corresponding commands for operating said communication system for performing one or more corresponding actions.

According to some embodiments, the system may further comprise a user response detection module adapted for receiving a triggering signal from said communication system indicative of a transmission of audible content of interest to said user's ear; and wherein said user response detection module is adapted for receiving data about the user location from the user detection module, and for receiving at least a portion of the sensory data associated with said user location from the three dimensional sensor modules, and is configured and operable for processing said at least portion of the sensory data, in response to said triggering signal, to determine response data indicative of a response of said user to said audible content of interest. The response data may be recorded in a storage utility of said communication system or uploaded to a server system.

The system of claim may be associated with an analytics server configured and operable to receive said response data from the system in association with said content of interest and process said statistically response data provided from a plurality of users in response to said content of interest to determine parameters of user's reactions to said content of interest.

Generally, said content of interest may include commercial advertisements and wherein said communication system is associated with an advertisement server providing said content of interest.

According to one other broad aspect of the present invention, there is provided a vocal network system comprising a server unit and one or more local audio communication systems as described above arranged in a space for covering one or more ROI's in a partially overlapping manner; the server system being connected to the one or more local audio communication systems through a communication network and is configured and operable to be responsive to user generated input messages from any of the local audio communication systems, and to selectively locate a desired user within said one or more ROI's and selectively transmit vocal communication signals to said desired user in response to one or more predetermined conditions.

According to yet one other broad aspect of the invention, there is provided a server system for use in managing personal vocal communication network; the server system comprising: an audio session manager configured for connecting to a communication network and to one or more local audio systems; a mapping module configured and operable for receiving data about 3D models from the one or more local audio systems and generating a combined 3D map of the combined region of interest (ROI) covered by said one or more local audio systems; a user location module configured and operable for receiving data about location of one or more users from the one or more local audio systems and for determining location of a desired user in the combined ROI and corresponding local audio system having suitable line of sight with the user. The server system is configured and operable to be responsive to data indicative of one or more messages to be transmitted to a selected user. In response to such data, the server system receives, from the user location module, data about location of the user and about suitable local audio system for communicating with said user and transmitting data about said one or more messages to the corresponding local audio system for providing vocal indication to the user.

The user location module may be configured to periodically locate the selected user and the corresponding local audio system, and to be responsive to variation in location or orientation of the user to thereby change association with a local audio system to provide seamless and continuous vocal communication with the user.

According to yet another broad aspect of the invention, there is provided a method for use in audio communication, the method comprising: providing data about one or more signals to be transmitted to a selected user, providing sensing data associated with a region of interest, processing said sensing data for determining existence and location of the selected user within the region of interest, selecting one or more suitable transducer units located within the region of interest and operating the selected one or more transducer elements for transmitting acoustic signals to determined location of the user to thereby provide local audible region carrying said one or more signals to said selected user.

According to yet another broad aspect of the invention, there is provided a method comprising: transmitting a predetermined sound signal to a user and collecting sensory data indicative of user response to said predetermined sound signal thereby generating data indicative of said user's reaction to said predetermined sound signal, wherein said transmitting comprises generating ultra-sonic field in two or more predetermined frequency ranges configured to interact at a distance determined in accordance with physical location of said user, to thereby form a local sound field providing said predetermined sound signal.

According to another broad aspect of the present invention there is provided a system for use in audio communication. The system includes:
- at least one transducer unit adapted for forming local audible sound field at selected spatial position within at least one respective coverage zone of at least one site;
- at least one Three Dimensional Sensor Module (TDSM) configured and operable to provide sensory data about three dimensional arrangement of elements in a respective sensing volume within the at least one site;
- a user detection module connectable to the one or more three dimensional sensor modules for receiving the sensory data therefrom, and configured and operable to process the sensory data to determine spatial location of at least one user within the at least one site;
- a face recognition module adapted to process the sensory data to determine location of at least one ear of the user; and
- an output sound generator connectable to the one or more transducer units and adapted to receive sound data indicative of sound to be transmitted to the at least one user, and configured and operable for determining an acoustic field propagation path from said at least one transducer unit for generating a localized sound field including a confined sound bubble in close vicinity to the at least one ear of the user, and operating the at least one transducer unit for generating the localized sound field.

According to yet another broad aspect of the present invention there is provided a method for use in audio communication, the method includes: providing data about one or more signals to be transmitted to a selected user; providing sensing data associated with a region of interest; processing the sensing data to determine existence of the selected user within the region of interest, and to determine a location of at least one ear of the user in the region of interest; and selecting and operating one or more suitable transducer units located within the region of interest for transmitting acoustic signals to the determined location of the at least one ear of the user.

In some implementations the location of the at least one ear of the user is determined based on an anthropometric model of the user's head. In some cases the anthropometric model is least one of constructed and updated based on the sensing data.

In some embodiments the method/system are configured and operable for include: processing the sensing data to determine locations of two ears of the user; determining two acoustic field propagation paths from the selected one or more transducer units towards the two ears of the user respectively; and operating the selected transducer unit(s) for transmitting acoustic signals to the determined locations of the two ears of the user along the two respective acoustic field propagation paths. In some cases the method further includes determining respective relative attenuations of acoustic field propagation along the two propagation paths to the two ears of the user, and equalizing volumes of the respective acoustic fields directed to the two ears of the user based on the relative attenuations, to thereby provide balanced binaural audible sound to the user.

According to another board aspect of the present invention there is provided a method for producing virtual binaural audio space, the method comprising:

(a) providing staged audio data indicative of at least one audio data piece and a position of a virtual source of said audio data piece relative to a listener;

(b) determining a head positioning data indicative of location and orientation of a user's head, whereby the user is designated to be said listener of the audio data;

(c) transmitting one or more ultrasound fields towards a one or more selected audio center points located in the vicinity of the user's head for producing, via sound from ultrasound effect, left and right audible sound fields with said at least one audio data piece at respective left and right ears of said user, and, (d) based on said position of the virtual source and said head positioning data, controlling at least one parameter of said one or more ultrasound fields such that a difference between said respective left and right audible sound fields is perceived by the user as an audible sound field propagating to said user from said position of the virtual source and carrying said at least one audio data piece.

In some embodiments, the determining of the head positioning data comprises monitoring the user's head position to determine head positioning data indicative of at least a location of said user's head, and determining one or more selected audio center points in accordance with the position of said virtual source and the location of said user's head. For example, the one or more ultrasound fields are produced by one or more transducer systems; wherein said head positioning data is further indicative of an orientation of the user's head; and wherein said head positioning is processed to determine one or more relative locations and orientations of the user's head with respect to said one or more transducer systems, to select at least one of said transducer systems for projecting said one or more ultrasound fields to said one or more selected audio centers.

In some embodiments, the position data of said virtual source relative to the listener is indicative of azimuth and elevation data of the virtual source relative to said user's head; said one or more selected audio center points comprise a single audio center point located within a perimeter region surrounding said user's head by a distance not exceeding 30 centimeters from the head; and wherein said controlling of the at least one parameter of said ultrasound fields comprises utilizing the azimuth and elevation data of the virtual source relative to the user's head to determine a position of said single audio center point within said perimeter region such that acoustic interactions of said left and right audible sound fields with the user's head mimics a head related transfer function (HRTF) of said head from the position of the virtual source. Typically, a nominal azimuth and nominal elevation of said single audio center point relative to said user's head matches said azimuth and elevation of the virtual source relative to the user's head.

The position of the single audio center point may be maintained fixed under changes in an orientation of said user's head to thereby provide that said virtual source is perceived by the user to be at a fixed position relative to the user.

In some embodiments, the position data of said virtual source relative to the listener is indicative of azimuth and elevation data of the virtual source relative to said user's head. The controlling of the at least one parameter of said ultrasound fields may comprise:

in case the azimuth of said virtual source is within a certain angular range of relative to a symmetry plane of said user's head, selecting said one or more audio center points to includes a single audio center point located at said azimuth relative to the head and within a perimeter region that surrounds said user's head by a distance not exceeding 30 centimeters from the head, such that interaction of said left and right audible sound fields with the user's head during their propagation from said single audio center point towards the left and right ears of the user respectively mimics a head related transfer function (HRTF) effect of the head on sounds arriving the azimuth of the virtual source; and in case the azimuth of said virtual source exceeds said certain angular range, the method includes selecting said one or more audio center points to include at least two audio center points within said perimeter, and transmitting at least two ultrasound fields towards said at least two audio center points for separately producing said left and right audible sound fields.

In some embodiments, the one or more ultrasound fields comprise left and right ultrasound fields transmitted towards respective left and right audio center points located in the vicinity of said user's left and right ears, for separately producing said left and right audible sound fields at said user's left and right ears. The head positioning may be processed to determine one or more relative locations and orientations of the user's head with respect to said one or more transducer systems, to select at least one of said transducer systems for use as a left transducer system for projecting sound field to a left ear of the user, and selecting at least one of said transducer systems as a right transducer system for projecting sound field to a right ear of the user, said selected left and right transducer systems being the same or different transducer systems from said one or more transducer systems. The intensities of the one or more ultrasound fields may be selected such that said audible sound fields are above auditory level only within a maximal radius not exceeding a range of 25-50 CM from said left and right audio center points, thereby providing private virtual binaural audio space to said user.

The controlling of the at least one parameter may comprise adjusting a time delay between the left and right ultrasound fields in accordance with a difference between a distance of said virtual source to said left and right ears, respectively.

The controlling of the at least one parameter may comprise utilizing a head related transfer function (HRTF) for applying spectral adjustment to frequency contents of said left and right ultrasound fields, respectively, in accordance with a position of said virtual source relative to said user's head.

The controlling of the at least one parameter of said left and right ultrasound fields may comprise utilizing azimuth and elevation data of the virtual source relative to the user's head to shift said left and right audio center points, respectively, relative to left and right locations of the left and right ears of the user such that acoustic interactions of said left and right audible sound fields with the user's head at least partially mimics a head related transfer function (HRTF) of said head from the position of the virtual source. The intensities of said left and right ultrasound fields may be selected such that said respective left and right audible sound fields are above auditory level within a radius R not exceeding a range of 50 cm from said left and right audio center points, respectively, and wherein the shifted left and right audio center points are spaced from left and right locations of the left and right ears, respectively, by a distance not exceeding said radius R.

In some embodiments, the one or more transducer systems are phased array ultrasound transducers, and wherein the method further comprises carrying out the following per each ultrasound field of said one or more ultrasound fields which is to be generated at a respective audio center point:

assigning an ultrasound transducer system of said one or more transducer systems to said ultrasound field, based on locations of said one or more transducers systems relative to the audio center point of said ultrasound field and based on the location of the head;

processing said at least one audio data piece based on the relative position between the assigned transducer system and the audio center point of said ultrasound field for generating a corresponding transducer channel adapted for operating the assigned transducer system, for generating the respective ultrasound field such that frequency contents of the ultrasound field generates the respective audible sound field with said at least one audio data piece via sound from ultrasound;

applying beam forming to transducer channel to produce beam-formed channel for operating phase arrays of assigned transducers to generate a respective ultrasound beams directed to the audio center point of said ultrasound field.

In some embodiments, the generating of the corresponding transducer channel comprises utilizing the audio data piece for determining frequency content of one or more ultrasound beams to be transmitted by the assigned transducer system towards said audio center point, wherein at least one of said ultrasound beams is an audio modulated ultrasound beam, whose frequency contents include at least two ultrasonic frequency components selected to produce said audible sound after undergoing non-linear interaction in a non-linear medium; and said beam forming of the transducer channel comprises:
determining one or more distinct respective focal points for one or more ultrasound beams; and
processing the frequency content of the one or more ultrasound beams to form a beam-formed ultrasound channel comprising a set of phase shifted signals adapted for actuating elements of the respective phased array ultrasound transducers for generation of said one or more ultrasound beams focused on said distinct focal points.

The invention also provides an alerting method for use in producing audible alerts to a vehicle driver, the alerting method comprising: monitoring a vehicle environment and upon identifying at least one hazard/event, carrying out the method of any one of the preceding claims, comprising generating said staged audio data such that said at least one audio data piece is indicative of said at least one identified hazard/event and said position of the virtual source corresponds to a position of said identified at least one hazard/event relative to a driver location in the vehicle.

The invention also provides a system for producing virtual binaural audio space, the system comprising:

(a) an audio session manager configured and operable to provide staged audio data indicative of at least one audio data piece and a position of a virtual source of said audio data piece relative to a listener;

(b) a head positioning module configured and operable to determine head positioning data indicative of location and orientation of a user's head, whereby the user is designated to be said listener of the audio data;

(c) a binaural ultrasound fields manager configured and operable for generating signals of one or more ultrasound channels signals to be provided to one or more ultrasound transducers for transmitting one or more respective ultrasound fields towards one or more audio center points, to thereby produce, via sound from ultrasound effect, audible sound fields at said audio center points carrying said at least one audio data piece points and propagating from said audio center points towards left and right ears of said user to affect left and right audible sound fields perceived by said left and right ears of said user; and wherein said binaural ultrasound fields manager is configured and operable for controlling at least one parameter of the ultrasound channels to adjust in accordance with the position of the virtual source and the head positioning data in order to affect a difference between said respective left and right audible sound fields such that the left and right audible sound fields are perceived by the user as an audible sound field propagating to said user from the direction of the virtual source and carrying said at least one audio data piece;

(d) an output sound from ultrasound generator module configured and operable to process the one or more ultrasound channels for generating beam formed ultrasound channels for operating said transducers to transmit one or more ultrasound fields towards the one or more selected audio center points.

The head positioning module is connectable to one or more sensing modules for receiving therefrom sensing data indicative of said user; and wherein the head detection module determining of the head positioning data comprises monitoring the head positioning module comprising a pattern recognition system adapted to process said sensing data to detect said user's head and determine head positioning data indicative of a location and orientation of the user's head relative to said one or more ultrasound transducer systems.

The binaural ultrasound fields' manager may be configured and operable to control the locations of said one or more selected audio center points in accordance with the position of said virtual source relative to the location of said user's head. The binaural ultrasound fields manager may control the locations of said one or more selected audio center points irrespective of an orientation of said head relative to the virtual source. The head positioning module may determine said position data indicative of azimuth and elevation of the virtual source relative to said user's head; said binaural ultrasound fields manager utilizes the azimuth and elevation of the virtual source relative to select said one or more selected audio center points and control their locations such that:

(a) the one or more selected audio center points are located within perimeter region surrounding said user's head by a distance not exceeding 30 cm from the head; and (b) wherein respective locations of the audio center points within said perimeter region are adjusted such that audible sound fields, generated via sound from ultrasound effect at said audio center points, undergo acoustic interactions with the user's head to from said left and right audible sound fields at the user's ears, whereby said acoustic interaction mimics a head related transfer function (HRTF) applied by the user's head to sounds arriving thereto from the direction of the virtual source.

The binaural ultrasound fields manager may select said audio center points to include a single audio center point located within said perimeter region at a nominal azimuth and elevation matching the azimuth and elevation of the virtual source relative to the head.

The binaural ultrasound fields manager may be configured to maintain the position of the single audio center point fixed under changes in an orientation of said user's head to thereby provide that said virtual source is perceived by the user to be at a fixed position relative to the user.

In some embodiments, the system operates as follows:

in case the azimuth of said virtual source is within a certain angular range of relative to a symmetry plane of said user's head, said binaural ultrasound fields manager selects said audio center points to include a single audio center point located at said azimuth relative to the head and within a perimeter region that surrounding said user's head by a distance not exceeding 30 cm from the head, such that interaction of said left and right audible sound fields with the user's head during their propagation from said single audio center point towards the left and right ears of the user respectively mimics a head related transfer function (HRTF) effect of the head on sounds arriving from the azimuth of the virtual source; and in case the azimuth of said virtual source exceeds said angular range, the binaural ultrasound fields manager selects said audio center points to include at least two audio center point within said perimeter for respectively transmitting at least two ultrasound fields towards said at least two audio center point to separately produce said left and right audible sound fields, via sound from ultrasound effect occurring at the at least two audio center points; and said binaural ultrasound fields manager utilizing an ultrasound head related transfer function (US-HRTF) for applying spectral adjustment to frequency contents of at least two ultrasound fields such that the left and right audible sound fields are perceived by the user as audible sound arriving from the direction of the virtual source.

The binaural ultrasound fields manager may select said audio center points to include at least left audio center point in the vicinity of said user's left and right ears, for respectively transmitting at least two ultrasound fields towards said at least left and right audio center points to separately produce said left and right audible sound fields, via sound from ultrasound effect occurring at the left and right audio center points; and wherein said binaural ultrasound fields manager controlling said at least one parameter of said transducer channels' signals comprises utilizing an ultrasound head related transfer function (US-HRTF) in accordance with a direction of said virtual source relative to said user's head, thereby applying spectral adjustment to frequency contents of at least two ultrasound fields, such that the left and right audible sound fields are perceived by the user as audible sound arriving from the direction of the virtual source.

The system may comprise a transducer selector module configured and operable for processing the head positioning data to determine one or more relative locations and orientations of the user's head with respect to said one or more transducer systems, and thereby selecting one or more selected transducer systems of said one or more transducer systems for projecting said ultrasound fields to said audio center points.

The binaural ultrasound fields manager may be configured and operable to adjust intensities of said one or more ultrasound fields such that said audible sound fields generated therefrom are above auditory level only within a maximal radius not exceeding a range of 25-50 CM from said audio center points, thereby providing private virtual binaural audio space to said user.

Also, in some embodiments, the binaural ultrasound fields manager is configured and operable for controlling said at least one parameter by carrying out one or more of the following:
- processing the at least one audio data piece based to generate one or more ultrasound channels each comprising signals for generating an ultrasound field whereby a frequency content of the ultrasound field is adapted for generating a respective audible sound field corresponding to said at least one audio data piece via sound from ultrasound effect;
- adjusting a time delay between the ultrasound channels in accordance with the position of said virtual source relative to the head;
- utilizing an ultrasound head related transfer function (US-HRTF) for applying spectral adjustment to frequency content of the ultrasound channels, respectively, whereby said US-HRTF is tuned in accordance with a position of said virtual source relative to said user's head;
- utilizing azimuth and elevation data of the virtual source relative to the user's head to set said one or more of the audio center points, relative to locations of left and right ears of the user, such that acoustic interactions of said left and right audible sound fields with the user's head at least partially mimics a head related transfer function (HRTF) of said head from the position of the virtual source.

The system may comprise a localized sound from US beam generator adapted for processing each ultrasound channel of the ultrasound channels to generate data indicative of one or more of ultrasound beams to be transmitted by one or more of the transducer systems towards the audio center point corresponding to the ultrasound channels, wherein at least one of said ultrasound beams is an audio modulated ultrasound beam, whose frequency content includes at least two ultrasonic frequency components selected to produce said audible sound after undergoing non-linear interaction in a non-linear medium, and determining one or more distinct respective focal points for said one or more ultrasound beams in the vicinity of said audio center point for causing destructive interference between said one or more beams at one or more regions surrounding said audio center point to thereby form confined localized audible sound field in the vicinity of said audio center point.

The one or more transducer systems may be configured as phased array ultrasound transducers, and the system may comprise a beam forming module adapted for processing the data indicative of one or more of ultrasound beams to generate a beam-formed ultrasound channel comprising a set of phase shifted signals adapted for actuating elements of the phased array ultrasound transducers for generating said one or more ultrasound beams focused on said distinct focal points.

The invention also provides an alerting system comprising the above-described system for producing virtual binaural audio, and a hazard notification monitor configured and operable for monitoring a vehicle environment and upon identifying at least one event of interest (e.g. hazard) in the vehicle environment, generating said staged audio data such that said at least one audio data piece is indicative of said at least one identified event of interest and said position of the virtual source corresponds to a position of said identified at least one event of interest relative to a driver location in the vehicle.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a block diagram of the audio communication system, FIG. 1B schematically exemplifies deployment of the audio communication system, and FIG. 1C shows a block diagram of an end unit of the audio communication system;

FIGS. 3A and 3B show a flow chart and a block diagram of a method 11000 and system 12000 configured and operable according to an embodiment of the present invention for producing, from a remote, a virtual 3D binaural audio privately heard by a designated user;

FIGS. 4A to 4D exemplify in more detail the operation of system 12000 and method 11000 according to certain embodiments of the present invention in which locations of audio center points at which audible sound from ultrasound is produced by the system, are specifically selected in the vicinity of the user's head in order to provide private 3D binaural audio to the user;

FIGS. 7A to 7C exemplify a technique for producing confined audible sound field from ultrasound;

FIGS. 7D and 7E exemplify techniques for audio modulating ultrasound fields/beams with audible sound data such that the audible sound is produced from the ultrasound fields via sound from ultrasound effect;

DETAILED DESCRIPTION OF EMBODIMENTS

Figure 1A:
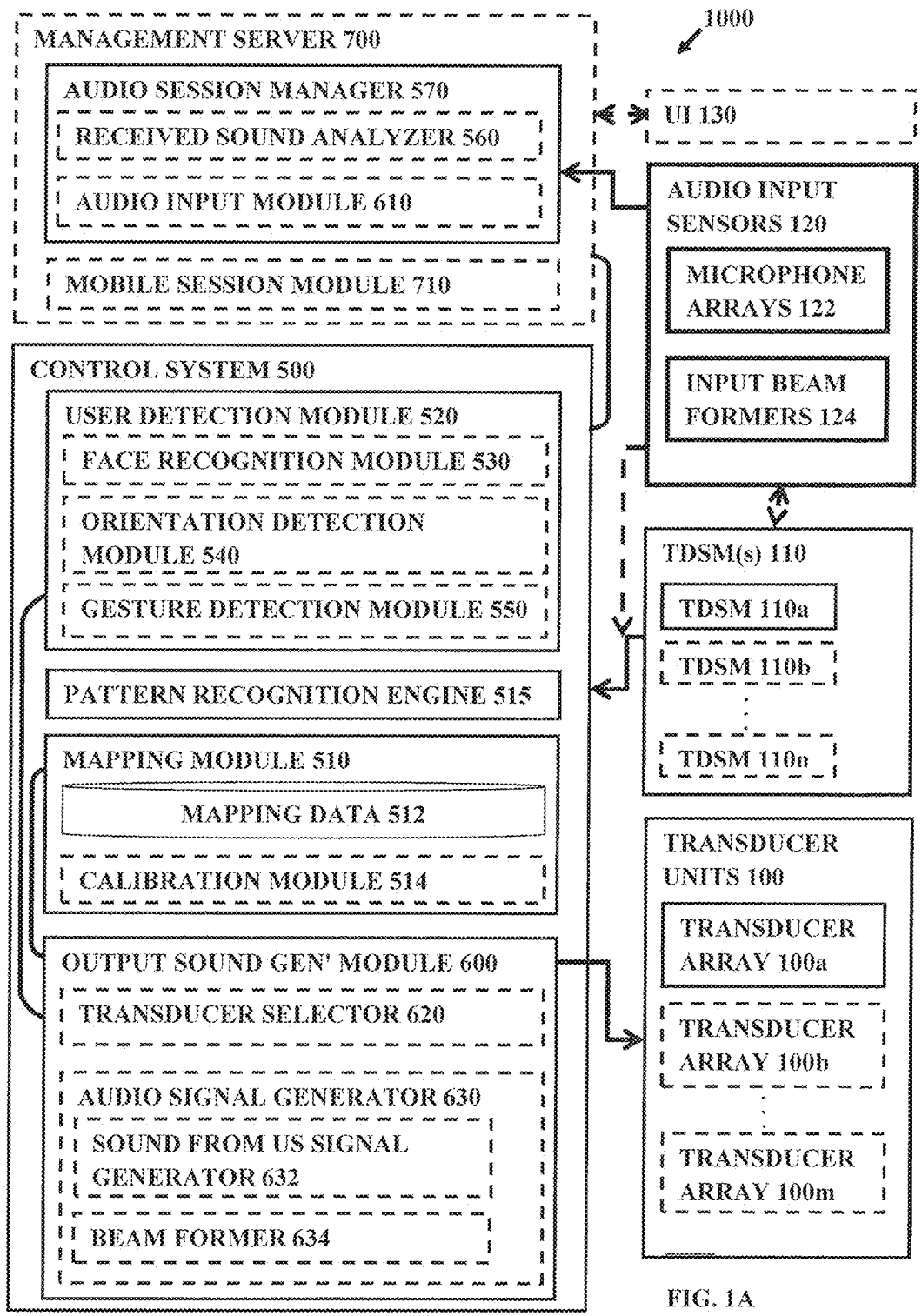
FIGS. 1A to 1C schematically illustrate an audio communication system according to some embodiments of the invention, whereby
Figure 1B:
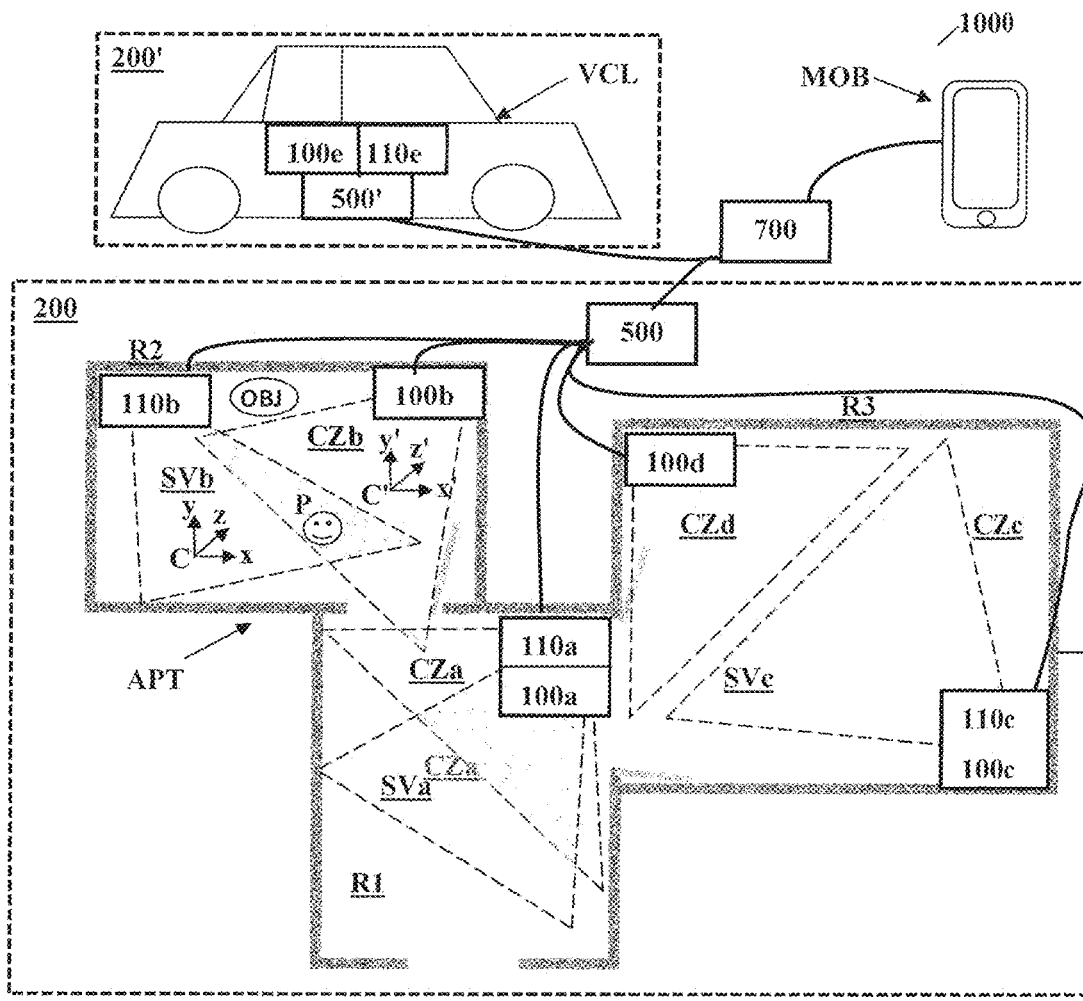
Figure 1C:
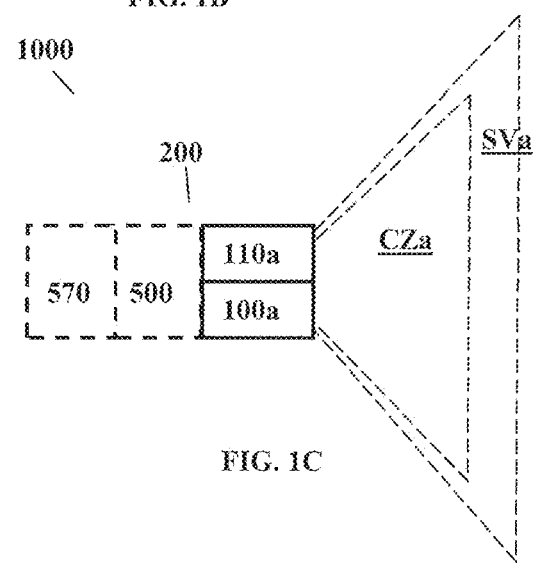

As indicated above, the present invention provides a system and method for providing private and hand-free audible communication within a space. Reference is made together to FIGS. 1A to 1C, whereby FIG. 1A to 1C, whereby FIG. 1A is a block diagram of an audio communication system 1000 according to an embodiment of the present invention, FIG. 1B schematically illustrates an exemplary deployment of the audio communication system 1000 and FIG. 1C is a block diagram exemplifying the configuration of an end unit 200 of the audio communication system 1000 according to some embodiments of the invention.

System 1000 includes one or more acoustic/sound transducers units 100, each may typically include an array of sound transuding elements which can be operated for generating and directing directive sound beam(s) towards selected directions. For instance transducer array units 100*a* and optional 100*b* to 100*m* are exemplified in the figure). The transducer array units 100*a*-100*m* may each be in charge of a specific region/area which is in the line of sight of the respective transducer unit. Additionally, the audio communication system 1000 also includes one or more three dimensional sensing devices/module (TDSM) 110, each including one or more sensors which are capable for acquiring sensory data indicative of the three dimensional structures of/in the environment at which they are placed. The TDSM modules 110 may for example includes passive and/or active sensors, such as one or more cameras (e.g. operating in the visual and/or IR wavebands), and/or depth sensors (e.g. LIDARs and/or structured light scanners), and/or echo location sensors (e.g. sonar), and/or any combination of sensors as may be known in the art, which are capable of sensing the 3D structure of the environment and provided sensory data indicative thereof. It should be noted that in some cases the TDSM modules 110 are configured to utilize/operate the transducer units 100 also as sonar modules for sensing the 3D structure of the environment. In this case, the transducer units 100 may be adapted to operate in both transmission and reception modes of ultra-sonic signals, and/or the audio input sensors 120 and/or other sensors associated with the TDSM modules 110 may be configured and operable in the ultra-sonic wavelength(s) for sensing/receiving the reflected/returned sonar signals.

In the present example the TDSM(s) 110 include TDSM unit 110*a* and optionally additional TDSM units 110*b* to 110*n* whereby each of the TDSM units is capable of monitoring the 3D structure of an area of a given size and shape. Accordingly, at each space/site (e.g. room/office/vehicle space) to be serviced by the audio communication system 1000, at least one TDSM 100 and possibly more than one TDSM 100 is installed in order to cover the main regions of that space and provide the system 1000 with 3D sensory data indicative of the structure of that space. Additionally, the system includes a control system 500 (also referred to herein as local audio system) that is connectable to the TDSM(s) 110 and to the transducer unites 100 and configured and operable to receive from the TDSM(s) 110 3D sensory data indicative of the 3D structure of one or more spaces at which the TDSM(s) 110 are located/furnished, and operate the transducer unites 100 located at these spaces so as to provide designated audio data/signals to users in these spaces.

According, to some embodiments of the present invention the control system 500 includes a user detection module 520 connectable to one or more of the TDSM(s) 110 (e.g. via wired or wireless connection) and configured and operable for processing the 3D sensory data obtained therefrom to detect, track and possibly also identify user(s) located in the space(s), at which the TDSM(s) 110 are installed. To this end, the user detection module 520 is configured and operable to process the sensory data to determine spatial location elements within the space(s)/sensory-volume(s) covered by the TDSM(s), and in particular detect the location of at least one of a user's head or a user's ear within the sensing volumes of the three dimensional sensor modules.

Generally, the TDSM(s) 110 may be located separately from the transducers 100 and/or may be associated with respective sensing coordinate systems (with respect to which the 3D sensing data of the sensing volumes sensed thereby is provided).

Indeed, as shown for Example in FIG. 1B, the sensing coordinate systems may be different from the coordinate systems of the acoustic transducers 100. For example in FIG. 1B the coordinate system C of the TDSM 110*b* in room R2 is shown to be different than the coordinate system C' of the transducer unit 100*b* covering that room. Accordingly the TDSM 110*b* can detect/sense the location of the user P (e.g. its head/ears) which is located within the sensing volume SVb and provide data indicative of the user's head/ear(s) location relative to the coordinate system C of the TDSM 110*b*. The transducer 100*b* may be arranged in the room at a different location and/or at different orientation and may generally be configured to operate relative to a different coordinate system C' for directing sound to the user P located at the transducer's 100*b* coverage zone CZb.

Therefore, according to some embodiments of the present invention, in order to bridge between the different coordinate systems of the TDSM(s) 110 and the transducers 100, which may be installed at possibly different locations and/or orientations, the control system 500 includes a mapping module 510, which is configured and operable for mapping between the coordinate systems of the TDSM(s) 110 with respect to which the sensory data is obtained, and the coordinate systems of the transducers 100 with respect to which sound is generated by the system 1000. For instance, the mapping module 510 may include/store mapping data 512 (e.g. a list of one or more coordinate transformations, such as C to C' transformation), which maps between the coordinates of one or more TDSM(s) 110 to the coordinates of one or more corresponding transducers 100 that pertain-to/cover the same/common space that is sensed by the corresponding TDSMs 110.

Optionally the mapping module 510 also includes a calibration module 514 which is configured and operable for obtaining the mapping data between the TDSMs 110 and the transducers 100. This is discussed in more details below.

Additionally, the control system 500 includes an output sound generator module 600 (also referred to interchangeably hereinbelow as sound processing utility/module). The output sound generator module 600 (the sound processing utility) is connectable to the one or more transducer units 100 and is adapted to operate the one or more transducer units 100 to generate acoustic signals to be received/heard by one or more of the users detected by the user detection module 520.

To this end, the output sound generator module 600 may be associated with an audio input module 610 (e.g. external audio source) of an audio session manager 570 of the system 1000. The audio input module 610 is configured and operable for receiving and providing the output sound generator module 600 with sound data to be transmitted to at least one predetermined user of interest (e.g. user P) in the spaces (e.g. the apartment APT) covered by the system.

According to some embodiments the output sound generator module 600 includes a transducer selector module 620 configured and operable for selecting the at least one selected transducer (e.g. 100*a*) out of the transducers 100, which is suitable (best suited) for generating and directing a sound field to be heard by the predetermined user (e.g. by user P).

To this end, according to some embodiments the output sound generator module 600 is connected to the user detection module 520 for receiving therefrom data indicative of the location(s) of the user(s) of interest to be serviced thereby (e.g. the locations may be specified in terms of the coordinate systems C of at least one of the TDSM(s) 110). The output sound generator module 600 is connected to the mapping module 510 and is adapted for receiving therefrom mapping data 512 indicative of the coordinate mapping (e.g. transformation(s)) between the coordinate system of the TDSM(s) 110 sensing the user of interest P (e.g. coordinates C of TDSM 110*b*) and the coordinate system of one or more of the transducers 100 (e.g. coordinates C' of transducer 100*b*).

The transducer selector receives the location of the predetermined user from the user detection module 520 (the location may be for example in terms of the respective sensing coordinate system of the TDSM (e.g. 110*b*) detecting the user P. The transducer selector module 620 is configured and operable for utilizing the mapping data obtained from the mapping module 510 (e.g. coordinate transformation C-C' and/or C-C") for converting the location of the head/ears of the detected user P into the coordinate spaces/systems of one or more of the transducers 100. Optionally, the transducer selector module 620 may be adapted to also receive data indicative of structures/objects OBJ (e.g. elements such as walls and/or furniture and/or surfaces thereof) located in the vicinity of the user of interest P (e.g. in the same space/room as the user P shown in FIG. 1B). Then, the transducer selector module 620 utilizes the mapping data obtained from the mapping module 510 (e.g. coordinate transformation C-C' and/or C-C") for converting the location and possibly also the orientation of the head/ears of the detected user P into the coordinate spaces/systems of one or more relevant transducers 100. The relevant transducers being for that matter, transducers within which coverage zones the user P is located (to this end excluded are the transducers which are not in the same space and/or which coverage zones do not overlap with the location of the predetermined user). Possibly, at this stage the transducer selector module 620 utilizes the mapping data obtained from the mapping module 510 to convert the location of the objects OBJ in the space to the coordinate of the relevant transducers. Then based on the location and orientation of the user's head/ear(s) in the coordinate spaces of the relevant transducers 100, the transducer selector module 620 determine and selects the transducer(s) (e.g. 100*b*) whose location(s) and orientation(s) are best suited for providing the user with the highest quality sound field. To this end, the transducer selector 620 may select the transducer(s) (e.g. 100*b*) which have the shorter un-obstructed line of sight to the predetermined user P (to his head/ears). In case no transducer with un-obstructed line of sight is found, the transducer selector 620 may utilize the pattern recognition to process the 3D sensory data (e.g. 2D and/or 3D images from the TDSMs) to identify acoustic reflectors such near the user, and select one or more transducers that can optimally generate a sound field to be reached to the user via reflection from the objects OBJ in the space. To this end, the transducer selector 620 determines a selected transducer (s) e.g. 100*a* to be used for servicing the predetermined user to provide him with audio field, and determines an audio transmission path (e.g. preferably direct, but possibly also indirect/via-reflection) for directing the audio field to the head/ears of the user.

The output sound generator module 600 also includes an audio signal generator 630, which is configured and operable to generate audio signals for operating the selected transducer to generate and transmit the desired audio field to the predetermined user. In this regards, the audio signal generator 630 encodes and/possibly amplifies the sound data from the audio input module 610 to generate audio signals (e.g. analogue signals) carrying the sound data. In this regards, the encoding of the sound data on a signals to be communicated to speakers of the selected acoustic transducer (e.g. 100*a*) may be performed in accordance with any known technique.

Particularly, in some embodiments of the present invention, the audio signal generator 630 is configured and operable for generating the audio field carrying the sound data only in the vicinity of the user, so that the user privately hears the audio field transmitted to him, while user's/people in his vicinity cannot hear the sound. This may be achieved for example by utilizing the sound from ultrasound technique disclosed in WO 2014/076707, which is assigned to the assignee of the present invention and incorporated herein by reference. To this end the audio signal generator 630 may include a sound from ultrasound signal generator 632 which is configured and operable for receiving and processing the sound data while implementing the private sound field generation technique disclosed in WO 2014/076707, so as to produce private sound field which can be heard only by the predetermined user to which it is directed. To this end, the relative location of the user, relative to the selected transducer (as obtained from the transducer selector 630), is used to generate ultrasonic beams which are directed from the transducer to the location of the user and configured to have a non-linear interaction in that region forming the localized sound field at the region of the user.

Additionally, the system may include a beam forming module 634 configured and operable for processing the generated audio field carrying signals to generate a plurality of beam-formed signals, which when provided to the plurality of transducer elements of the selected acoustic transducer(s) (e.g. 100*b*) generate an output acoustical beam that is focused on the user (on his head and more preferably on his ears). The beam forming module 634 of the present invention may be configured and operable for implementing any one or more of various known in the art beam forming techniques (such as phase array beam forming and/or delay and subtract beam forming), as will be readily appreciated by those versed in the art.

Thus the control system 500 is configured and operable to process the sensory data obtained from the TDSM(s) 110 in order to determine user(s) in the monitored space to which audio signals/data should be communicated and operate the one or more transducer units, 100*a* and 100*b*, in order to provide the user(s) with hand free private audio sessions in which the user(s) privately hear the sound data designated thereto without other users in the space hearing it.

According to some embodiments the system includes an audio session manager 570 which is configured and operable for managing audio sessions of one or a plurality of users located in the space(s) covered by the system 1000. The audio session manager 570 may be adapted to manage various types of sessions including for example unilateral sessions in audio/sound data is provided to the user (e.g. music playing sessions, television watching sessions, gaming and others) and/or bilateral sessions in which audio/sound data is provided to the user and also received from the user (e.g. phone/video calls/conference sessions and/or voice control/command sessions and others). To this end, the session manager may manage and keep track of a plurality of audio sessions associated with a plurality of users in the space(s) covered by the system which distinguishing between the sounds to be communicated to the different respective users and also distinguishing between the sounds received from the different respective users.

To this end, optionally in implementations in which the system is configured to enable users to conduct bi-directional (bi-lateral) audio communication sessions (such as telephone calls). The system 1000 includes one or more audio input sensor modules 120 distributed in the spaces/sites covered by the system. Each audio input sensor module 120 is configured and operable for receiving audio information from user(s) at the space covered thereby. The audio session manager 570 includes an input sound analyzer 560 adapted to process the audio information from the audio input sensor module 120 in order to distinguish between the sounds/voices of different users.

For example, the audio input sensors 120 may be configured and operable as directive audio input sensors, which can be used to discriminate between sounds arriving from different directions. Accordingly, the input sound analyzer 560 is configured and operable for discriminating the input sound from different users in the same space based on the different relative directions between the users and one or more of the directive audio input sensors 120 in that space.

For instance, in some cases the directive audio input sensor 120 includes a microphone array 122. The audio input sensor 120 may include for example a plurality of directive microphones 122 facing different directions, or a plurality of microphones 122 (e g similar ones) and an input sound beam former 124. Accordingly the array of differently directed directive microphones, and/or an input sound beam former 124 connected to the array of microphones 122, provides data indicative of the sound received from different directions in association with the directions from which they are received. The input sound beam former 124 may be configured and operable to process the signals received by the microphone array according to any suitable known in the art beam forming technique in order to determine the directions of different sounds received by the array. The input sound analyzer 560 may be configured and operable to associate the sounds arriving from different directions with different respective users in the monitored space(s), based on the locations of the users in these spaces, as determined for example by the user detection module 520. More specifically, the input sound analyzer 560 may be adapted to utilize user detection module 520 in order to determine the location of different users in the space(s) monitored by the system 1000. Then, utilizing the mapping module 510 (which in that case also holds mapping data relating the coordinates (locations, orientations, and sensing characteristics) of the audio input sensors 120 (e.g. microphone array) to the coordinates of the TDSMs 110), the input sound analyzer 560 determines to which user belongs the sounds arriving from each specific direction. Accordingly, the sound analyzer 560 associates the sound coming from each user's direction with the session of the user. Thus, whereby the output sound generator module 600 provides sounds privately to respective users of the system and the sound analyzer 560 separately/distinctively obtains the sound from each user, a bilateral audio communication can be established with each of the users.

As indicated above, the system 1000 may be configured as a distributed system including the one or more transducer units (typically at 100) and the one or more TDSMs (typically at 110) distributably arranged in desired spaces, such as a house, apartment, office, vehicle and/or other spaces, and a management server system 700 connected to the distributed units. For instance FIG. 1B shows a distributed system 1000. The system 1000 includes TDSMs 110*a* to 110*c* and arranged in rooms R1 to R3 of an apartment APT and connected to the control system 500 which manages the audio communication sessions within the apartment, The system 1000 also includes the TDSM 110*e* and the transducer 100*e* arranged in a vehicle VCL, and connected to the control system 500' which manages the audio communication sessions within the vehicle VCL. In various implementations of the system, the control systems 500 and 500' (which are also referred to herein as local audio systems) may be connected to their respective TDSMs 110 and transducers 100 by wired or wireless connection. The management server system 700 manages the audio communication sessions of the users while tracking the locations of the users as they transit between the spaces/sites covered by the system (in this case the rooms R1-R3 of the apartment APT and the vehicle VCL).

The server system 700 may for example reside remotely from the control systems (local audio systems) 500 and/or 500' (namely remotely from the apartment APT and/or from the vehicle VCL) and may be configured and operable as a cloud based server system servicing vocal communication to the user as he moves in between the rooms of the apartment APT, from the apartment to the vehicle VCL and/or while he drives the vehicle VCL. To this end the, control system 500 or one or more modules thereof may be configured and operable as a cloud based service connectable to the plurality of TDSMs and transducers from remote, e.g. over network communication such as the internet. To this end the control systems 500 and/or 500' and possibly also other modules of the system 1000, except for the TDSMs 110 and the transducer array units 100 may be implemented as cloud based modules (hardware and/or software) and located remotely from the spaces (e.g. apartment APT, vehicle VCL and/or office) which are covered by the system and adapted to communicated with the TDSMs 110 and the transducer array units 100. Accordingly, there may be no physical hardware related to the control systems 500 and/or 500' at the spaces covered by the system.

To this end, the server system 700 communicates with the control systems 500 and 500' to receive therefrom data indicative of the location of the user of interest (P). To this end the server system 700 receives user detection data obtained from the user detection modules 520 of the control systems 500 and 500' by processing the sensing data gathered by the varies TDSMs 110 who sense the users of interest (e.g. user P) while he moves in the various spaces (rooms of the apartment and/or the vehicle). Accordingly the server system 700 tracks the user as he moves between the various spaces, while managing the audio session(s) of the user as he moves. In case the user, while in active audio session, moves from the coverage spaces of the TDSMs and transducers of one/first control system (e.g. 500) to the coverage zone of another/second control system (e.g. 500'), the server system 700 operates the second control system 500' to continue the active audio session of the user.

Indeed, in some cases the user may move to places/location at which no TDSMs 110 and no transducers 100 are installed. For example when the user walks on the path between the apartment APT and the vehicle VCL. Therefore in some embodiments that the server system 700 further includes a mobile session module 710 (e.g. a modem) in which is capable of transferring the audio communication session to a mobile device MOB of the user (e.g. a preregistered mobile device such as a mobile phone prerecorded in the server 700 as associated with the user) in order to allow the user to maintain continuous audio session while he transit between different spaces. Thus, once the user exit the coverage zones of the system he can continue with his audio session via his phone.

Alternatively or additionally, in some implementations, the system 1000 includes one or more full package units which include at least one transducer unit 100, at least one TDSM 110, and optionally an input audio sensor (microphone array) 120 packaged together in the same module. This is illustrated for example in FIG. 1C, and in FIG. 1B see modules 100*a*+110*a* and 100*c*+110*c*. Optionally the full package units also include the control unit 500 and the audio session manager 570.

In this case the transducer unit 100 and the TDSM 110 are preinstalled within the package and the relation between the coordinates of their sensing volumes and coverage zones are predetermined apriority and coded in the control unit's mapping module 510 (e.g. memory). Accordingly no calibration of the mapping between the TDSM and the transducer is required in this case. To this end full package unit of this example is configured to be deployed in a certain space, without calibration and may be used to provide private audio communication session to the user at the space at which it is deployed.

Generally however, calibration may be required in order to determine the mapping data associating the coordinate spaces/systems of the transducers (e.g. C') the coordinates spaces/systems of the TDSMs (e.g. C), and possibly also the coordinate system of the audio input sensors 120. More specifically calibration may be required in cases where the transducers and the TDSMs are located separately as illustrated in FIG. 1B, To this end, optionally the mapping module 510 includes a calibration module 514 configured and operable for obtaining and/or determining calibration data indicative of the relative locations and orientations of the different TDSMs and transducers and possibly also of the audio input sensors 120 that are connected to the control system 500.

In some embodiments the calibration module 514 is adapted to receive manual input calibration data from a user installing the system 1000. For instance such input data may be indicative of the relative locations and orientations of the TDSMs and the transducers, and the calibration module 514 may be adapted to utilize this data to determine mapping data indicative of coordinate transformations between the coordinates of the TDSMs 110 and those of the transducers 100 and possibly audio input sensors 120.

Alternatively or additionally, the calibration module 514 may be adapted to implement and automatic calibration scheme in which the sensing capabilities of the TDSMs 110 and possibly also the audio sensing capabilities of the audio input sensors 120 are employed in order to determine locations and orientations of the TDSMs 110 relative to the various transducers 100 and/or input sensors 120. To this end, in some embodiments the calibration module 514 utilizes the pattern recognition engine 515 in order to process the data sensed by each TDSMs 110 to identify the transducers 100 and possibly audio input sensors 120 located in the sensing zone of each TDSM and determine their relative locations and orientations relative to the TDSMs 110.

Indeed, in some embodiments in order to identify the transducers 100 and optionally identify the audio input sensors 120, the calibration module 514 utilizes certain pre-stored reference data indicative of the appearance and/or shape of the transducers and/or the audio input sensors. This reference data may be used by the pattern recognition engine 515 to identify these elements in the spaces (sensing volumes SVa-SVn) monitored by the TDSMs.

Moreover, optionally, according to some embodiments the transducers 100 and possibly the audio input sensors 120 are configured with a package carrying identifying markers (e.g. typically visual passive markers, but possibly also active markers such as active radiation emitting markers) and/or acoustic markers and/or other markers which aid at identifying the types and the locations and orientations of the transducers 100 and/or the audio input sensors 120 by the TDSMs. To this end, the markers should be of a type identifiable by the sensors included in the TDSMs. In such embodiments the pre-stored reference data used by the calibration module 514 may include data indicative of the markers carried by different types of the transducers 100 and/or the audio input sensors 120 along with the respective types and audio properties thereof. The reference data may be used by the pattern recognition engine 515 to identify the markers in the spaces (sensing volumes SVa-SVn) monitored by the TDSMs, and thereby determine the relative locations and orientations of the transducers 100 and optionally the audio input sensors 120.

Yet alternatively or additionally, the calibration module may be adapted to carry out an active calibration phase in which the location of the transducers is determined by sensing and processing sound field generated by the transducers during the calibration stage and locating (e.g. echo-locating) the transducers based by detecting and processing the calibration sound fields generated thereby (e.g. by employing the TDSMs 110 and/or the audio input sensors 120 to sense these sound field and process the sensed sound fields; e.g. utilizing beam forming) in order to determine the relative location and orientation of the transducers relative to the TDSMs and/or 110 and/or the audio input sensors 120.

Thereafter, once the relative locations and orientations of the transducers 100 are determined, the calibration module 514 determines the coordinate transformations between the coordinate spaces/systems of the transducers 100 (the coverage zones' CZa-CZm coordinates of the transducers 100*a*-100*m* by which the system can adjust/control the direction and/or location of the generated sound field), and the coordinate spaces of the sensing zones SVa-SVn of the TDSMs. This allows to generate the mapping data of the mapping module which enables to accurately select and operate the selected traducer in order to generate and direct a sound field towards a location of a user P detected by one of the TDSMs. Optionally, in the same way, the calibration module 514 determines the coordinate transformations between the coordinate spaces/systems of the coverage zones (not specifically shown in the figures) of the audio input sensors 120, by which the system receives the sounds from the users, and the coordinate spaces of the sensing zones SVa-SVn of the TDSMs. This allows to generate the mapping data enabling to accurately determine the user whose voice is received by the audio input sensor(s) 120.

It should therefore be noted, although not specifically shown in the figure, that the control system 500 and generally the system 1000 include one or more communication input and output ports for use in network communication and/or for connection of additional one or more elements as the case may be.

In some embodiment, system 1000 may also include one or more display units 130 connectable to the control unit 500 and configured and operable for providing display data to one or more users. The control unit 500 may receive data about location of a user from the user detection module and based on this location data, determine a suitable display unit 130 for displaying one or more selected data pieces to the user, and to further select an additional display unit 130 when the user is moving. The control unit may operate to display various data types including but not limited to one or more of the following: display data associated with another user taking part in an ongoing communication session, display data selected by the user (e.g. TV shows, video clips etc.), display commercial data selected based on user attributes determined by the system (e.g. age, sex), etc. The control unit 500 may allow the user to control the displayed data using one or more command gestures as described further below. Additionally, in some embodiments the display is also a part of a user interface of the system (possibly also including user input device such as keyboard and/or touch-screen and/or gesture detection), that is configured and operable as a system setup interface presenting the user with setup and configuration parameters of the system and receiving from the user instructions for configuring the setup and configuration parameters of the system 1000.

The one or more TDSMs 110 are configured for providing data about three dimensional arrangement of a region within one or more corresponding sensing zones. To this end the one or more TDSMs 110 may include one or more camera units, three dimensional camera units, as well as additional sensing elements such as radar unit, LiDAR (e.g. light based radar) unit and/or sonar unit. Additionally the control unit 500 may be configured to operate the one or more transducer units 100 to act as one or more sonar units by scanning a corresponding coverage volume with an ultra-sonic beam and determined arrangement of the coverage volume in accordance with detected reflection of the ultra-sonic beam.

As indicated above, the transducer units 100 may each include an array of transducer elements. For example WO 2014/076707 discloses a transducer unit which may be included in the system 1000 and which is particularly suited for implementing a sound from ultrasound for generating a localized sound field (e.g. a confined sound bubble) within its coverage zone (e.g. in the vicinity of the head/ear(s) of a designated user of interest).

The transducer unit 100 includes: an array of transducer elements 105 configured to emit acoustic signals at ultrasonic (US) frequency range, and a sound generating controller 108 configured to receive input data indicative of an acoustic signal to be transmitted and a spatial location to which the signal is to be transmitted. The sound generating controller 108 is further configured and operable to operate the different transducer elements 105 to vibrate and emit acoustic signals with selected frequencies and phase relations between them. Such that the emitted US signals propagate towards the indicated spatial location and interact between them at the desire location to generate audible sound corresponding to the signal to be transmitted as described further below. In this connection the terms transducer array, transducer unit and transducer array unit as used herein below should be understood as refereeing to a unit including an array of transducers elements of any type capable of transmitting acoustic signals in predetermined ultra-sound frequency range (e.g. 40-60 KHz). The transducer array unit may generally be capable of providing beam forming and beam steering options to direct and focus the emitted acoustic signals to thereby enable creation of bright zone of audible sound.

The one or more microphone arrays 120 are configured to collect acoustic signals in audible frequency range from the space to allow the use of vocal gestures and bilateral communication session. The microphone array 120 is configured for receiving input audible signals while enabling at least certain differentiation of origin of the sound signals. To this end the microphone array 120 may include one or more direction microphone units aligned to one or more different directions within the space, or one or more microphone units arranged at a predetermined distance between them within the space. In this connection it should be noted that as audible sound has typical wavelength of between few millimeters and few meters, the use of a plurality of microphone units in the form of phased array audio input device may require large separation between microphone units and may be relatively difficult. However, utilizing several microphone units having distances of few centimeters between them and analyzing audio input according to time of detection may provide certain indication about direction and location of the signal origin. Typically it should be noted that audio input data may be processed in parallel with sensing data received by the one or more TDSMs 110 to provide indication as for the origin of audio input signals and reduce background noises.

The control/processing system 500 is configured and operable to provide hand free private sound communication to one or more users located within the space where the system is employed. Generally, the system 1000 is configured and operable to initiate, or response to initiation from a user, an audio communication session of one or more users while providing private sound region where only the selected user can hear the sound signals. To this end, the control unit 500 utilizes the sensing data about three dimensional arrangement of the space to determine location of a selected user, the transmits acoustic signals of two or more selected ultra-sonic frequencies with suitable amplitude, phase, frequencies and spatial beam forming to cause the ultra-sonic signals to interact between them at vicinity of the selected user to demodulate frequencies of audible sound. This provides a region of sound that the user can hear, while the sound cannot be heard outside of a relatively small region. To this end the control unit 500 is generally configured to provide certain data processing abilities as well as calibration data indicative of correspondence between coverage zones of the transducer array units 100 and sensing volumes of the TDSM units 110. As indicated above, such calibration data may be pre-stored or automatically generated by the system. The control system 500 and/or the audio session manager 570 may include an audio input module 610 configured and operable for communicating with one or more audio sources (e.g. local or remote communication modules and/or other audio data providers) to obtain therefrom audible data to be provided to the user. Also, the control system 500 and/or the audio session manager 570 may include an audio analyzer 560 configured and operable for receiving input audio signals from one or more microphone units 120. The control system 500 may also include a gesture detection module 550 configured and operable to process the audio signal from the microphone units 120 to determine if an audio signal indicative of one or more gestures was received from a user of the system, and possibly associate such gestures with certain instructions received from the user (e.g. user's instructions with respect to an ongoing communication session of the user and/or initiation of a communication session etc.).

The mapping module 510 is connectable to the one or more TDSM 110 units and configured and operable to receive input indicative of three-dimensional sensing data of the respective sensing volumes. The mapping module 510 is further configured for processing the input sensing data and generate a three dimensional (3D) model of the one or more respective sensing volumes of the TDSMs. In cases where the system is configured as a distributed system, e.g. as in the present example of FIG. 1B, the mapping module of one control unit 500 may be configured to communication along a suitable communication network with mapping modules of one or more other audio communication systems connected thereto. Additionally or alternatively, the mapping module may be pre-provided with data about arrangement of the different transducer units 100, TDSM units 110 and microphone units 120 to thereby enable correlations between sensing data and recipient location determined by the TDSM units 110 and corresponding transducer units 100.

The user detection module 520 is configured and operable for receiving input sensing data from the one or more TDSMs 110 and for processing the input sensing data to determine existence and location of one or more people within the corresponding sensing volume. In this connection, the user detection module may include or be associated with a pattern recognition engine/utility 515 which is configured and operable for recognizing various objects in the image(s) obtained from the TDSMs 110. For that matter it should be understood that the images of the TDSMs 110 may include: visual images(s) and/or IR image(s) and/or echolocation image(s) and/or depth image(s) and/or composite image(s) comprising/constructed from any combination of the above. The exact types of image information obtained from the TDSMs 110 may generally depend on the specific configuration of the TDSMs used and the sensors included therein. To this end, the term image should be understood here in its broad meaning relating to a collection of data pixels indicative of the spatial distribution of various properties of the monitored space, such as various spectral colors, depth and/or other properties. The pattern recognition engine/utility 515 may utilize various types of image processing techniques and/or various pattern recognition schemes as generally known in the art, for identifying people and/or their heads/ears (e.g. P in FIG. 1B) and possibly also other recognizable objects (e.g. OBJ in FIG. 1B) in the space/sensing volume(s) monitored by the TDSM(s) and determining their location in the monitored space. This allows for separating image data portions associated with people or generally foreground objects from the background image data.

To this end in some implementations pattern recognition engine/utility 515 is configured and operable to apply pattern recognition processing to the image(s) obtained from the TDSMs 110 and to thereby generate a 3D model of the spaces monitored by the TDSMs. In turn the user detection module 520 may be adapted to determining (monitoring) and tracking (in time) the location(s) (e.g. 3D location) of one or more user(s) (e.g. of the user of interest P) based on the 3D model of the space generated by the pattern recognition engine/utility 515. Accordingly the user detection module 520 determine desired location at which to generate private sound region (sound bubble) for the user(s) of interest P, such that said location is centered on a selected user's head, and more preferably centered on/near the individual ear(s) of the user In some configuration of the system, the user detection module 520 may include, or be connected to, one or more of face recognition module 530, orientation/head detection module 540, and gesture detection module 550. Generally, it should be noted that the user detection module 520 is configured and operable for processing input sensing data utilizing one or more generally known processing algorithms to determine existence of one or more people (potential users) within the corresponding sensing volume. The face recognition module 530 may generally be configured to receive sensing data (e.g. the images of the TDSMs) indicative of existence and location of one or more selected users and to process the data by one or more face recognition techniques to determine identity of the one or more detected users. The face recognition module 530 is thus configured and operable for generating identity data indicative of the locations and identities of one or more detected user(s) and for providing the identity data to the output sound generator module 600 to enable the transducer selector 620 to select a suitable transducer unit and operate it for generating local private sound region audible to a selected user. The face recognition module 530 may be adapted to provide the identity data also to the received sound analyzer 560 so that the latter can process the sounds received from the audio input sound to determine/recognize/separate the sounds arriving from each particular user in the monitored space. In some embodiments, the face recognition module 530 may also be adapted to perform casual pairing and determine the user age/sex for purposes such as delivering commercials etc.

The output sound generator module 600, and the audio input module 610 may generally provide data about input audio signal to the user detection module 520 in accordance with location of a user, one or more gestures provided by the user (e.g. vocal gestures) and bilateral ongoing communication session.

To this end, the orientation/head detection module 540 is configured to receive at least a part of the sensory data from the TDSMs and/or at least a part of the 3D model obtained from the pattern recognition module 515, which is associated with the location of user of interest P, and to process the sensory data to determine location of the selected user's head and possibly also the orientation of the user's head. Accordingly the orientation/head detection module 540 may provide the data indicative of the location and orientation of the user's head to the output sound generator module 600 so that the latter can generate a local/confined sound field in the vicinity of (e.g. at least partially surrounding) the user's head.

As discussed in more details below, in some embodiments of the present invention the head orientation module 540 is further configured processing the sensing data from the TDSMs and/or the 3D model obtained from the pattern recognition module 515 in order to determine data indicative of the location and orientation of the user's ear(s) and provide such data to the output sound generator module 600 so that the latter can generate a local/confined audible sound field at least partially surrounding the user's ear(s).

As indicated above, the head orientation module 540 and/or the transducer selector module 620 may also generate data indicative of line of sight between one or more transducer units and the user's ears/head. In this connection it should be noted that in some embodiments the one or more transducer units 100 and the one or more TDSMs 110 may be configured within a single physical package to simplify deployment of the system.

As shown for example in FIG. 1C, in some embodiments, providing distributed processing, such physical package may also include the control system 500 and additional elements (not specifically shown) such as memory and communication utilities and power supply unit that are not specifically shown here. In some other configuration, the physical unit (namely with the same package) may include the transducer unit 100, TDSM 110, microphone unit 120, power supply unit (not specifically shown), and a communication utility (not specifically shown) providing communication with a remote control system 500, which is configured to receive and process the sensory data selectively transmit the physical distributed unit data about audio communication sessions.

Thus, a line of sight determined by the orientation detection module 540 based on sensory data may typically be indicative to line of sight of a corresponding transducer unit 100. In some configurations of the invention, the orientation detection module may be configured to select a transducer unit 100 most suitable for transmitting selected acoustic signals to a recipient in accordance with determined location of the recipient's head/ears.

Additionally, gesture detection module 550 is generally configured and operable to receive input sensing data associated with one or more selected users, and to process and analyze the input data to detect user behavior/movement associated with one or more predetermined gestures defined to initiate one or more commands. In some embodiments, the gesture detection module 550 may also be configured for receiving and processing audio signals, which are received from the user(s) and collected by the microphone array 120, to detect one or more vocal gestures associates with one or more predetermined commands.

Generally, to provide hand free audio communication, as well as to provide hand free management and control of the system, the gesture detection module 550 of the control system 500 is configured and operable to be responsive to one or more predetermined gestures (movement and/or vocal) and to initiate one or more predetermined operation commands. Further in some embodiments, some of the operation commands may include one or more commands associated with external elements configured to receive suitable indication from the audio communication system of the invention. Such operation commands may for example include command for initiating in an audio communication session (e.g. telephone conversation with selected contact person), a request for notification based on one or more conditions, and any other predetermined command defined by the system and or user. Additionally, in some configuration, the gesture detection module may be used to detect one or more gestures associated with user identity. More specifically, one or more users may be each assigned with a unique gesture that allows the audio communication system to identify the user while simplify processing of input data.

Generally, the gesture detection module 550 may be configured and operable for receiving data about user location from the user detection module 520 and receiving sensing data associated with the same location from the one or more TDSMs 110, and/or from the microphone array 120. The gesture detection module 550 is further configured to process the input data to identify whether one or more predefined gestures are performed by the user. Upon detecting one or more gestures, the gesture detection module 550 operates to generate and transmit one or more corresponding commands to the sound processor utility 600 for performing one or more corresponding actions. In some embodiments, the received sound analyzer 560 is configured to receive and analyze input vocal commands from a user in combination with the gesture module 550. To achieve that the received sound analyzer 560 may include one or more natural language processing (NLP) modules which implement one or more language interpreting technique as generally known in the art, for deciphering of natural language user commands. More specifically, a user may provide vocal commands to the audio communication system while using natural language of choice. The received sound analyzer 560 may thus be configured and operable to separate/filter the user's voice from the surrounding sounds (e.g. optionally based on the location of the user of interest P as indicated above and/or based on the spectral content/color of the user's voice) and to analyze parts of the input vocal/voice data of the user (e.g. analyze the parts, which are indicated as vocal command(s) by the gesture detection module 550), to determine the actual commands the user P gives the system. Thus, this may be based on the free/natural language speech of the user and possibly also movement or other physical gestures of the user. In some additional embodiments, the received sound analyzer 560 may utilize one or more language processing techniques of a remote processing unit (e.g. cloud). To this end the control system 500 may transmit data indicative of the sound received by the audio input sensors 120 to a remote location for processing and receives analyzed data indicative of contents of the input signal.

In some configurations, the gesture detection module 550 may also be configured to operate as a wake-up module. In this case gesture detection module 550 is configured and operable to respond to communication session initiating command in the form of audible of movement gesture performed by a user. For example, such audible gesture may be configured to initiate a bilateral communication session directing a remote user (e.g. telephone conversation) in response to a keyword such as "CALL GEORGE", or any other contact name, to locate George's contact info in a corresponding memory utility and to access the input/output utility to initiate an external call to George or any other indicated contact person. It should also be noted that a contact person may be present at the same space at the time, being in a different or the same connected region of the space (i.e. within line of sight or not). In this case, a command such as "CALL DAD" may operate the user detection module 520 to locate users within the space and operate the face recognition module 530 to identify a user indicated as "Dad", e.g. with respect to the call requesting user, and to initiate a private bilateral communication session between the users. In such private bilateral communication session between two users, e.g. within different rooms, audio output of a first user is collected by a selected microphone array 120 of a first audio communication system 1000, where the first user is located within coverage zone of the first system 1000. The collected audio is transmitted electronically to a second audio communication system 1000 that operates to identify location of a second selected user (e.g. George, Dad) and to operate the corresponding selected transducer unit 100 to generate private audio signal around the ears of the second user. At the same time, audio generated by the second user is collected by the corresponding second audio communication system 1000 and transmitted similarly to be heard by the first user.

As indicated above, and illustrated in FIG. 1B, the system 1000 may be deployed in one or more connected spaces (such as in plurality of rooms of the apartment APT, and possibly also deployed in additional one or more disconnected/remote locations/spaces such as the vehicle VCL. Accordingly the system 1000 may be configured and operable for providing seamless communication between users regardless of physical distance between them. To this end, the remote locations (e.g. the apartment APT the vehicle VCL) may be connected to similar control systems (e.g. 500 and 500') and may use, or be connected with, a common management server 700 who forms external data/audio connection/communication between control systems (e.g. 500 and 500'). To this end, the management server 700 may be located remotely from one or more of the control systems connected thereto, and may include an audio session manager 570 which manages the audio sessions of the users while also tracking the locations of the users as they move between areas/spaces controlled by the different control systems, so as to seamlessly transfer the management and operation of the audio sessions to the respective control system 500 or 500' as the user enters the zone/space controlled thereby.

To this end, the management server 700 is actually connected to one or more end units, e.g. 200, 200', whereby each end units controls a certain one or more connected spaces (e.g. rooms) and manages the audio sessions of users within these spaces. Each such end unit may be configured and operable as described above with reference to FIGS. 1B and 1C and may typically include at least one of transducer array unit 100, TDSM unit 110 and microphone unit 120. The remote connection between the end units, e.g. 200, 200', and the management server 700 may utilize any known connection technique including, but not limited to, network connection, optical fiber optic, etc.

The one or more remote location may include one or more corresponding additional audio server unit providing sub-central processing scheme, a plurality of additional audio server units providing distributed management, or connected remotely to a single audio server unit to provide central management configuration. For example, the processing unit 500 may be connected to external server (cloud) where all of the users' locations are gathered. When, at a certain place, the user detection module 520 of the processing unit 500 recognizes a selected user, it reports to the external server 700 of its location, thus diverting all communications (internal or external) to that specific processing unit 500, to be directed to the selected user/recipient.

Also, as indicated above, the control/processing unit 500 may generally include an orientation detection module 540 configured to determined orientation of a user's head in accordance with input sensory data from the one or more TDSMs 110 and the 3D model of the sensing volume. The orientation detection module 540 is thus configured for determining orientation of at least one of the user's head or ear(s) with respect to location of the TDSM 110, and preferably with respect to the transducer unit 100. The orientation detection module 540 may thus generate an indication whether at least one of the at least one user's ears being within line of sight with the at least one transducer unit. Based on the determined location and orientation of the user's ears, the processing unit 500 may utilize a direction module, not specifically shown, configured for receiving data indicative of location and orientation of the user's head/ear(s) and processing the data in accordance with 3D model of the space to determine one or more optimized trajectories for sound transmission from one or more selected transducer units to the user's head/ear(s).

Generally, an optimized trajectory may be a direct line of sight from a selected transducer to the user's head/ear(s). However, when such direct line of sight does not exist, or exists but based on a transducer unit located at a relatively large distance with respect to other trajectories, reflection of acoustic signals or other techniques may be used. More specifically, when a direct line of sight between a transducer unit and the user's head/ears cannot be determined, the processing unit 500 may operate the sound processor utility 600 to direct the local sound region at a point within line of sight of the selected transducer unit 100, which is as close as possible to the user's ears.

It should be noted that generally the private sound region may be defined as a region where outside of it the sound intensity is reduced by, e.g. 30 dB, thus, the sound may still be noticeable at very close proximity to the selected region and enable the user to identify the sound and possibly move around to a better listening location.

Alternatively or additionally, in case an optimized trajectory in the form of a direct line of sight between a transducer unit 100 and the user's head P is not found, the sound processing utility 600 and more specifically the transducer selector module 620 thereof may operate to determine an indirect path between one of the transducers 100 to the user's head P. Such an indirect path may be include a direct path form the one or more of the transducers 100 to one or more acoustically reflective objects OBJ located in the vicinity of the user P. To this end the transducers selector 620 may receive the 3D model of the spaces monitored by the TDSMs which is generated by the pattern recognition engine/utility 515 and utilize that model to determine one or more objects OBJ which are located near the user (e.g. within a predetermined distance therefrom), and which may have sufficient acoustic reflectivity that can be exploited for indirect transmission of sounds to the user P. To this end, in some embodiments the pattern recognition module 515 also includes an object classifier (not specifically shown) that is configured and operable to classify recognized objects in to their respective types and associate each object type with a certain nominal acoustical reflection/absorbance parameters (e.g. acoustic spectrum of reflectance/absorbance/scattering) which typically depend on the structure and materials of the objects. Accordingly, in determining an indirect path (also referred to herein as a reflective-type trajectory) from a selected transducer unit to the user's head/ears, the transducer selector 620 may simulate/calculate the attenuation of the sound field (possibly calculate a per frequency attenuation profile) for each candidate path between a transducer 100—a reflective object OBJ—the user P. To this end, the transducer selector 620 may be configured and operable for employing any number of acoustic simulation/estimation techniques to estimate the acoustic field attenuation per each given candidate transducer 100 and candidate reflective object OBJ, based on the distance from the candidate transducer 100 to the object OBJ and from the object OBJ to the user (e.g. which may be indicated by the 3D model) and based on the acoustical reflection parameters of the object OBJ. A person of ordinary skill in the art would readily appreciate the various possible techniques which can be implemented by the transducers selector 620 to estimate the acoustic field attenuation associated with each indirect/reflection path to the user. Among the possibly several candidate indirect paths (possibly involving different transducers and/or different objects) the transducers selector 620 selects the path(s) having the least acoustic attenuation and/or the least distortive acoustic attenuation, and thereby selects one and possibly more than one transducers to be used for in direct transmission acoustic signal to the user P via reflection from the object(s) in the space. To this end, in case there is no short enough direct path between any of the transducers 100 to user P, the transducers selector 620 utilizes the 3D model of the space (region of interest) and to determine an indirect (reflection based) sound trajectory the includes a reflection from a surface of an object (e.g. wall) of an towards the hidden user's ear.

Since the reflection may cause reduction in acoustic intensity and greater spreading of the signal, a trajectory including a single reflection is typically preferred over greater number of reflections.

In case the one or more transducer units 100 is used to generate sonar-like sensing data for forming the 3D model, the model may also include certain indications about acoustic reflections from the surfaces. Accordingly the object classifier may utilize such sonar-like sensing data to determine the acoustic reflection properties of the objects in the space.

Figure 2A:
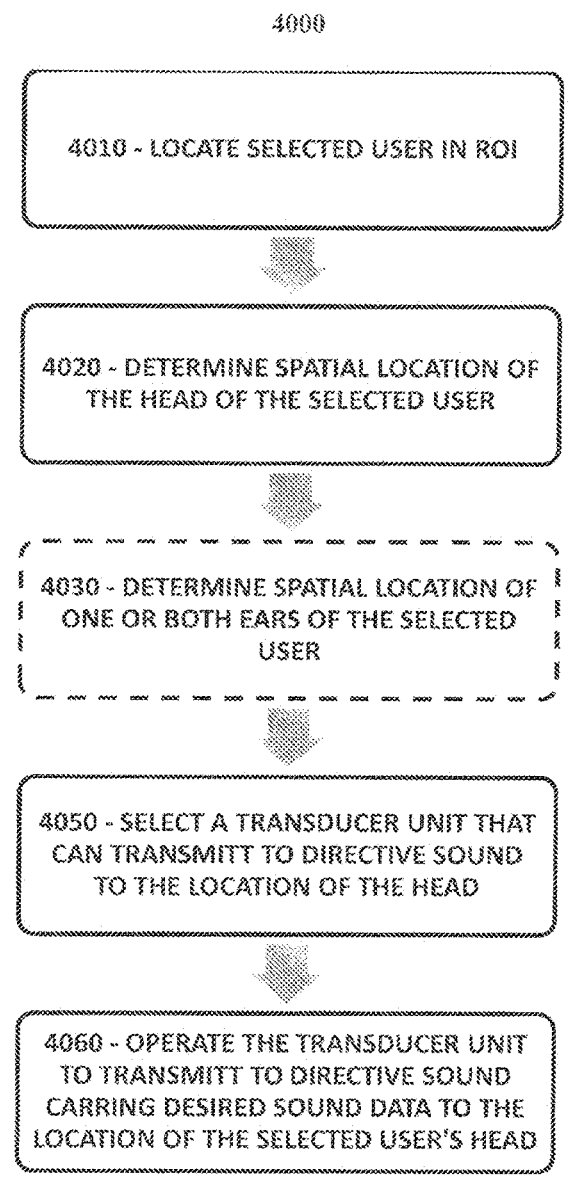
FIG. 2A is a flow chart showing a method carried out according to an embodiment of the present invention for transmitting localized (confined) sound field towards a user.
Figure 2B:
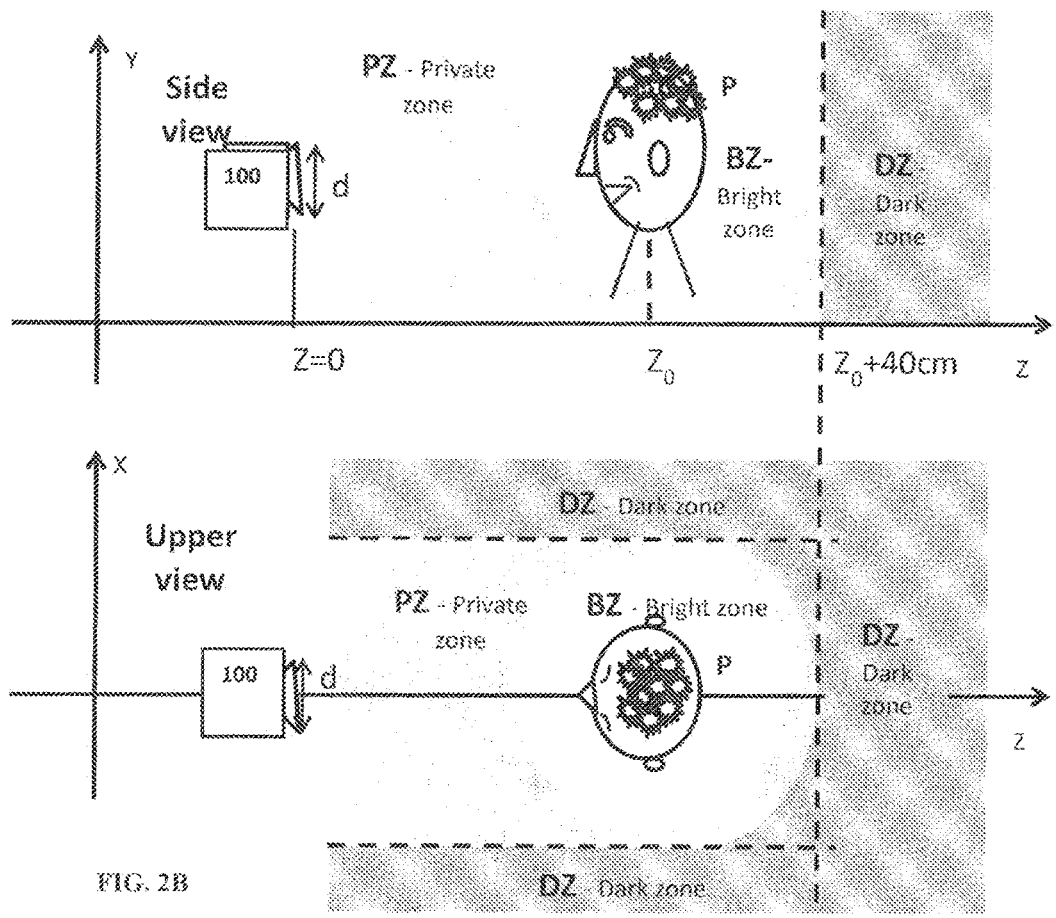
FIGS. 2B and 2C are schematic illustrations of a localized (confined) sound field generated in the vicinity of the user's head and ears respectively.

Reference is made now to FIGS. 2A and 2B, whereby FIG. 2A is a flow chart showing a method 4000 carried out according to an embodiments of the present invention for transmitting localized (confined) sound field towards the head of the user P, and FIG. 2B is a schematic illustration of the localized (confined sound field generated in the vicinity or the user's head). In operation 4010 the system, typically the user detection module 520 locate the users in the region of interest. In operation 4020 the face recognition module 530, identifies and locates the head of the user of interest (e.g. user P) within the region of interest. In operation 4050 the system. typically the transducer selector 620 determines/selects a suitable transducer unit 100 that can be used to transmit sound signals/field directly or indirectly towards the user's head so as to generate a localized confined sound field in the vicinity of (e.g. at least partially enclosing) the head of the user P. In operation 4060, the audio signal generator 630 is operated to generate operative sound encoding signals which can be used to operate the selected transducer 100 to transduce the localized/confined sound field in the vicinity of the user. To this end, in operation 4060 the sound from ultrasound (US) signal generator 632 is operated to determine the ultrasound content of the signals, which after non-linear interaction with the medium (e.g. the air) near the user, will generate/form an audible sound field that can be heard by the user. Also in operation 4060 the beam-former 634 is operated to generate the specific signals per each transducing element 105 of the selected transducer 100 such that the in accordance phase delays and the different spectral contend provided to each transducing element 105, one or more ultrasonic beams (typically two or more) of predetermined shape(s) and direction(s) will be transmitted by the selected transducer 100 towards the user, whereby the ultrasonic spectral contents of such beam is such that after interacting with the medium (e.g. air) in the vicinity of the user, they will create an audible sound field carrying the desired sound data to the user's ears. Accordingly the transducer array unit 100 is operated to generate, using phase array beam forming techniques, an acoustic beam of ultra sound frequencies.

As shown in FIG. 2B, this technique effectively creates an acoustic bright zone BZ in which the transmitted signals form audible sound field that can be heard by the user. The acoustic bright zone BZ is typically selected to be near the user's head (e.g. surrounding all or part of the user's head). The bright zone BZ is surrounded from its sides and back by dark zones DZ in which the transmitted signal may still form some audible acoustic wave, but with sound pressure level (SPL) which is sufficiently low so as not to be heard, or hardly heard, by the human ears. Accordingly the acoustic bright zone BZ actually defines a sound bubble region in which the audible acoustic field carrying desired sound data can be heard and out of which the acoustic field is not audible (e.g. as it is in the ultrasonic frequency band) and practically can't be heard. Indeed, in some implementation, there may also be generated a private zone PZ acoustic region which includes a certain region in between the bright zone and the transducer array unit 100 at which the ultrasonic acoustic waves form some level of audible sound. Typically, this private zone extends for a certain distance (e.g. in the range between few centimeters and few decimeters) from the user P towards the transducer 100. To this end it should be understood the zone behind the user (e.g. from the user to the direction away from the transducer 100) is a dark zone at which audible sound is not heard.

Additionally or alternatively, upon selection of the transducer unit 100 (e.g. any one of the transducers 100a to 100m) to be operated for transmitting the audio field to the user P, the transducer selector module 620 verifies that there are no other users in the propagation path of the audio field towards the specified user P (namely that there are no other users in the area between the selected transducer and the user P). In that case the audio level in the "dark zone" DZ between the selected transducer and the user is less importance, as long as its SPL is lower than the SPL in the bright zone BZ. Typically, indeed the SPL at this region is significantly lower than in the bright zone BZ. It should be noted that in case there are other users in the region between the selected transducer and the user P, then the transducer selector module 620 may select a different one of the transducers 100 for projecting the audio field to the user, and/or determines a reflective (indirect) propagation path for the audio field to the user (e.g. via reflections through OBJ).

Generally, it should be understood that when using the private audio technique of the present invention, the SPL outside the bright zone BZ (namely in the private and dark zones PZ and DZ surrounding the bright zone in any direction) is at least 20 db lower than the ZPL at the bright zone BZ.

FIG. 2B shows an example of generation of a confined sound field surrounding the user's head (e.g. the entire head of the user). However, in some implementations/embodiments of the system of the present invention, it is more preferable to generate a smaller sound bubbles (smaller localized audible sound fields) which are confined only at regions surrounding one or both of the user's ears, but not surrounding the entire head of the user P. This may have several advantages. For once, generating audible sound from ultrasound may generally not be highly energetically efficient. That is whereby large percentage of the energy is spent on generation of ultrasonic sound fields, only small percentage of the energy of the ultrasonic fields undergoes the non-linear interaction which converts them to audible sound. Therefore, in order to reduce the required power/energy for generating the desired audible sound field to the user, and accordingly possibly also reduce the complexity and cost of the transducers used, it is preferable to generate smaller localized audible sound field bubbles that are confined only near/about the user's ears. Additional advantage relates to the ability to provide the user with binaural (e.g. stereophonic) sound data which is generally possible when transmitting different sound content to the different ears. Yet additionally, generation of spatially extended confined sound bubbles (e.g. extending over several tens of centimeters so as to enclose the entire user head) with no/reduced distortions may in some cases be more complex (e.g. more computationally intensive and/or require larger number of transducer elements 105) than the generation of smaller sound bubbles (e.g. of only several centimeters to one or two decimeters) which are only confined about the user's ear(s). Therefore, for one or more of the above reasons it is in many cases preferable to generate smaller localized sound field only focused in the vicinity of the user's ear(s).

However, conventional face recognition and/or face features analysis techniques are generally incapable and/or are deficient in their ability to accurately, continuously and reliably identifying and determining the location of a user's ears. This may be due to several reasons: (i) the user ears may be hidden/partially behind/below his hair; (ii) the user may be viewed from its profile thereby hiding one of his ears; and/or (iii) some of the available techniques are also completely avoiding detecting of the users ears, possibly due to the complex 3D shape of the ear.

Figure 2C:
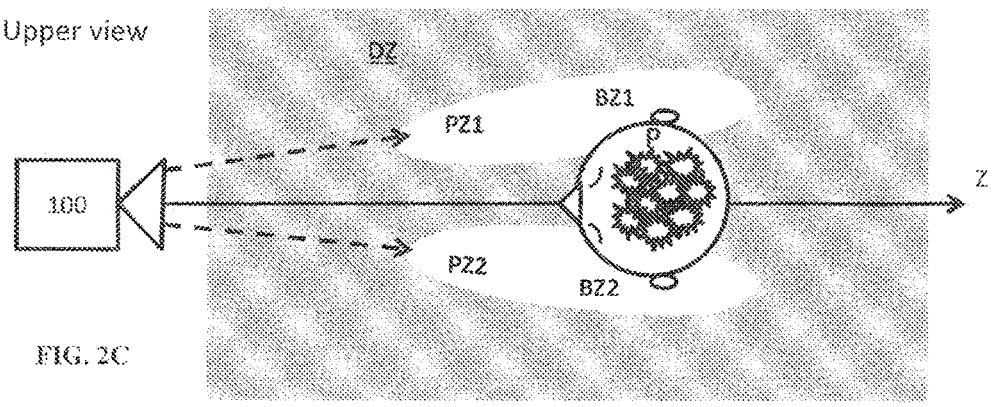

To this end, according some embodiments the method 4000 also includes operation 4030 which is carried out to determine the location of the ear(s) (one or both of the ears) of the user P so that a confined localized audible sound field, smaller than that required for the entire head, can be generated near one or both of the user's P ears. FIG. 2C is a schematic illustration showing in self-explanatory manner the smaller bright zones BZ1 and BZ2 of the confined audible sound (bubble), which are generated by the transducer 100 in the vicinity of the user's ears. As shown, outside these bright zones BZ1 and BZ2 there is dark zone at which audible sound cannot be practically heard. In some embodiments, optionally at a certain distance (e.g. of few decimeters) extending from the bright zones BZ1 and BZ2 to the transducer 100, there exists a so called private zones PZ1 and PZ2 at which audible sound can be heard but not clearly and/or with low intensity.

Thus, turning back to FIG. 1A, it should be noted that according to some embodiments of the present invention the output sound generator module 600 is adapted to operate the one or more transducer units 100 to transduce acoustic signals to be received/heard by one or both ears of the user P, and possibly of additional users. More specifically, the user detection module 520 detects the ear(s) of the user P in the manner described above, and the transducer selector 620 determines/selects the transducer(s) 100 by which sound should be transmitted to each one of the ear(s). As indicated above, the transducer selector 620 determines the propagation path (direct or indirect path) of the acoustic signals from the selected transducer(s) to the respective ear(s) of the user P towards which the acoustic signals should be transmitted by the selected transducer(s). Accordingly the sound from ultra-sound signal generator 632 and the beam-former 634 are configured and operable to generate signals for operating the selected transducer array(s) to transduce ultrasonic acoustic signals which when undergo non-linear interaction with the medium (e.g. air) in their propagation path towards the user, form very small audible sound bubble(s) in the vicinity of (e.g. surrounding) one or both of the user's P ears. To this end, the size of the audible sound bubble of each ear may be as small as few millimeters in diameter and may be typically in the range of few millimeters to few centimeters, so as not to surround the entire head of the user P The technique above allows the system 1000 to provide individual audible sound to each one of the user's P ears separately. This, in turn permits to privately transmit binaural sound to the user P. To this end, it should be understood that the same of different transducer(s) 100 may be selected (by the transducer selector 620) and operated to transmit the sound to the different ears of the user P. For example, different transducers 100 may be selected in case the right ear of the user is in the line of sight of one transducer (e.g. 100a) and the left ear is in the line of sight of another transducer (e.g. 100b). Accordingly, also the distance between the transducer(s) 100 and the left and right ears of the user may be different (e.g. this may be due to the difference in distance between the transducer(s) and the ears and/or as a results of the user of reflective propagation paths to one or both of the ears). Therefore, in such embodiments the may be a need to adjust the balance of the audible binaural sound provided to the user (namely properly adjust the balance between the right and left volumes of the audible sound bubbles the user hears). Indeed, transmission the sound to the left and right ears with the same intensity may yield unbalanced right-left audible sound to the user, due to the difference in the propagation paths between the respective transducer(s) and the right and left ears of the user P. Therefore, according to some embodiments, after the transducer selector 620 selects the respective one or more transducer(s) 100 that would be used to transmit sounds to the ears of the user P and after it determines their respective direct and/or indirect propagation paths to the respective ears, the transducer selector 620 further determines the attenuation levels of the transmitted acoustic signals/fields along the propagation paths to each ear of the user P. Accordingly, the transducer selector 620 provides the sound from ultrasound signal generator 632 with data indicative of the attenuation levels of the audible fields during their propagation to the user's ear(s). In turn the ultrasound signal generator 632 utilizes the received attenuation levels in order to adjust the transmission amplitudes of the ultrasound signals so as to obtain at least one of the following:

(1) maintain a predetermined a right-left balance (e.g. equalized balance and/or user-adjusted balance) between the volume of the audible sound heard by the right and left ears of the user P; and (2) provide the user with a timely continuous/smooth volume while the user may move through the space(s) covered by the system 1000 and while during this movement, different traducers may be switched to serving the user while being possibly at different distances from the user's ears.

Figure 3B:
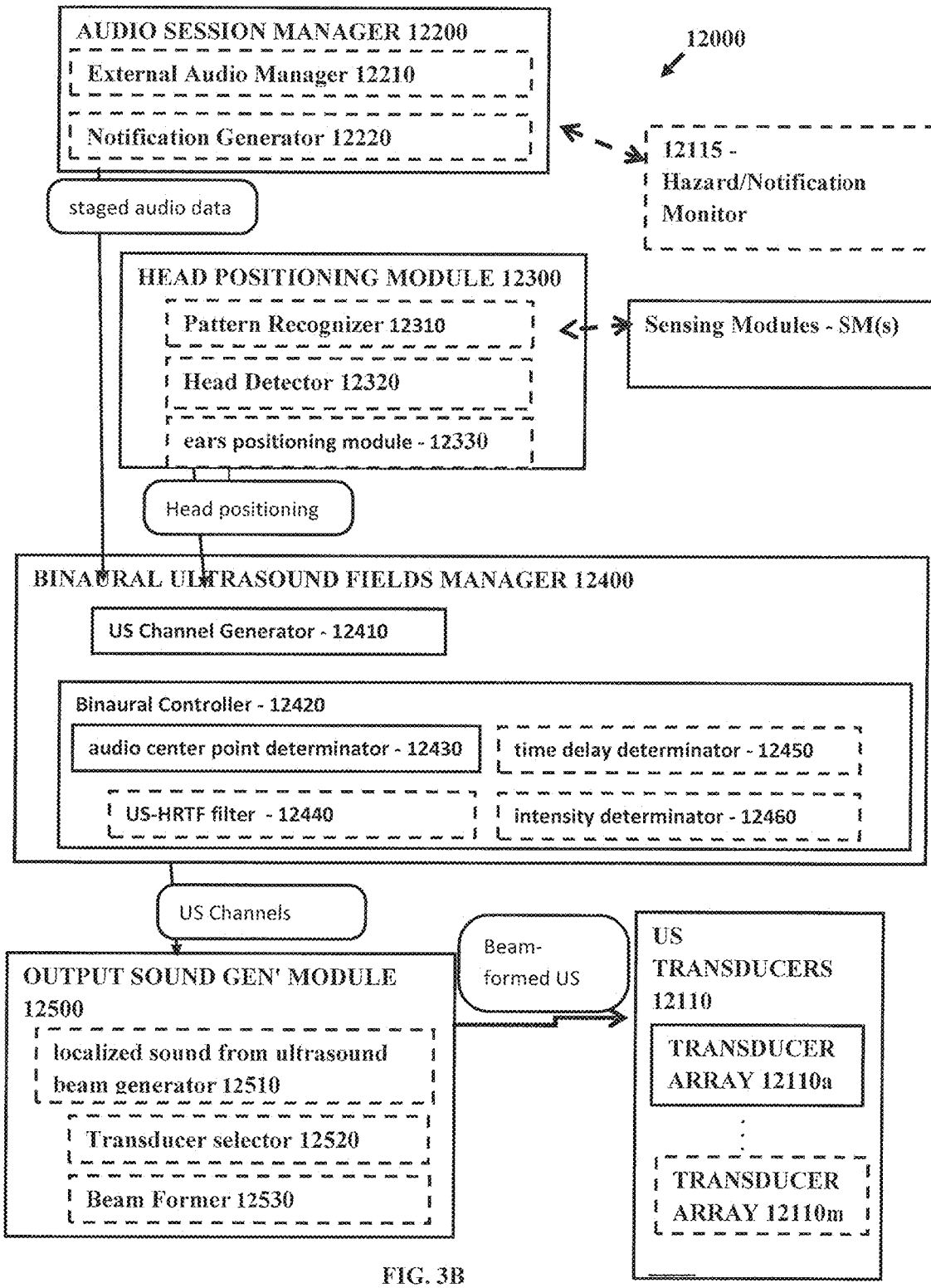

Reference is made together to FIGS. 3A and 3B. FIG. 3A is a flow chart schematically illustrating a method 11000 for producing a virtual 3D binaural audio space to be privately heard by a designated user. FIG. 3B is a block diagram of a system 12000 configured and operable according to the present invention for producing from a remote private virtual binaural audio space to the designated user.

In this regard, it should be understood that the phrase remote private binaural audio space is used herein to designate an audible binaural sound field which is provided to the user from a transducer remote to the user (the remote transducer may be located from a few decimeters to several meters from the user, and may dismiss/obviate a need for headphones) while being hearable (privately) by the user, and not being hearable/comprehendible to other persons that may surround the user. In this regard the audible sound is provided from a remote location, privately to the user, such that persons located at distances exceeding 50-60 CM from the user cannot hear/comprehend the audio heard by the user, while in some implementations the sound may even be not hearable/comprehendible to persons whose ears are located as close as 30-40 cm from the user's ears. In this connection, the term binaural audio space is used herein to designate an audio space emulating a 3D sound sensation by which the user/listener can identify the locations/directions of sources (virtual sources) from which various sounds appear to respectively arrive to the user.

The technique according to the present invention for producing and providing private binaural audible sound to the user from a remote (e.g. from remote ultrasound transducer(s)), is based on a novel technique for production of a localized audible sound field from ultrasound, at designated location(s) (audio center points) surrounding the user's head, whereby one or more parameters of the ultrasound fields/beams projected to the designated locations (e.g. the intensity and frequency contents of the ultrasound fields, the delay between ultrasound fields projected to different audio center points, and/or the locations of the audio center points themselves) are selected/adjusted, so that the user perceives a 3D binaural audio space composed of one or more audio data pieces that appear to arrive thereto from the respective directions of one or more virtual sources.

The method 11000 includes operation 11100 in which staged audio data is provided. The phrase staged audio data is used herein to designate data including audio data indicative of at least one audio data piece (e.g. an audio alert and/or a part of a musical creation such as a drums part and/or a guitar part of a song) and source position data which is indicative of the position of a virtual source of the audio data piece relative to a designated listener thereof. The staged audio data may generally include a plurality of data pieces with respective positions from which they should be perceived to be heard by the user (respective source positions). Accordingly, the staged audio data may be used to generate 3D binaural and/or surround sound providing the listener with a sense of the location of each instrument/person and/or alert he is hearing.

The method 11000 also includes operation 11200 in which head positioning data indicative of location and orientation of a head of a user designated to be the listener of the audio data, is determined. The head position and orientation within the space may be identified by utilizing for example one or more cameras and/or other sensing modules, referred to herein as sensing modules (SMs) (for instance including Imagers, LIDARs, echo-location and or other sensing modules or their combinations as known in the art) from which the 3D location of the user's head can be determined/estimated. More specifically, in determining the position (e.g. location and orientation of the user's head, at least one SM at a known position in the space may be required, and its output sensing data may be processed for example by utilizing/applying proper pattern/face/head recognition techniques to the sensing data to identify the location and orientation of the head relative to the SM(s). Accordingly the location of the head within the space can be determined relative to any other element/module that is located at a known position in this space (e.g. by utilizing proper coordinate transform).

Operation 11300 of method 11000 is directed to the production of audio modulated ultrasound channels (hereinafter ultrasound channels) each including one or more ultrasound beams whose frequency contents are selected for producing, via audible sound from ultrasound, audible sound fields corresponding to the audio data pieces.

The frequency content ultrasound fields are selected to produce audible sound field(s) (via sound from ultrasound effect occurring at selected location(s) (audio center points CP(s)). In this regard, a technique for producing the confined/localized audible sound fields via sound from ultrasound effect at desired locations is disclosed in PCT patent application publication WO 2014/076707, which is assigned to the assignee of the present application and incorporated herein by reference. This technique may be utilized by the method/system of the present invention for generating the localized audible sound field at desired audible center points.

Typically, per each virtual source or at least per each distinct direction/location of a virtual source relative to the user, at least one ultrasound channel (e.g. mono-ultrasound channel), and, in some embodiments, more a set of at least two ultrasound channels (e.g. left and right ultrasound channels) are produced at this stage, with ultrasound frequency content that is selected to produce the audible sound data piece associated with the virtual source and/or associated with all the virtual sources having a similar location or at least a similar direction relative to the user.

For example, in the embodiment of FIGS. 4A to 4D described below, a mono ultrasound channel per each virtual source location is generated and focused to a specifically selected audio center point in the space surrounding the user's head, such that during the propagation of the audible sound field generated at the selected audio center point towards the respective ears of the user, it interacts and is spectrally modulated by the user's head, and is thus perceived by the user as sound arriving form the location of the virtual source.

Alternatively, for example, in the embodiment of FIGS. 5A to 5C described below, two respective left and right ultrasound channels are generated, each designated to be focused at a respective one of the left and right ears of the user for producing the audible sound fields thereat. As will be described below, the spectral contents of these left and right ultrasound channels, as well as intensity difference and time delay between them, may be adjusted in order to simulate the head related transfer function of the head and the time delay and intensity difference of sounds arriving from the location of the virtual source.

To this end, in operation 11400 one or more parameters of the ultrasound field(s) are controlled/adjusted based on the position of the virtual source and the position (location and possibly also orientation) of the user's head, as indicated in the head positioning data. The one or more parameters are controlled in order to affect a difference between the respective left and right audible sound fields captured at the user's left and right ears such that the audible sound field is perceived by the user as if it propagates to the user from the position (at least from the direction) of the position of the virtual source and relative to the user's head while carrying the at least one audio data piece. As will be described in more detail below, the one or more controlled parameters may include the numbers and locations of the audible center points relative to the user's head; the frequency/spectral contents and intensities of the ultrasound field may be modified by an ultrasound-head-related-transfer function (US-HRTF), a time delay of the ultrasound fields/beams directed to different audible center points (in case of more than one audible center point) and/or any combination of the above parameters. This is described in more detail below with reference to FIGS. 4A to 6C.

In operation 11500 of method 11000, the one or more ultrasound channels are transmitted towards their respective audio center point(s) that are located in the vicinity of the user's head. Generally, as described below in more detail, each ultrasound channel is processed to form a set of ultrasound beams (typically more than one ultrasound beam) which are focused to one or more focal points at/near the audio center point of the ultrasound channel. Generally, at least one beam in the set of ultrasound beams of each ultrasound channel, referred to herein as a primary beam, is an audio modulated ultrasound beam which is transmitted via beamforming to be focused on the audio center point associated with the ultrasound channel. The frequency contents of the primary beam are selected to carry the audio information of the audio data piece(s) that is/are associated with the ultrasound channel. Accordingly, when focused to its respective audio center point, the ultrasound components of the primary beam are demodulated (e.g. via non-linear interaction with the air) to generate the audible sound field BZ carrying the audio data piece(s). Possibly, (see for instance the embodiment of FIGS. 5A to 5C), some spectral modifications are introduced in operation 11400 for emulating the interaction with the user's head of a sound field arriving from the direction of the virtual source. Alternatively or additionally, (see for instance the embodiment of FIGS. 4A to 4D) the location of the audio center point itself is selected/adjusted such that the generated sound field undergoes interaction with the user's head during its propagation from the audio center point to the user's ears, which affect its spectral content, such that it is perceived by the user as if it arrives from the direction of the virtual source. Yet alternatively or additionally, these two techniques may be combined, as illustrated for example in FIGS. 6A to 6C.

Typically, according to some embodiments the set of ultrasound beams of each ultrasound channel, included are one or more additional ultrasound beams, each of which may be audio modulated or not. These additional ultrasound beams, referred to herein as confining beams, are generally focused to somewhat different focal points than the audio center point, and are designed to directly or indirectly destructively interfere with the primary beam ultrasound field of the primary beam and/or with the audible sound field generated by the primary beam, in order to diminish the audible sound field of the primary beam at the focal points of the confining beams, thereby affecting a confined audible sound field in the vicinity of the audio center point to which the primary beam is focused. In this regard, the phrase direct interference is used herein to designate a case where the ultrasound spectral components of the confining beam interfere with the ultrasound components of the primary beams. The phrase indirect interference is used herein to designate cases where the confining beam is an audio modulated beam generating an audible field in its focal point, and wherein the spectral components of the audible field of the confining beam interfere (e.g. destructively) with the spectral components of the audible field generated by the primary beam. Thus, any or both types of direct-interference- and indirect-interference-confining beams may be used to confine the audible sound field generated by the primary beam(s). As indicated above, the confining beams are generally focused to distinct locations, other than the focal point (the audio center point) to the primary beam, so that the destructive interferences do not occur at the audio center point at designated locations surrounding it—thereby confining the audio field generated by the primary beam, but not destroying it.

Turning now to FIG. 3B, according to some embodiments of the present invention the system 12000 includes and audio session manager module 12200 that is configured and operable to provide staged audio, a head positioning module 12300 connectable to one or more sensors (sensing modules) SM (e.g. imagers, LIDARs and/or other sensors) and configured and operable for processing the sensor data to identify/determine positioning data indicative of the user's head (head positioning data); a binaural ultrasound fields manager 12400 configured and operable for generating ultrasound channels for transmitting one or more respective ultrasound fields towards one or more audio center points in the vicinity of the user's, to thereby produce, via sound from ultrasound effect, confined audible sound fields carrying binaural audible sound to the user's ears.

To this end the audio session manager 12300 is configured and operable to provide staged audio data indicative of at least one audio data piece and a position of a virtual source of the audio data piece relative to an expected listener of the audio data piece. Generally one or more (a plurality) of audio data pieces and the positions of their perspective virtual sources may be included/indicated in the staged audio data. The staged audio data may be a music piece including tunes of various musical instruments/singers with their respective relative positions on a stage, and/or it may include various alerts and the alleged locations/directions from which the alerts should be heard by a designated user.

More specifically, in some cases the staged audio data may include binaural recordings of a musical piece or other audio section. The binaural recording, by its definition, mimics the perception of audible sound fields by the two human ears, so that it is actually indicative of the collection of audio data pieces and their respective locations/sources in the space surrounding the designated listener. To this end the audio session manager 12200 may include an external audio input section/manager 12210 configured and operable for receiving the staged audio data from external sources (e.g. via network communication, signal reception, and/or from a memory module).

In some cases the staged audio data may include binaural notifications indicative of hazards and/or alerts and/or informative-notifications to be provided in an auditory form to the user together with directional information indicating the direction of the notification (alert/hazard). In this regard, both the audible notification as well as the information of its direction are provided to the user in audible form, by producing the binaural audio space perceived by the user. To this end the system may include an notification generator module 12220 connectable to an hazard notification monitor 12115 that monitors/receives inputs indicative of various alerts/hazards in the environment of the user and provides the notification generator module 12220 with data indicative of the type of the notification and its direction (e.g. the position of the virtual source from which the notification should be heard/perceived by the user). The notification generator module 220 then utilizes a suitable audio data piece associated with (indicative of) the respective notification to be provided to the user, and utilizes the respective direction to construct/provide the staged audio data including the notification and its direction/position.

Figure 3C:
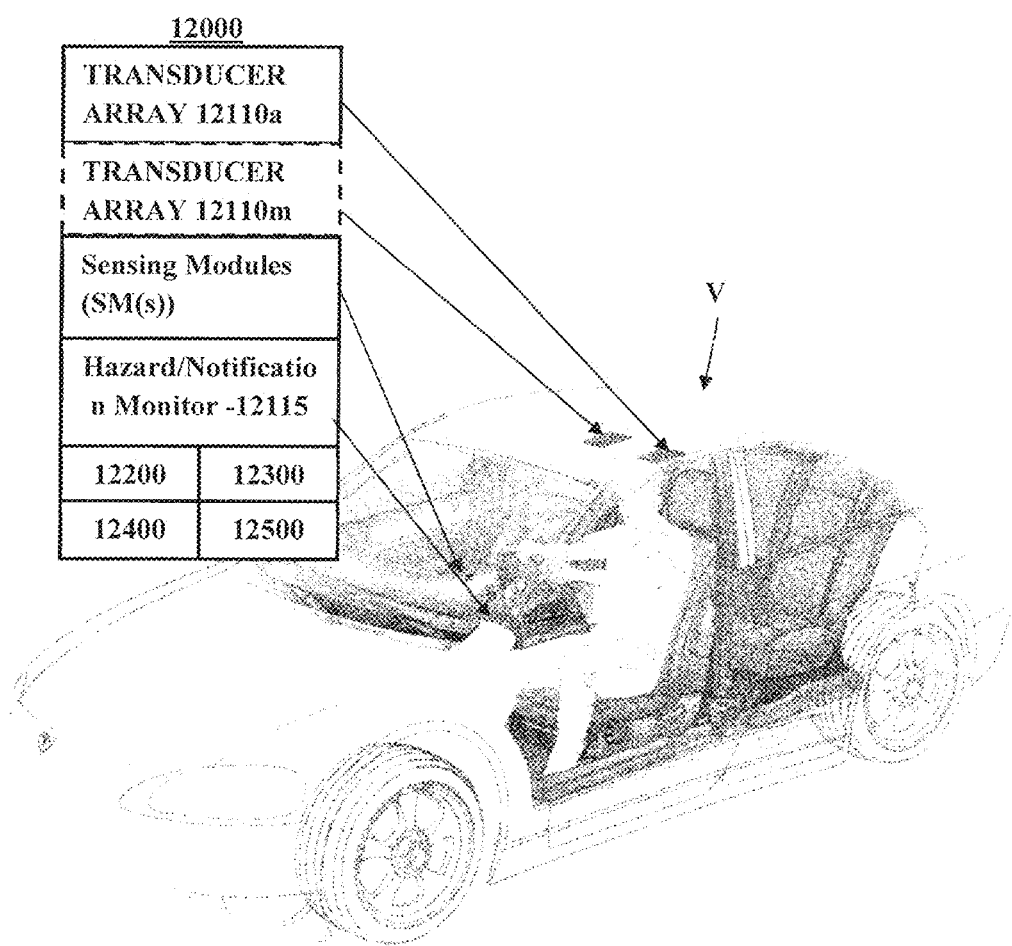
FIG. 3C schematically illustrates modules of the system 12000 of FIG. 3B incorporated in a vehicle and configured and operable for producing three dimensional audible hazard notifications privately heard by a driver of the vehicle.

In this regard, it should be noted that in some particular embodiments the system 12000 is configured and operable as a driver's alert system. As illustrated schematically in FIG. 3C, the system 12000 may be installed in a vehicle and may be adapted to provide the driver of the vehicle with binaural notifications about internal and/or external conditions/hazards in the vicinity of the vehicle, whereby the audio data piece used for each notification may be indicative of the type of hazard/condition about which the user/driver is notified, and the direction from which the binaural notification is perceived to be heard by the driver is instinctively indicative (to the driver) of the whereabouts/direction of the conditions/hazard about which he is being notified. An important advantage of the technique of the present invention over other audio notification techniques is that on the one hand the binaural notification is provided privately to the driver, without disturbing other persons/passengers in the vehicle, while on the other hand the driver needs not to wear earphones or the like which disturb his ability to hear external sounds and therefore, in most countries, are prohibited during driving. Moreover, as an aside, the system may further be used to allow the driver and/or possible other car passengers to conduct private phone calls without the rest of the passengers listening to the other party of the phone call, or hear music in private without disturbing the other passengers.

The head positioning module 12300 is connectable to one or more sensing modules SMs for receiving therefrom sensing data indicative of the location and possibly also the orientation of the user's head. The one or more sensing modules SMs, typically imagers/cameras or possibly other types of sensors (e.g. LIDARs or echo location sensors) are adapted to monitor the environment at which the user is to be located and provide data indicative thereof. The head positioning module 12300 may include pattern recognition module 12310 configured and operable according to any suitable technique (e.g. as generally known in the art), to output data indicative of recognized patterns and their position within the environment. The head position module may also include a head detection module 12320 configured and operable to process the recognized patterns to identify the head of the user among them, and thereby determine its position (e.g. at least its location, and possibly also its orientation) within the environment. Optionally, the head positioning module 12300 further includes an ears positioning module that is adapted to further process the recognized patter of the user's head to identify the locations of the user's left and right ears within the environment. Indeed, as will be appreciated from the description below, this is optional, since, according to some embodiments of the present invention, the binaural audible sound may be produced and provided to the user even in the absence of information about the location of the user's ears; e.g. see for instance the embodiment of FIGS. 4A to 4D described below). Nonetheless, in some other embodiments/implementations, the location of the user's ears is used to provide the binaural sound to the user, as described for instance below with reference to FIGS. 5A to 6C.

According to the present invention the system further includes a binaural ultrasound fields manager module 12400 configured and operable for processing the staged audio data and the head positioning data for generating signals of one or more ultrasound channels for projection of respective ultrasound fields to one or more audio center points in the perimeter of the user's head to thereby produce, via sound from ultrasound effect, audible sound from ultrasound in the vicinity of the users head (e.g. the audio center points should be located within a perimeter region surrounding the user's head and distanced therefrom by not more than 40 cm). As will be described in more detail below, the ultrasound channels are further processed by an output sound from ultrasound generator module 12500 to produce therefrom beam formed ultrasound channels that are specifically adapted for operation of one or more ultrasound transducers for producing from the ultrasound beam a confined audible sound which does not extend significant distance from the user's head, to thereby provide private binaural sound to the user. Turning back to the binaural ultrasound fields manager module 12400 it includes an ultrasound channel generator module 12410 that is adapted for generating the ultrasound channels with ultrasound frequency content selected for producing by the sound from ultrasound effect, the audible sound with the frequency content of the respective one or more audio data pieces of the staged audio data which should be encoded by each ultrasound channel. The required frequency content of the ultrasound channels for producing a given audible sound data piece is described for example in the PCT patent application publication No. WO 2014/076707 that is assigned to the assignee of the present application and incorporated herein by reference. Examples of techniques for producing ultrasound channels audio modulated with desired audible frequencies are described below with reference to FIGS. 7D and 7E. The ultrasound channel generator module 12410 may be for example configured and operable for implementing these techniques for producing the ultrasound channels audio modulated with the audio data pieces associated with one or more virtual sound sources.

It should be noted that generally the audible sound fields that are produced at the perimeter of the user's head by the ultrasound fields projected to the audio center points, affect (via propagation around and through the head) left and a right audible sound fields that are captured respectively by the user's ears. The left and the right audible sound fields captured by the user's respective ears may be similar or different. This depends on parameters of the ultrasound channels (fields generated thereby) such as the locations of the audio center points towards which the ultrasound fields are projected/focused, the intensity and spectral compositions of the ultrasound fields, as well as the time delays between them. To this end, as will be readily appreciated by those versed in the art of binaural sound, the difference between the left and right audible sound fields captured by the user's left and right ears respectively, affect how the user perceives the audio data pieces heard thereby—and specifically affect the direction from which the user perceives each audio data piece.

In view of the above, the inventors of the present invention have understood that control/adjustment of at least one of the above parameters of the ultrasound fields should be carried out in a manner providing the user with binaural audio via ultrasound, whereby the binaural audio is indicative of both the audio data pieces in the staged audio data and the locations/directions of the virtual sources from which each audio data piece is perceived.

Accordingly, the binaural ultrasound fields manager module 12400 includes a binaural controller 12420 configured and operable for controlling/adjusting one or more parameters of the ultrasound channels in accordance with the position of the virtual source(s) of the audio data pieces encoded in the ultrasound channels and in accordance with the head positioning data (according to at least the head position relative to the virtual source(s) and possibly also according to its orientation in the space). As described in more detail below, the control/adjustment of the one or more parameters of the ultrasound channels are made such as to affect a difference between the respective left and right audible sound fields such that the user perceives an audible sound field(s) propagating thereto user from the direction(s) of the virtual source(s) and carrying the one or more audio data piece(s) included in the staged audio data. Several techniques according to the present invention for adjusting the parameters of the ultrasound channels to produce the above described binaural effect are described in more detail in FIGS. 4A to 6C. These generally include one or more of the following: adjusting the locations of the audio center point(s) towards which the ultrasound fields are directed in a manner causing a perceived binaural sound effect (see for instance the description of FIGS. 4A to 4D below); adjusting the frequency contents (spectrum), intensity and time delay of different of the ultrasound channels in a manner causing a perceived binaural sound effect (see for instance the description of FIGS. 5A to 5C below); and a combination of these techniques (see for instance the description of FIGS. 6A to 6C below).

In some embodiments the system also includes an output sound from ultrasound generator module 12500 configured and operable to process the one or more ultrasound channels provided by the binaural ultrasound fields manager module 12400 for generating beam formed ultrasound channels for operating the ultrasound transducers to transmit one or more ultrasound fields towards the one or more selected audio center points.

More specifically according to some embodiments of the present invention the output sound from ultrasound generator module 12500 includes a localized sound from ultrasound beam generator 12510 that is configured and operable for processing each ultrasound channel of the ultrasound channels provided by the binaural ultrasound fields manager module 12400 to generate data indicative of one or more of ultrasound beams to be transmitted by one or more of transducer system 12110 towards the audio center point corresponding to the ultrasound channels. Generally, in accordance with the disclosure of in PCT patent application publication WO 2014/076707, in order to produce the confined/localize audible sound field at the desired audio center point, the localized sound from ultrasound beam generator 12510 produces, from the ultrasound channel, at least one audio modulated ultrasound beam whose frequency content includes at least two ultrasonic frequency components selected to produce audible sound after undergoing non-linear interaction in a non-linear medium, and one or more additional beams whose frequency contents phase and focal points are selected for causing destructive interference with the sound field at one or more regions surrounding the audio center point between said one or more surrounding beams, to thereby form a confined localized audible sound field in the vicinity of the audio center point. Also, the audio modulated ultrasound beam is focused to the audio center point and the additional beams are generally focused to different focal points in the surrounding region. In other words, the localized sound from ultrasound beam generator 12510 is adapted for processing each ultrasound channel in accordance with the designated audio center point at which audible sound from ultrasound is to be produced by the channel, and determine the directions/focal points and frequency content of one or more ultrasound beams to be produced from the frequency contents of the ultrasound channel, in order to generate the confined localized audible sound field in the vicinity of the audio center point of the channel.

For example, FIGS. 7A to 7C, which are described in more details below, exemplify a technique for processing the data/signals of an ultrasound channel to determine at least two ultrasound beams configured to produce a localized/confined sound field from ultrasound at a desired location (audio center point) in space. The localized sound from ultrasound beam generator 12510 may be for example configured and operable for implementing such techniques or other techniques (e.g. disclosed in WO 2014/076707) for proving parameters of ultrasound beams adapted to produce the confined audible sound from ultrasound at desired location.

To this end, the system 12000 may include or be connectable to one or more transducer systems 12110 (e.g. 12110a to 12110m) configured as phased array ultrasound transducers capable of transmitting ultrasound beams with the direction/focal points of the beams as determined by the localized sound from ultrasound beam generator 12510. Optionally, in case the system 12000 is connectable or includes a plurality of ultrasound transducers 12110a-12110m deployed in the space/environment of the user (e.g. in the vehicle illustrated in FIG. 3C), the system may also include a transducer selector module 12520 that is configured and operable for selecting/assigning a selected one of the transducer systems 12110a-12110m for generating the ultrasound fields/beams of each ultrasound channel. Generally, the transducer selector may include a data storage module storing mapping data indicative of the deployment positions of the transducer systems 12110 in the space surrounding the user. Then, based on the mapping data, the head positioning data, and the positions of the audio center points associated with each transducer channel or the focal points of each ultrasound beam constituent of the ultrasound channel, the transducer selector 12520 selects/assigns a selected transducer for generation of the ultrasound fields of each channel and/or more specifically, assigns a selected transducer system for generating each ultrasound beam constituent of the channel. In order to assign the selected transducer, the transducer selector 12520 processes the respective positions of the transducer systems (as provided by the mapping data), the respective position of the head, and the locations of the audio center points of the channel (e.g. and/or the focal points of the beams which are generally in proximity to the audio center point) to determine one transducer system from which there exists direct (un-obstructed) propagation paths of the ultrasound fields towards the audio center point (e.g. or towards the focal points in its vicinity). Thus, the selected transducer system should satisfy the condition that there is an unobstructed clear line of sight path between it and the audio center point of the ultrasound channel (where the user's head and/or other elements in the environment are not obstructing the line of sight between the selected transducer system and the respective audio center point of the ultrasound channel). In case more than one transducer satisfies this condition, the transducer selector 12520 may utilize other parameters such as the distance between the transducer systems and the respective audio center point, in order to select the selected transducer system among them.

The system 12000 also includes a beam forming module 12530 (beam former) configured and operable for processing the data indicative of one or more of ultrasound beams and generating beam-formed ultrasound channels comprising a set of phase shifted signals of one or more beams to be produced by one or more of the transducer systems 12110. More specifically, once a selected transducer system is assigned to each beam of the ultrasound channels (i.e. in case the selected transducers are assigned per channel, all the beams of that channel are produced by the same selected transducer), the beam forming module 12530 processes the data indicative of the ultrasound beam constituents of each ultrasound channel in accordance with the number of elements of the selected transducer system and their location, and generates a beam formed ultrasound channel including signals for actuating the selected transducer for generation of the constituent beams assigned thereto focused at their respective focal points (near the audio center point thereof). As will be appreciated by those versed in the art, beam forming can be implemented by various known techniques by introducing phase delays to the signals of the ultrasound channel arriving to different elements of the selected (phased array) transducer, so as to form the desired beams directed and/or focused to their respective focal points. Accordingly, the beam forming module 12530 may be configured and operable according to any suitable technique for generation, such beam formed ultrasound channels to be used for actuation of the phased array ultrasound transducer.

Figure 4A:
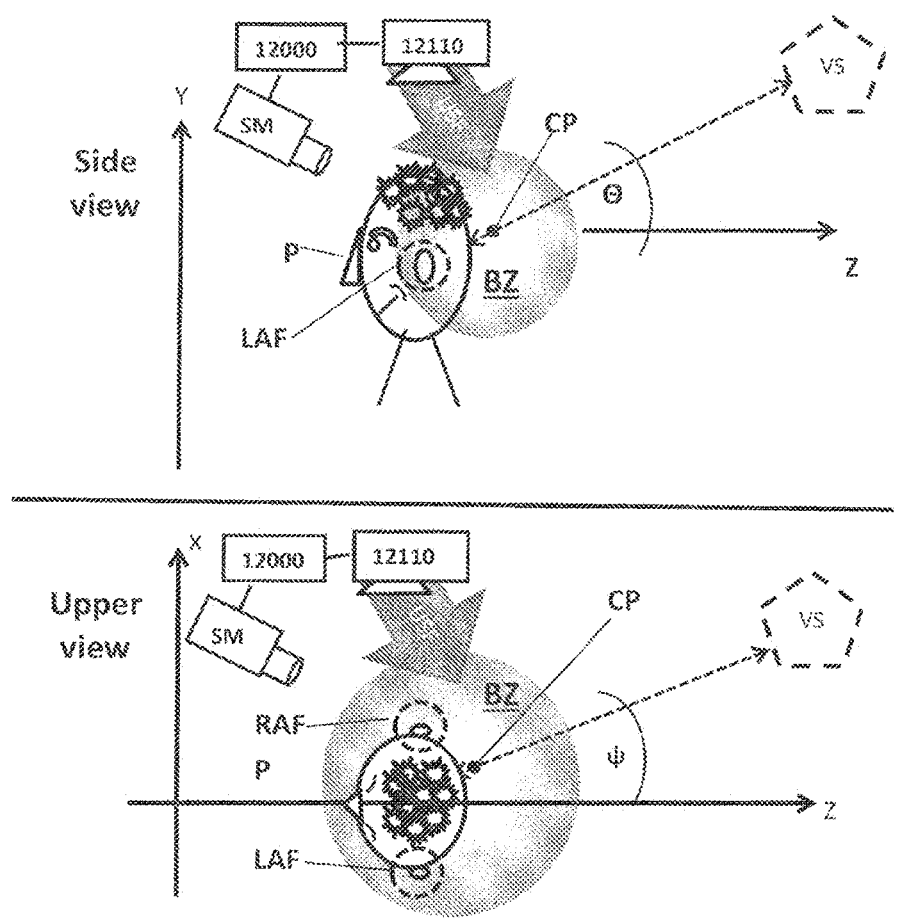
Figure 4C:
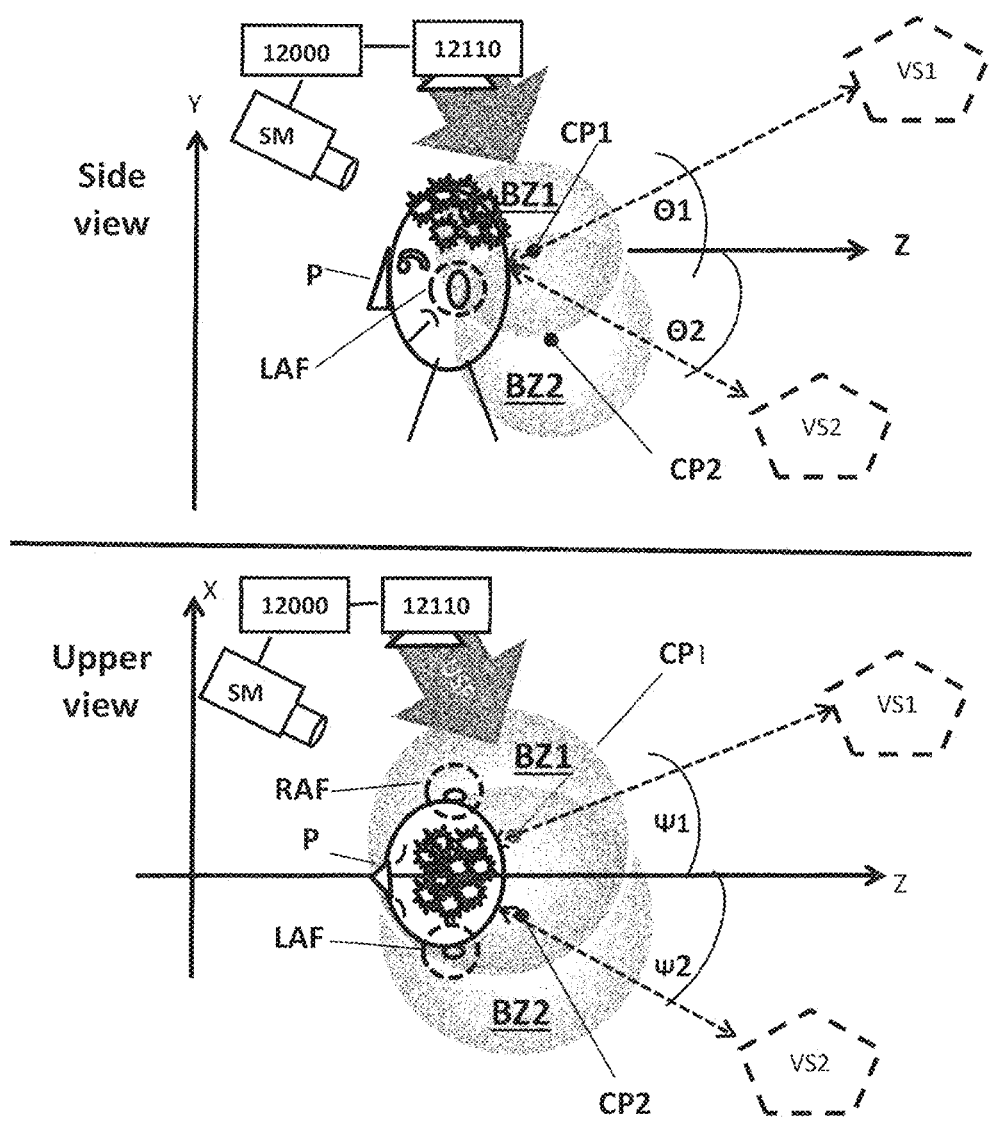
Figure 4D:
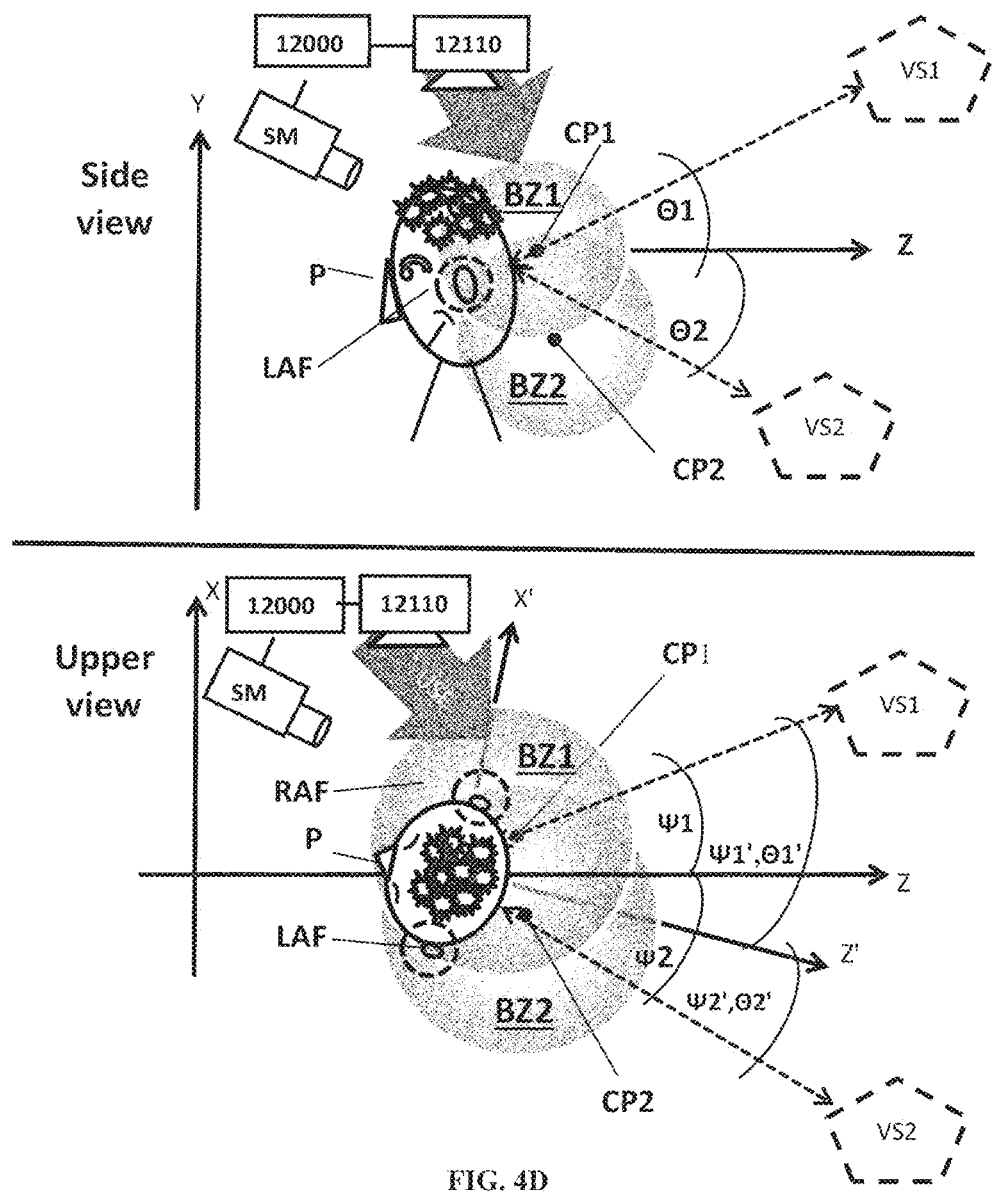

Reference is now made together to FIGS. 4A to 4D exemplifying the operation of system 12000 for providing a private binaural sound field to the user according to certain embodiments of the present invention. FIGS. 4A, 4C and 4D are schematic illustrations showing side and upper views of confined/localized audible sound fields (BZ, BZ1, BZ2) which are generated by the system 12000 at respective audio center points (CP, CP1, CP2). For example, the audible sound field BZ is generated to mimic sound arriving to the user from the direction $\{\psi,\Theta\}$ of a virtual source VS relative to the user. Here, $\psi$ and $\Theta$ are respectively the azimuth and the elevation angles of the virtual source VS as measured with respect to the Cartesian coordinates X, Y, and Z of the space surrounding the user P. FIG. 4B is a flow chart showing a method 1400A which is a specific implementation of operation 1400 of method 1000 according to an embodiment of the present invention that is implemented by the binaural ultrasound field manager 12400 for controlling parameter(s) of the ultrasound field(s) USF emanating from the transducer system(s) 12110 such that a difference between the left and right audible sound fields, LAF and RAF, is perceived by the user P as an audible sound field carrying the audio data piece from the position of the virtual source VS.

According to method 1400A in order to generate the binaural audible sound field to the user, the binaural ultrasound fields manager 12400 controls/adjusts the location(s) of the one or more selected audio center point(s) CP towards which the ultrasound field(s) USF are transmitted for producing thereat audible sound field BZ from the ultrasound USF. In this regard, the location(s) of the audio center point(s) CP are adjusted in accordance with the position of said virtual source relative to the location of said user's head P. In this regard, it should be noted that the method 11400A is based on the inventor's understanding assumption that proper positioning of the audio center points CP (at which the audible sound field BZ is produced), around the user's head P, has a significant effect on the left and right audible sound fields, LAF and RAF, captured by the user's left and right ears, due to interaction of the audible sound field BZ with the user's head P during its propagation from the center point(s) CP towards the left and right ears of the user. The interaction of the audible sound field with the user's head, so called a head related transfer function, affects both the spectral contents of the left and right audible sound fields, LAF and RAF, due to attenuation and/or amplification of certain frequencies of the generated audible sound field BZ due to its interaction with the user's head P during its propagation towards the left and right ears of the user, and may also affect a time delay and an intensity difference between the left and right audible sound fields LAF and RAF, due to a difference in the lengths of the acoustical trajectories along which the audible sound field BZ propagates towards the left and right ears of the user. Accordingly, in method 1400A the numbers and location(s) of the audible center point(s) are adjusted in order to provide the user with a sensation of sound arriving thereto from the direction of the virtual source.

For clarity, in the specific non-limiting example of FIG. 4A, only a single audio center point CP is selected for producing the audible sound field BZ and thereby the left and right audible sound fields, LAF and RAF, at the respective left and right ears of the user. Accordingly, in this example the ultrasound field(s) USF are directed/focused towards only a single audio center point CP whose location is specifically selected in accordance with the direction of the virtual source VS relative to the head P.

More specifically, method 11400A includes the following operations which are carried out by the audio center point determinator module 12430 of the binaural ultrasound fields manager 12400:

11410A—providing, for example from the head positioning module 12300, data indicative of the position of the user's head P and more specifically of its location (e.g. in the coordinate system X, Y and Z, of the space at which the user is located);

11420—determining/providing the azimuth and elevation $\{\psi,\Theta\}$ of the virtual source VS relative to the user's head P. Indeed, position data of the virtual source VS as provided in the staged audio data is generally indicative of the direction and/or position of the virtual source relative to the designated listener, being here the user P. Accordingly, the azimuth and elevation $\{\psi,\Theta\}$ may be extracted/determined from the staged audio data;

11430A—defining at least one audio center point CP located within a perimeter region surrounding said user's head by a distance not exceeding 40 cm and more preferably not exceeding 30 cm from the surface of the user's head P; and

11440A—adjusting the location of the at least one audio center point CP within the perimeter region in accordance with the direction $\{\psi,\Theta\}$ of the virtual source relative to the user (designated listener), such that the audible sound field BZ, generated via sound from ultrasound effect at the audio center point, undergoes acoustic interactions with the user's head P from the left and right audible sound fields LAF and RAF, at the user's ears, whereby the acoustic interaction mimics a head related transfer function (HRTF) applied by the user's head to sounds arriving thereto from the direction of the virtual source VS. In this regard, it should be noted that a distinction is being made here between the audible sound field BZ that is produced via the sound from ultrasound effect at the audio center point CP, and the left and right audible sound fields, LAF and RAF, which are formed by the propagation of the audible sound field BZ towards the location of the respective ears of the user P, while undergoing interaction with user's head along its paths towards the ears. These interactions affect corresponding spectral modifications, intensity modifications, and time delays, to the left and right audible sound fields, LAF and RAF which emulate the perceived position of the virtual source.

As indicated above, according to some embodiments of the present invention, in operation 11430A, per each virtual source (i.e. more specifically, per each distinct direction from which sound should be perceived by the user), only a single audio center point CP is defined at the perimeter region surrounding the head P. In other words, the system 12000, does not generate audible sound from ultrasound at any other location in the head perimeter, except the single audio center point CP. In such embodiments, in operation 11440A the location of the single audio center point CP within the perimeter of the head P is adjusted/set such that its nominal azimuth and elevation relative to the location of the head P matches the azimuth and elevation of the virtual source relative to the head P. In other words, the location of the single audio center point CP is set such that the head P, the single audio center point CP, and the location of the virtual source VS are all aligned along the common straight line.

It should be noted that in this implementation 11400A of the operation 11400 of method 11000, the binaural ultrasound fields manager 12400 (the audio center point determinator module 12430) may be configured and operable to maintain the positions of the single audio center point of each virtual source VS fixed under changes in an orientation of the user's head P. This is because the locations of the audio center point(s) (e.g. CP, CP1 and/or CP2) is/are determined in accordance with the direction $\{\psi,\Theta\}$ of the virtual source VS relative to the user/head P with respect to the reference frame of the space surrounding the user (e.g. the X, Y and Z Cartesian coordinates). Namely, the locations of the audio center point(s) do not depend on the direction $\{\psi',\Theta'\}$ of the virtual source relative to the head fixed reference frame (e.g. the X', Y' and Z' coordinates) but based on the direction/location of the virtual source VS relative to the location of the user's head and possibly irrespective of orientation of the user's head (e.g. irrespective of the specific locations of the user's ears).

This is illustrated for example in FIGS. 4C and 4D, in which two audio center points CP1 and CP2 are illustrated, each being associated with a respective virtual source VS1 and VS2 (e.g. each being the signal audio center point at which the audible sound field to be perceived as coming from its respective virtual source, is generated). As shown in these figures, the audio center points CP1 and CP2 remain fixed, while the user P rotates his head, or otherwise changes his head orientation (e.g. as long as the location of the head does not substantially change). Maintaining the position of the single audio center point fixed under changes in the head's orientation provides that the virtual source is perceived by the user to be at a fixed position relative to the user. However, it should be note that when the user translates his head (lateral translation, horizontal or vertical) the position of the single audio center point may be translated along with it so that it remains at about the similar angle/orientation relative to the head, thereby emulating the virtual source located at that orientation/angle. Indeed, when emulating a virtual source that is located at "infinite" distance (namely virtual source located at distance much larger than the extent of the head translation), the single audio center point is translated to the same extent of the head translation. However, when the head is translation is considerable relative to the distance of the virtual source, the angle from which the virtual source should be perceived changes when the head is translated and therefore in this case the position of the single audio center point although being translated, is translated to lesser extent then the head's translation.

Indeed, in this implementation, the distance between the single audio center point CP to the head P may be different than the virtual distance between the virtual source VS and the head P. Nonetheless, the fact that the single audio center point CP at which the audible sound field BZ is generated from the ultrasound, is at the same direction as the virtual source VS, resulting in left and right audio fields LAF and RAF, that are perceived by the user as sound arriving from the direction of the virtual source (e.g. due to the interaction of the audible sound field BZ with the head, and due to the time delay and intensity difference between the left and right audio fields LAF and RAF at the ears, which are caused by the propagation of the audible sound field BZ to the left and right ears, and which approximate the time delay and intensity difference of sounds arriving from the virtual source to the left and right ears.

To this end, method 11400A provides a simple technique for producing binaural sound to the user that mimics the sound arriving from the direction of the virtual source VS. In this regard, it should be noted that the single audio center point CP is defined per each direction relative to the user at which one or more virtual sources exist. For instance, in case the audio data includes one or more audio data pieces associated with one or more virtual sources that are located at the same direction relative to the user, the ultrasound fields USF carrying (modulated by) the one or more audio data pieces may be directed to the same single audio center point, for producing thereat the audible sound field with the audio data pieces, via sound from ultrasound effect.

However, as illustrated for example in FIGS. 4C and 4D, in case the audio data includes one or more audio data pieces associated with a plurality of virtual sources, e.g. VS1 and VS2 that are located at a plurality of different directions, e.g. $\{\psi 1, \Theta 1\}$ and $\{\psi 2, \Theta 2\}$, relative to the user P, the audio center point determinator module 12430 defines a corresponding plurality of audio center points, e.g. CP1 and CP2, within the head perimeter region, for instance a single audio center point located at each of the distinct directions (CP1 at the direction $\{\psi 1, \Theta 1\}$, and CP2 at the direction $\{\psi 2, \Theta 2\}$ relative to the head P. The ultrasound fields USF include ultrasound fields directed to the plurality of audio center points for respectively producing thereat the corresponding plurality of audible sound fields, e.g. BZ1 and BZ2, with audio data pieces that are associated with those directions of the respective audio center points, e.g. CP1 and CP2. For instance one of the ultrasound fields USF, being modulated with respective audio data piece(s) that are supposed to be heard from direction $\{\psi 1, \Theta 1\}$ is directed/focused to the audio center point CP1, which is located at that direction $\{\psi, \Theta 1\}$ relative to the head P, so that an audible sound field BZ1 carrying those respective audio data piece(s) is generated at the audio center point CP1. Accordingly, another one of the ultrasound fields USF, being modulated with other respective audio data piece(s) that are supposed to be heard from direction $\{\psi 2, \Theta 2\}$ is directed/focused to the audio center point CP2, which is located at that direction $\{\psi 2, \Theta 2\}$ relative to the head P, so that an audible sound field BZ2 carrying those other respective audio data piece(s) is generated at the audio center point CP2. To this end, in this case the left and right audible sound fields, LAF and RAF captured by the respective user's ears, are formed at a super position of the audible sound field BZ1 and BZ2 propagation to the ears from their respective audio center points CP1 and CP2, so the user P perceives the different audio data pieces as if they arrive/propagate from the respective directions $\{\psi 1, \Theta 1\}$ and $\{\psi 2, \Theta 2\}$ of the virtual sources VS1 and VS2 associated therewith.

It should be noted that in method 11400A, the binaural ultrasound fields manager 400, and more specifically the audio center point determinator module 12430, may set (control/adjust) the locations of the one or more audio center points irrespective of the orientation of the head relative to the virtual source. This provides that even under movement of the user's head, the user perceives the audio data pieces as if they arrive to him from a fixed location in space.

Figure 5A:
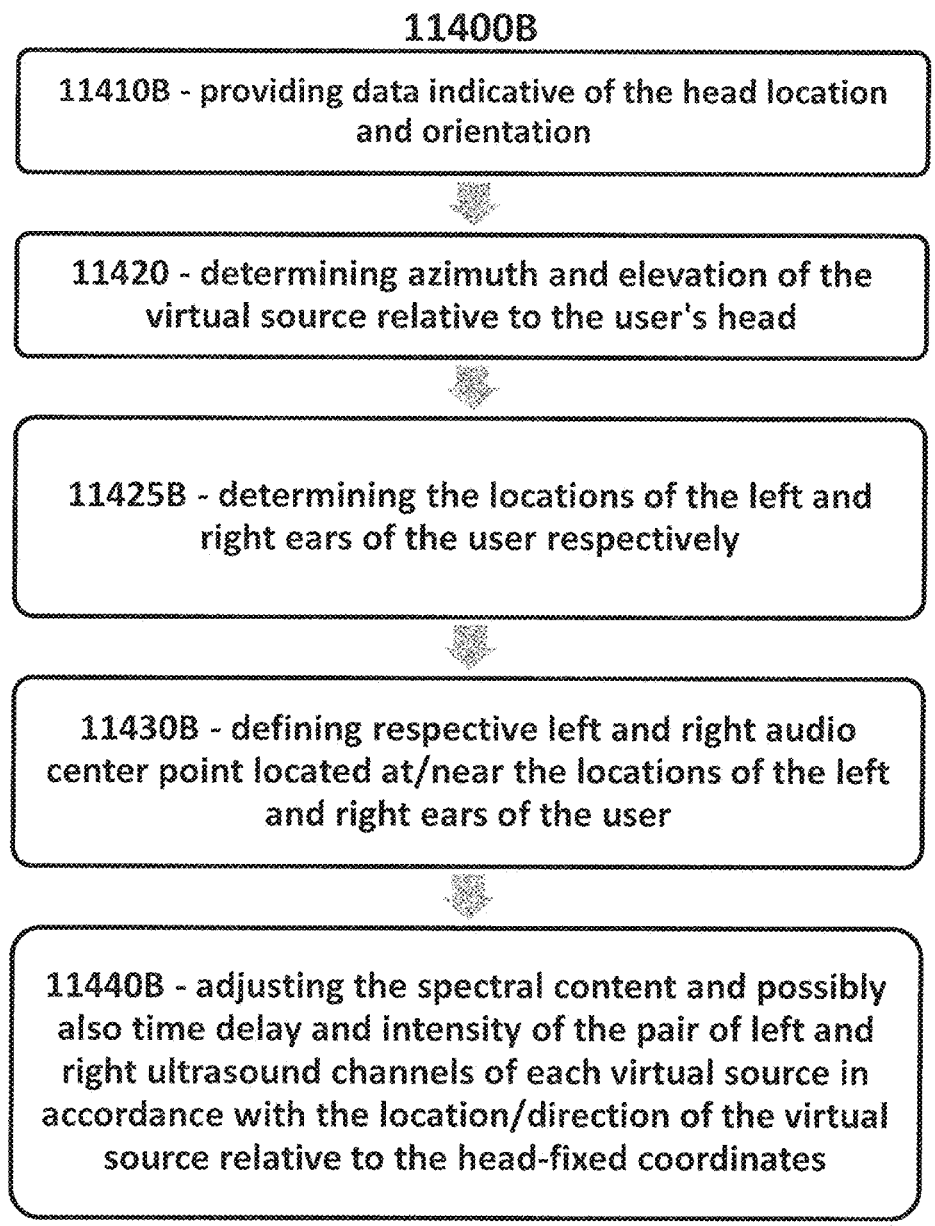
FIGS. 5A to 5C exemplify in more detail the operation of system 12000 and method 11000 according to certain embodiments of the present invention, in which respective ultrasound fields are projected towards left and right audio center points located near the user's left and right ears respectively, whereby at least spectral parameters of the left and right ultrasound fields are specifically adjusted such that left and right audible sound fields produced near the user's ears, emulate 3D binaural audio and are privately heard by the user.
Figure 5B:
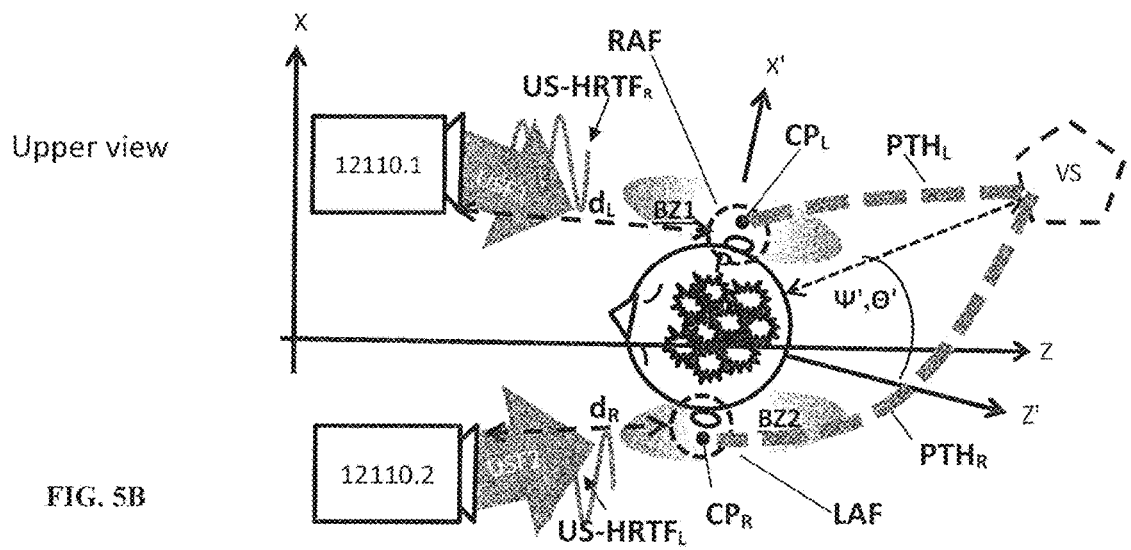
Figure 5C:
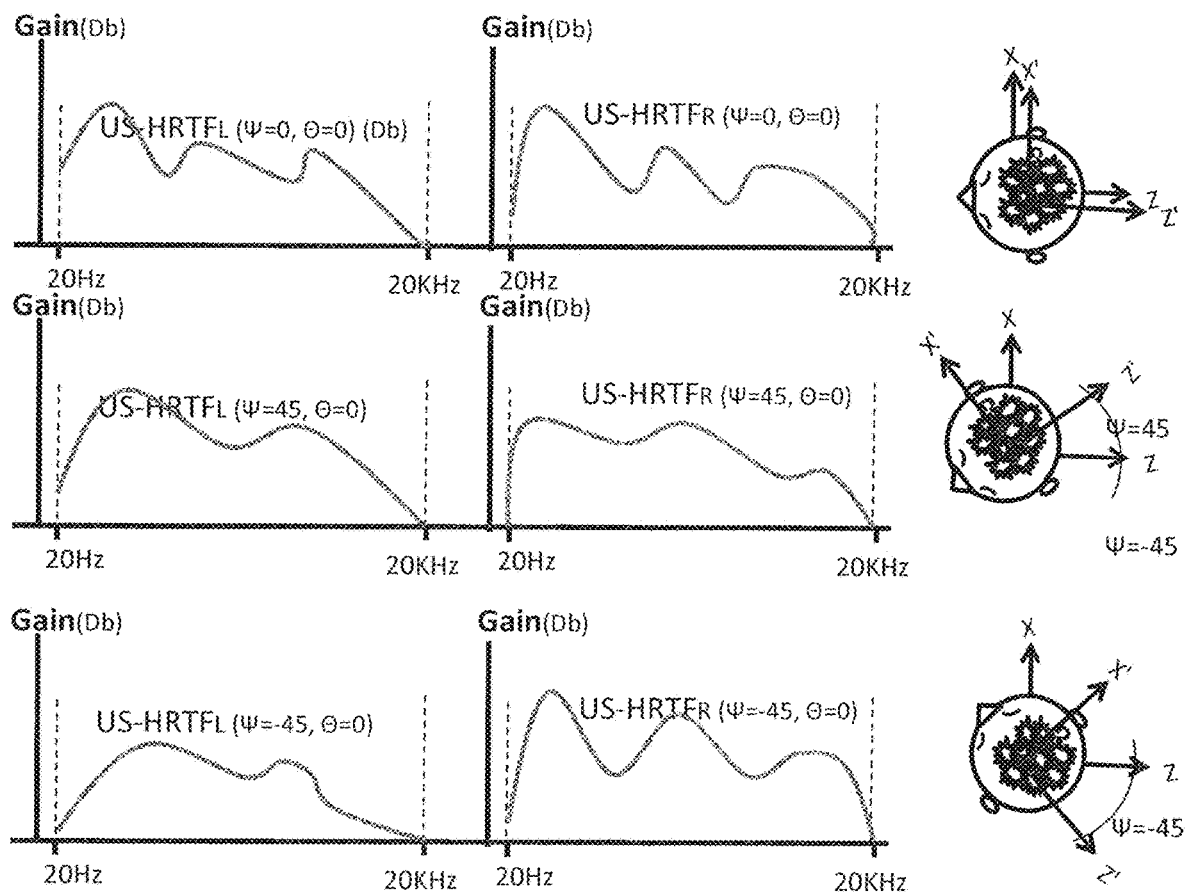

Reference is now made together to FIGS. 5A to 5C exemplifying the operation of system 12000 for providing private binaural sound field to the user according to another embodiment of the present invention. FIG. 5B is a schematic illustration showing upper view of confined/localized audible sound fields, BZ1 and BZ2, which are generated by the system 12000 at respective audio center point $CP_L$ and $CP_R$ located at the positions of the left and right ears of the user P respectively. FIG. 5A is a flow chart showing a method 11400B which is a specific implementation of operation 11400 of method 11000 according to this embodiment of the present invention being implemented by the binaural ultrasound field manager 12400. In this example, the audible sound fields BZ1 and BZ2, are generated at the ears locations and therefore present the actual right and left audible sound fields, RAF and LAF, which are perceived by the respective right and left ears. In this example the binaural ultrasound field manager 12400 applies an ultrasound head related transfer function to the ultrasound channels/fields that are associated with generation of the audible sound fields BZ1 and BZ2 so that the right and left audible sound fields, RAF and LAF (namely in this case the audible sound fields BZ1 and BZ2) mimic sound arriving to the user from the direction $\{\psi, \Theta\}$ of a virtual source VS. Here, as in the above, $\psi$ and $\Theta$ are respectively the azimuth and the elevation angles of the virtual source VS as measured with respect to the reference frame of the space surrounding the user P (e.g. the Cartesian coordinates X, Y, and Z). $\psi'$ and $\Theta'$ are respectively the azimuth and the elevation angles of the virtual source VS as measured with respect to the head fixed reference frame fixed to the user's head (hereinafter head fixed reference frame), e.g. the Cartesian coordinates X', Y', and Z').

Since in this embodiment the respective audio center points $CP_R$ and $CP_L$ are at (very close to) the right and left ears of the user, accordingly the right and left audible sound fields RAF and LAF heard by the user's right and left ears respectively are in this case actually similar to the respective audible sound from ultrasound fields (e.g. BZ1 and BZ2) which are generated at the audio center points $CP_R$ and $CP_L$.

Therefore, as will be described in more detail below, in this embodiment where the audible sound fields BZ1 and BZ2, are generated from the ultrasound fields USF1 and USF2 via sound from ultrasound effect taking place at the locations of the respective user's ears, the spectral content of the ultrasound fields USF1 and USF2 is modified by utilizing an ultrasound head related transfer function (US-HRTF) adjusting spectral contents of the left and right ultrasound fields USF2 and USF1, such that the modification to the spectral content of the audible sound fields BZ1/RAF and BZ2/LAF generated near the respective left and right ears is similar to the spectral modification which would have being occurred (due to interaction with the head) to audible sound actually arriving to the user's left and right ears from the location of the virtual source.

More specifically, method 11400B includes the following operations which are carried out by the binaural ultrasound fields manager 12400:

Operation 11410B includes providing data indicative of the position of the user's head P including both the location and also the orientation of the user's head determining the head fixed reference frame (coordinate system X', Y' and Z') relative to the coordinates/reference frame (e.g. X, Y and Z) of the space at which the user is located. Accordingly, utilizing the location of the virtual source in the space fixed coordinates and a transformation between the space fixed coordinates/reference-frame (e.g. X, Y and Z) and the head fixed coordinates/reference-frame (e.g. X', Y' and Z') {ψ', Θ'} the direction (e.g. azimuth and elevation) {ψ',Θ'} of the virtual source VS1 relative to the user's head and ears may be determined at this stage. This operation may be performed for example by the head positioning module 12300. As will be readily appreciated by those versed in the art of pattern/face recognition, according to various embodiments of the present invention determining/estimating the location and orientation of a person/user head may be achieved for example by applying proper pattern/face/head recognition techniques to sensory data (e.g. images) received from sensing modules SM such as imager(s) that are configured and operable to capture images of the user P.

Operation 11420 here may be similar to operation 11420 of method 11400A and includes determining/providing the azimuth and elevation {ψ,Θ} or alternatively {ψ',Θ'} of the virtual source VS relative to the user's head P.

Operation 11425B includes determining the locations of the respective left and right ears of the user. This operation may be performed by the optional ears positioning module 12330, which is illustrated in FIG. 3B. Generally the ears' positioning module 12330 processes the sensing data obtained from the sensing modules SM (e.g. images from the a camera) in order to estimate/determine the 3D locations of the user's ears within the space. To this end, the position of the user's head P and possibly also its orientation as obtained in operation 11410B above may be used/processed to facilitate determination of the locations of the user's ears. Alternatively or additionally, according to some embodiments, the ears positioning module 12330 may also be configured and operable for implementing this operation 11425B by carrying out the method 4000, described below with reference to FIG. 8. Method 4000 may be used in order accurately estimate the locations of the user's ears, even in cases where the one or both of the ears are covered or hidden from the perspective of the sensing modules.

Operation 11430B includes defining/selecting respective left and right audio center points $CP_L$ and $CP_R$ located at/near the locations of the left and right ears of the user, as determined in operation 11425B. This operation is generally performed by the binaural ultrasound fields manager 12400, e.g. by the audio center point determinator module 12430. According to this embodiment, the audio center point determinator module 12430 selects/defines the audio center points to include at least left audio center point CP2 in the vicinity of the user's left ear and right audio center point CP1 in the vicinity of the user's right ear. Preferably, the audio modulated ultrasound fields USF2 and USF1 are configured such that their confinement radius is small enough (e.g. in the order of, or smaller than, the head's radius along the lateral head axis X') so that distinct left and right audible sound fields LAF and RAF are generated via sound from ultrasound at the respective left and right audio center points $CP_L$ and $CP_R$. In this regard, the left and right audible sound fields LAF and RAF are distinct in the sense that the user does not substantially hear the left audible field LAF by his right ear and the right audible field RAF by his left ear.

More specifically, preferably the left and right audio center points $CP_L$ and $CP_R$ are selected such that they are located at a distance not exceeding a few centimeters from the respective ears (e.g. not exceeding 7 centimeters and more preferably not exceeding centimeters from the respective ears). Accordingly, the left and right audio center points $CP_L$ and $CP_R$ are therefore actually located within a perimeter region surrounding the user's head by a distance not exceeding 20 cm from the surface of the head. Moreover, preferably, the locations of the left and right audio center points $CP_L$ and $CP_R$ are selected such that they are symmetrically located relative to their respective ears. In this regard, it should be noted that in this embodiment the left and right audio center points $CP_L$ and $CP_R$ are actually located at the user's ears, and therefore in this embodiment operations 11425B and 11430B are carried out continuously during the operation of the system 12000 for monitoring the location of the user's ears, and accordingly adjusting the respective locations of the left and right audio center points $CP_L$ and $CP_R$, towards which the ultrasound fields USF2 and USF1 are directed by system 12000.

In operation 11440B, the parameters of two duplicate (pair) of ultrasound channels audio, modulated by the audio data piece(s) of each virtual source VS, or of at least each distinct direction {ψ',Θ'} at which sound from one or more virtual sources should be emulated, are adjusted in order to emulate the audible sound field produced thereby, so that the user perceives it as if it arrives from the specified direction {ψ',Θ'}.

To this end, as indicated above, in this embodiment per each virtual source, or at least per each direction relative to the user P from which one or more virtual sources should be perceived to be heard, at least two left and right ultrasound channels are produced, whereby one of the channels (e.g. USF1) is directed to the left ear, and one (e.g. USF2) to the right ear.

It should be noted that generally the reference numerals USF1 and USF2 in the figure actually present ultrasound fields, which may each include a plurality of ultrasound channels that encode audible data of a plurality of virtual sources possibly located at distinct directions.

However, in the non-limiting example of FIG. 5B, only one virtual source VS is shown, from which sound should be perceived. Therefore the contents of the ultrasound fields USF1 and USF2 correspond to the ultrasound channels of that virtual source. Accordingly, for clarity, in the following description the ultrasound fields USF1 and USF2 are considered to be corresponding representatives of the pair of ultrasound channels that encode the audio data piece of the virtual source VS to the two ears, and are therefore referred to as interchangeable channels or fields. Nonetheless it should be understood that the term ultrasound channels is used herein to indicate electronic/digital channels encoding the data/signal that should be used for producing the ultrasound fields, and that the ultrasound fields themselves are actual sound fields which are transduced from the ultrasound channels (e.g. after appropriate processing confinement and beamforming of the ultrasound channels). To this end, it should be understood that in case of several virtual sources at different directions, the ultrasound fields USF1 and USF2 might each be formed by the plurality of ultrasound channels associated with the plurality of different virtual sources.

Thus, operation 11440B includes controlling at least one parameter of the ultrasound channels USF1 and USF2 whereby the controlled parameter is selected to produce at the left and right audio center points $CP_L$ and $CP_R$, near the right and left ears, audible sound fields BZ1/RAF and BZ2/LAF that emulate audible sound arriving to the user from the location of the virtual source VS. To this end, in this embodiment of FIGS. 5A to 5C, per each virtual source, or at least per each distinct direction of a virtual source, at least two, left and right, ultrasound channels are produced in operation 1300 described above.

In this example the following parameters of the pair of ultrasound channels USF1 and USF2 are controlled:

(i) The audio center point determinator 12430 sets the audio center points of the ultrasound channels USF1 and USF2 are respectively set/defined at the left and right audio center points $CP_L$ and $CP_R$, which are respectively located at the user's left and right ears. Accordingly, the ultrasound channels USF1 and USF2 are associated with production of distinct audible sound heard by the left and right ears of the user;

(ii) The US-HRTF filter 12440 adjusts/controls the spectral content of the left and right ultrasound channels USF1 and USF2 to emulate the spectral modification that is applied to sounds arriving from the virtual source VS to the left and right ears of the user due to interaction of the sound fields with the user's head P;

(iii) Optionally, the time delay determinator 12450 introduces time delays to the left and right channels ultrasound channels USF1 and USF2. Generally the time delays $\Delta T_L$ and $\Delta T_R$ of the left and right ultrasound channels depend on the lengths of the respective sound propagation paths $PTH_L$ and $PTH_R$ from the virtual source VS to the respective left and right ears of the user P divided by the speed of sound C. The binaural ultrasound fields manager 12400 (e.g. time delay determinator 12450) utilizes the location of the ears determined in operation 11425B and the location of the virtual source to estimate the propagation paths $PTH_L$ and $PTH_R$. In this regard, in case of only one virtual source, only the difference $\Delta T_L - \Delta T_R$ of the time delays $\Delta T_L$ and $\Delta T_R$ may be introduced to one of the pair of ultrasound channels (e.g. to USF1 in this case).

(iv) Optionally, the intensity determinator 12460 adjusts the respective intensities (or the relative intensities) of the left and right ultrasound channels USF1 and USF2 according to the lengths of the respective sound propagation paths $PTH_L$ and $PTH_R$. Indeed, the intensity of audible sound decays according to the $1/D^2$ law, where D is the length of the propagation path. To this end, the intensities of the left and right ultrasound channels USF1 and USF2 are adjusted such that gain levels of the respective audible fields LAF and RAF produced by the ultrasound channels near the left and right ears are proportional to $1/D_L$ and $1/D_R$ respectively. This is achieved by adjusting the intensities of the ultrasound channels USF1 and USF2 by taking into account also the distances $d_L$ and $d_R$ between the respective left and right ears and the ultrasound transducer(s) (in this non-limiting example transducers 12110.1 and 12110.2) that produce the respective ultrasound channels/fields USF1 and USF2 towards the left and right ears. More specifically, the intensities of the ultrasound channels USF1 and USF2 are adjusted as follows: the sound piece data is scaled by $1/D_L$ and $1/D_R$ for the left and right channels respectively, and the resulting USF data is corrected to account for $d_L$ and $d_R$, e.g. by applying a gain correction of $d_R/d_L$ to the left channel. It should be noted that preferably the binaural ultrasound fields manager 12400 (the intensity determinator 12460) is configured and operable to adjust intensities of the ultrasound fields USF1 and USF2 such that the intensities $I_L$ and $I_R$ of the audible sound fields generated therefrom are above auditory level only within a maximal radius not exceeding a range of 25-50 CM from the audio center points $CP_L$ and $CP_R$. This thereby provides private virtual binaural audio space to said user.

The operation 11440B may be carried out entirely or at least partially by the US-HRTF filter module 12440 that is shown in FIG. 3B. The parameters, and particularly the spectral contents of the left and right ultrasound channels, are respectively controlled for emulating interaction of the head with sound arriving from the direction virtual source towards the left and right ears.

This is achieved by applying selected, left and right, ultrasound-head-related-transfer-functions (US-HRTF) to each of the left and right ultrasound channels. The US-HRTF is generally a spectral filtration function which receives, as a parameter, the direction of the virtual source relative to the head (in the head fixed coordinates) and ultrasound-head-related-transfer-functions. Generally two, typically different (except in cases where the virtual source is located symmetrically with respect to the head) left and right ultrasound-head-related-transfer-functions are applied to the left and right ultrasound channel. Specifically, a right ultrasound-head-related-transfer-function, US-$HRTF_R(\psi',\Theta')$ is applied to the right ultrasound channel and a left ultrasound-head-related-transfer-function US-$HRTF_L(\psi',\Theta')$ is applied to the left ultrasound channel. The spectral modification of the ultrasound-head-related-transfer-functions US-HRTFs is generally dependent on the parameters $\psi',\Theta'$ associated with the direction of the virtual source relative to the head, and possibly also depends on parameters of the head.

Optionally, according to some embodiments, the ultrasound-head-related-transfer-functions also receive parameters associated with the shape of the user's head (e.g. size ($S_Z$) and/or width (W) and/or height (H) and/or depth (D) of the head P. The latter parameters are determined according to some embodiments of the present invention by the optional ears positioning module 12330 which is configured and operable to process the data from the sensing modules to determine properties of the head. To this end, the ultrasound-head-related-transfer-functions are in some cases functions receiving the following parameters: $HRTF_R(\psi',\Theta',W,H,D)$.

FIG. 5C is a graphical illustration exemplifying schematically the eventual effect of the right and left ultrasound-head-related-transfer-function US-HRTF$_R(\psi',\Theta')$ and US-HRTF$_L(\psi',\Theta')$ on the right and left audible sound fields, BZ1/RAF and BZ2/LAF. It should be noted that the graphs illustrated in this figures are schematic graphs presented on logarithmic frequency and gain axes (the x and y axes of the graphs respectively). Six graphs are illustrated exemplifying the eventual effect of the right and left US-HRTFs US-HRTF$_R(\psi',\Theta')$ and US-HRTF$_L(\psi',\Theta')$ on the audible sound fields produced at the ears (at center points CP$_R$ and CP$_L$) when the virtual source is at a different direction $\psi',\Theta'$ relative to the head (in the head fixed coordinates). Particularly, in this example the audible effects of the right and left ultrasound-head-related-transfer-function US-HRTF$_R(\psi',\Theta')$ and US-HRTF$_L$ are shown for different azimuths: $\psi'=0$, $\psi'=45$, and $\psi'=-45$. As shown, the left and right US-HRTF US-HRTF$_L(\psi',\Theta')$=US-HRTF$_R(-\psi',\Theta')$ are opposite with respect to the azimuth of the virtual source relative to the head/fixed coordinates. More specifically, typically (except for specifically US-HRTFs designed for substantially non symmetric heads) US-HRTF$_L(\psi',\Theta')$=US-HRTF$_R(-\psi',\Theta')$— whereby US-HRTF$_L$ and US-HRTF$_R$ are respectively the left and right US-HRTFs applied to the left and right ultrasound channels.

The US-HRTF filter 12440 is designed to affect the ultrasound spectrum of the corresponding ultrasound channel to which it is applied so as to amplify and/or attenuate certain frequencies of the demodulated audio field generated therefrom, in accordance with the expected interaction of an actual audio arriving from the direction of the virtual source with the head. It should be understood that the US-HRTF filter (namely the ultrasound-head-related-transfer-functions) may be configured and operable for modifying the audio data pieces themselves (e.g. in the manner illustrated in FIG. 5B). In this case, the ultrasound-head-related-transfer-functions operate in the audible spectral regime, and, after their operations, the modified audio data pieces are converted to the ultrasound channel (for example in the manner described below with reference to FIG. 7D or 7E and/or as described in WO 2014/076707). Alternatively or additionally, the US-HRTF filter 12440 may be configured and operable for modifying the ultrasound spectrum of the ultrasound channels already formed from the audio data pieces, in order to obtain the desired spectral modification of the audible sound fields that are produced from the channels (e.g. in the same manner illustrated schematically in FIG. 5B).

Thus, in the embodiment of FIGS. 5A to 5C, the ultrasound fields USF1 and USF2 are directed to the audio center points CP$_L$ and CP$_R$ whose locations are fixed relative to the left and right ears of the user P, even when the user rotates/shakes/nods his head. US-HRTF filter/function provides orientation dependent spectral modification that is adjusted respectively for the left and right ultrasound channels/fields USF1 and USF2 ears in accordance with the orientation/direction $\{\psi',\Theta'\}$ of the virtual source VS relative to the head-fixed coordinates, which affect the difference auditory perception of the left and right ears. Therefore, in this embodiment the system continuously monitors the ordination of the user's head and the estimated location of the left and right ears, and changes both the locations of the audio center points CP$_L$ and CP$_R$ according to the locations of the respective left and right ears, as well as the spectral modifications provided by the HRTF filter to the different ultrasound fields. The left and right HRTF filter/functions of generally different parameters (e.g. with different direction parameters $\{\psi',\Theta'\}$ are applied to different pairs of left and right audio modulated ultrasound channels that are associated with a virtual source of distinct directions. Accordingly, the frequency contents of each ultrasound channel are modified, based on the direction of the virtual source associated therewith and the left/right ear to which they should be directed. Then, after the filter is applied, the plurality of ultrasound channels associated with the same ear (left ear channels and right ear channels) and possibly with different directions of their virtual sources, are grouped together and processed further processed by the output sound generator module to produce the ultrasound fields USF1 and USF2.

To this end, as indicated above, in this example, in cases where only one virtual source is emulated, was exemplified. Therefore, the ultrasound fields USF1 and USF2 and the ultrasound channels were considered as corresponding to each other. However in general, each of the ultrasound fields USF1 and USF2 (which corresponds to production of audible sound field at a distinct audio center point) is produced from the one or from a plurality of ultrasound channels associated with possibly different virtual sources located at different directions with respect to the user.

Figure 6A:
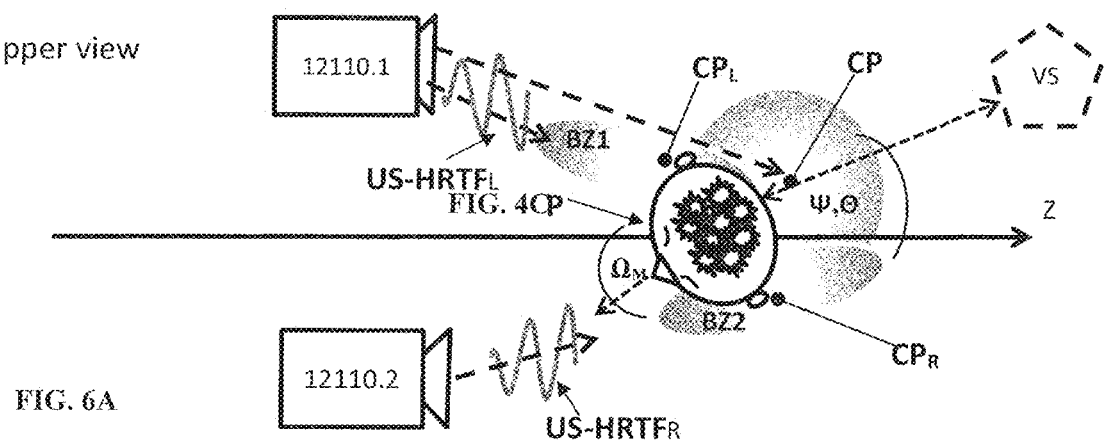
FIGS. 6A to 6C exemplify in more detail the operation of system 12000 and method 11000 according to certain embodiments of the present invention, in which the techniques illustrated in FIGS. 4A to 4D and FIGS. 5A to 5C are combined.
Figure 6B:
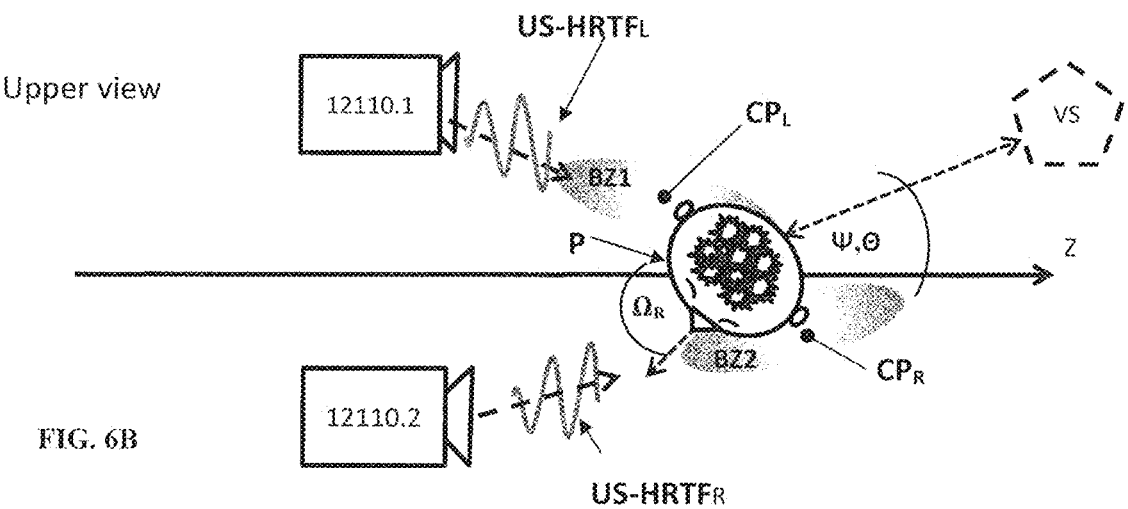
Figure 6C:
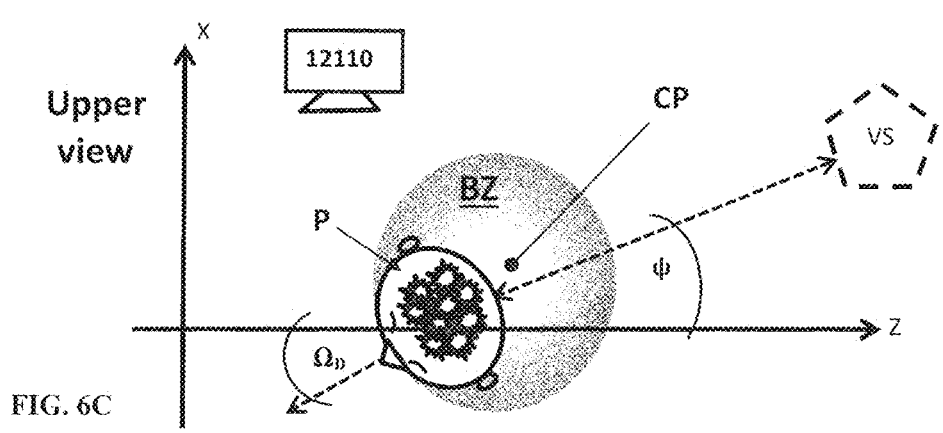

Thus, as described above in the embodiment of FIGS. 4A to 4D and 5A to 5C, the binaural ultrasound fields manager 12400 utilizes methods 11400A and/or 11400B in order to control at least one parameter of the ultrasound channels in order to generate the ultrasound fields (e.g. USF2 and USF1) providing the user P with a binaural 3D audio space by which the user can infer the location of virtual, audio emitting sources, relative to him. Reference is now made to FIGS. 6A to 6C, exemplifying a combined method implemented according to certain embodiments of the present invention for providing the user P with the binaural 3D audio space. According to this technique, the methods 11400A and/or 11400B are used in combination in order to form the binaural 3D audio space.

For instance, as illustrated in FIG. 6A, three ultrasound fields are generated. Two of the ultrasound fields USF1 and USF2 are configured according to the method 11400B (namely being adjusted by the respective left and right US-HRTF and directed/focused at left and right audio center points CP$_L$, CP$_R$ located near the user's ears). Additionally, one or more ultrasound fields, in this case USF, is configured according to method 1400A above and directed to a center point CP aligned along the line connecting the head and the virtual source. In cases of a plurality of virtual source/distinct direction thereof, the left and right ultrasound fields USF1 and USF2, which are configured according to method 11400B, may be modulated by the combination of audio data pieces of the one or more of the plurality of virtual sources, and the additional ultrasound fields USF, which are configured according to method 11400A, may include for example one ultrasound field per each distinct virtual source direction. To this end, according to the combined technique illustrated in FIGS. 6A to 6C, the localized audible sound fields at the user's ears may be produced by a combination of the methods 11400A and 11400B.

In some implementations, the binaural ultrasound field manager 12400 selects which method 11400A or 11400B or combination thereof to use, based on the orientation of the user's head.

For example, as shown in FIG. 6C, in case the orientation of the users head is within a certain solid angle $\Omega_D$, the binaural ultrasound fields manager 12400 is adapted to operate according to method 11400A. For instance, the certain solid angle $\Omega_D$ may be determined/predefined based on the arrangement of ultrasound transducers (e.g. 12110.1 and/or 12110.2), based on the direction $\{\psi,\Theta\}$ of the virtual source relative to the user P, or based on a combination of these parameters. For example, in case the azimuth $\psi$ of virtual source VS is within a certain angular range relative to a symmetry plane of said user's head (e.g. the angular range is defined by the solid angle $\Omega_D$), the binaural ultrasound fields manager 12400 operates according to method 11400A and selects the audio center points to include a single audio center point CP located at this azimuth relative to the head P and within a perimeter region that surrounds the user's head by a distance not exceeding 30 cm from the head. This provides that the audible sound fields generated at center points CP interact with the user's head during its propagation towards the user's left and right ears, and are thereby affected by head related transfer function (HRTF) of the head in a similar manner as sounds arriving from the azimuth of the virtual source VS.

Additionally or alternatively, as shown in FIG. 6B, in case the orientation of the users head is within a certain solid angle $\Omega_R$ the binaural ultrasound fields manager 12400 is adapted to operate according to method 11400B. For instance, the certain solid angle $\Omega_R$ may be determined/predefined based on the arrangement of ultrasound transducers (e.g. 12110.1 and/or 12110.2), based on the direction $\{\psi,\Theta\}$ of the virtual source relative to the user P, or based on a combination of these parameters. For example, in case the azimuth of the virtual source exceeds the angular range/solid angle $\Omega_D$ or in case the azimuth of the virtual source is within the solid angle $\Omega_R$, the binaural ultrasound fields manager 12400 may be adapted to select the audio center points to include at least two left and right audio center point $CP_L$ and $CP_R$ for transmitting at least two respective ultrasound fields USF1 and USF2 towards thereto. The audio center points $CP_L$ and $CP_R$ are typically located at the locations of the respective left and right ears of the user so that the respective ultrasound fields USF1 and USF2 separately produce left and right audible sound fields at the user's ears, via sound from ultrasound effect occurring near the ears. According to method 11400B, binaural ultrasound fields manager utilizes an ultrasound head related transfer function (US-HRTF) for applying spectral adjustment to frequency contents of at least two ultrasound fields, USF1 and USF2, and possibly also time delay and intensity adjustment, such that the left and right audible sound fields are perceived by the user as audible sound arriving from the direction of the virtual source VS.

Optionally, according to some implementations, as shown for example in FIG. 6A, in case the orientation of the user's head is within a certain intermediate solid angle $\Omega_M$ (e.g. being between, or in the overlap of, $\Omega_R$ and $\Omega_D$), the binaural ultrasound fields manager 12400 is adapted to operate according to both methods 11400A and 11400B. For instance, the certain solid angle $\Omega_M$ may be determined/predefined based on the arrangement of ultrasound transducers (e.g. 12110.1 and/or 12110.2), based on the direction $\{\psi,\Theta\}$ of the virtual source relative to the user P, or based on a combination of these parameters. For example, in case the azimuth of the virtual source is within the intermediate solid angle $\Omega_M$ the binaural ultrasound fields manager 12400 may be adapted to select the audio center points to include at least two left and right audio center points $CP_L$ and $CP_R$ near the user's ears, as well as the audio center point CP that is aligned with the direction of the virtual source. Accordingly, respective ultrasound fields USF1, USF2, and USF are transmitted at least towards thereto.

In this regards it should be noted that according to some embodiments of the present invention the above alternatives: (i) projecting the ultrasound fields to the single audio center point located at the orientation of the virtual source relative to the head; and/or (ii) projecting the ultrasound field adjusted by respective US-HRTFs to audio center points $CP_L$ and $CP_R$ at the left and right ears respectively; are used interchangeable as complementary alternatives in case one or more of the audio center points CP and/or $CP_L$ and $CP_R$ are precluded from the ultrasound transducers 12110 (e.g. in case the acoustical propagation path between certain of the audio center points and the transducers is disrupted by objects located in between). For instance in a vehicle setup, if the audio center point CP is behind the head, it is physically inaccessible because of the neck pillow. In that case we'll switch to left/right ear audio center points $CP_L$ and $CP_R$ and use HRTF filter. To this end, in some embodiments the respective solid angles (e.g. $\Omega_R$, $\Omega_D$ and/or $\Omega_M$) may be determined/predefined, a-priori and/or in real time in accordance with the arrangement of objects in the space/environment surrounding the user P (e.g. which arrangement can be determined based on the data from the sensing module(s) SMs).

In this combined technique, the combination of operational modes/methods provides a complete coverage and realistic binaural audible sound to the user, while optimizing the constraints provided by the arrangement of ultrasound transducers 12110, 12110.1 and/or 12110.2 in the space around the user. A smooth and seamless transition between the operational modes of method 11400A and method 11400B can also be achieved by proper adjustment of the intensities of the fields generated by method 11400A and 11400B in accordance with the orientation of the user's head. For instance, the intensity of the ultrasound field USF that is transmitted towards the audio center point CP aligned with the direction of the virtual source VS may be adjusted to be stronger as the user's head orientation approaches the solid angle $\Omega_D$ and weaker as the user's head orientation approaches the solid angle $\Omega_R$. In the same way, the intensities of the ultrasound fields USF1 and USF2 that are transmitted towards the audio center points CPL and CPR near the user's ears, may be adjusted to be weaker as the user's head orientation approaches the solid angle $\Omega_D$ and stronger as the user's head orientation approaches the solid angle $\Omega_R$. This provides a smooth and seamless transition between the operational modes 11400A and 11400B.

Reference is made to 7A to 7C schematically exemplifying how confinement of audible sound is produced from ultrasound fields (e.g. USF, USF1 and USF2 indicated above) by utilizing proper configuration of ultrasound beam constituents for producing each field. This technique, as well as other possible techniques which can be implemented according to the present invention for producing the confined audible sound fields from the sound from ultrasound effect, are disclosed in more detail in PCT patent application publication No. WO 2014/076707. This operation is performed by the ultrasound beam generator module 12510 discussed above with deference to FIG. 3B.

In this example per each ultrasound field, e.g. USF (which may include the sum of signals of one or more ultrasound channels), two primary and secondary audio modulated beams are formed, which are modulated according to the sum of signal of the ultrasound channels composing the desired audio modulated ultrasound field. FIGS. 7A and 7B show the graphs SPL-Audio$^1$($|f_c^1-f_m^1|$) and SPL-Audio$^2$ ($|f_c^2-f_m^2|$) of the spatial profiles of the sound pressure levels (SPLs) produced by two primary and secondary ultrasound beams constituents of the ultrasound field USF. In this particular example, the two SPL profiles, SPL-Audio$^1$($|f_c^1-f_m^1|$) and SPL-Audio$^2$($|f_c^2-f_m^2|$), are the audible waveform produced by demodulation of primary and secondary audio modulated ultrasonic beams of the invention during their interaction with a non-linear medium, such as air. However, alternatively, or additionally, the ultrasound field USF may include ultrasonic beams desired to properly interfere already before undergoing audible sound from ultrasound demodulation in the air, such that confined audible field is generated at the desired location. FIG. 7C is a graph illustrating the effective audible SPL profile SPL-Audio$^{total}$ resulting from the superposition (e.g. interference) of the primary and secondary audible SPL profiles, SPL-Audio$^1$ ($|f_c^1-f_m^1|$) and SPL-Audio$^2$($|f_c^2-f_m^2|$) in the medium/air. The primary ultrasound beam is focused at audio center point CP (marked $Z_0$ in the figure) at which audible sound should be actually produced by the ultrasound field USF and the secondary beam is focused at a somewhat different location $Z_0+\delta$ at which audible sound should be preferably diminished. The primary and secondary audible waveforms indicated by the profiles SPL-Audio$^1$($|f_c^1-f_m^1|$) and SPL-Audio$^2$($|f_c^2-f_m^2|$) are produced with respectively different (typically opposite) phases. The phases of the primary and secondary beams (e.g. and/or the required difference between them) is adjusted to provide a desired interference pattern, so that the effective audible SPL profile SPL-Audio$^{total}$, resulting from superposition of the primary and secondary beams, is confined as shown in the effective audible SPL profile SPL-Audio$^{total}$.

Reference is now made to FIGS. 7D and 7E schematically illustrating an amplitude modulation (AM) scheme, which may be carried out by the US channel generator 410 for producing ultrasound channels audio, modulated with the desired audible data piece associated with the virtual source of the channel. In this example, the ultrasound channel data includes the spectral information of the primary and secondary beams described above with reference to FIGS. 7A to 7C. Specifically, here sound data of the audio data piece associated with the virtual source is provided. In this example audible sound is to be produced with frequency $f_s$. For clarity of explanation, in the present example the audible frequency $f_s$ is represented as a discrete single tone sound. It should, however, be understood, that the sound data may typically include a superposition of a plurality of frequencies/single-tones. In the example of FIG. 7D the primary and secondary audio modulated beams are produced by utilizing a single-side-band (SSB) AM modulation scheme. Specifically, here a common carrier frequency $f_c$ is used for the primary and secondary audio modulated beams. One of the primary and secondary audio modulated beams (in this example, the primary) utilizes the upper-side-band (USB)—SSB-AM modulation and the other one (in this example, the secondary) utilizes the lower-side-band (LSB)—SSB-AM modulation. Utilizing the USB AM modulation, the modulation frequency $f_m^1$ of the primary audio modulated beam in this case equals the sum of the carrier and audible sound frequency $f_m^1=(f_c+f_s)$ while the modulation frequency $f_m^2$ of the secondary audio modulated beam equals the difference between the carrier and audible sound frequency $f_m^2=(f_c-f_s)$ (or vice-versa in other embodiments). Alternatively or additionally, in the example of FIG. 7E two different carrier frequencies, $f_c^1$ and $f_c^2$ are used for the primary and secondary audio modulated beams A difference between those carrier frequencies is sufficient such that a non-linear interaction between them provides sound in the ultrasonic regime, and not in the audible regime; namely $|f_c^1-f_c^2|\gg\Delta f$ where $\Delta f$ is at the upper bound of the audible frequency range or above (e.g. $\Delta f>20$ KHz). Here each one of the primary and secondary audio modulated beams is associated with a respective one of the carrier frequencies $f_c^1$ and $f_c^2$, and suitable AM modulation technique may be used in order to produce/determine the desired frequency content for the primary and secondary audio modulated beams with audible frequency(ies) $f_s$. For example, a double side band (DSB) AM modulation can be used as well as SSB-AM modulation (being USB, LSB or both). In the present example, SSB-USB AM modulation is used for the primary audio-modulated beam with modulation frequency $f_m^1=(f_c^1+f_s)$ and DSB AM modulation is used for the secondary audio-modulated beam with modulation frequencies $f_m^2=(f_c^2-f_s)$ and $f_m^2=(f_c^2+f_s)$.

Figure 8:
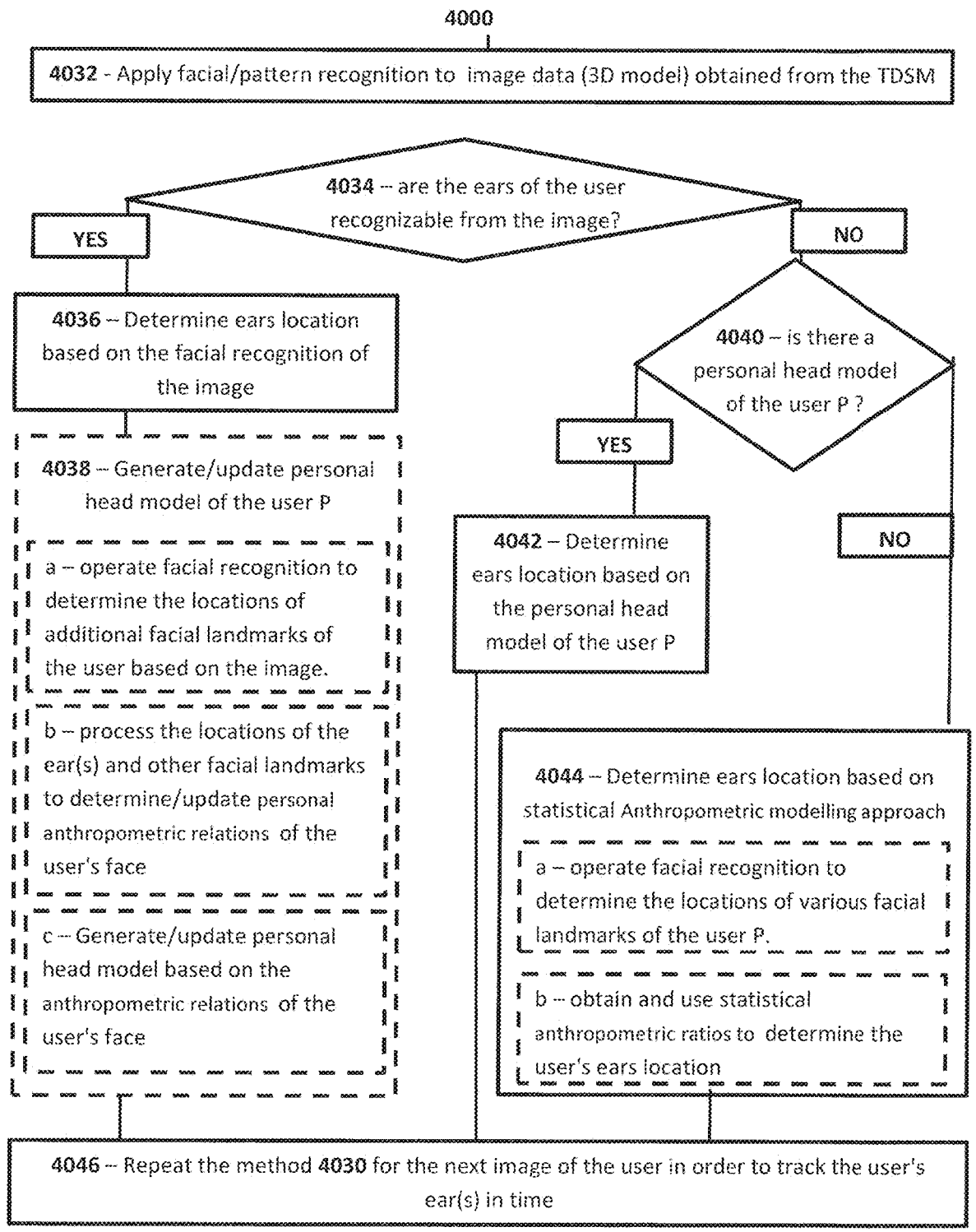
FIG. 8 is a flow chart schematically illustrating a method for estimating the locations of the user's left and right ears according to certain embodiments of the present invention.

FIG. 8 is a flow chart showing in more details the method for determining the location of the user's P ears according to an embodiment of the present invention. This method may be the a method for implementing operation 4030 of method 4000. In some embodiments of the present invention the face recognition module 530 or the ears positioning module 330 is configured and operable for carrying/implementing method 4030 to spatially locate and track the location(s) of the user's ear(s), while optionally by utilizing pattern recognition capabilities of the pattern recognition engine 515.

In operation 4032 the face recognition module 530 or the ears positioning module 330 operates to apply facial/pattern recognition to the sensory data obtained from the TDSM (e.g. to the image data or the 3D model, and/or the composite image and/or the 3D image, obtained from the TDSM or SM). To this end, facial recognition may be implemented according to any known in the art technique.

In operation 4034 the face recognition module 530 or the ears positioning module 330 determines whether based on the facial recognition, the ears of the user P can be recognized in the image. In case the ears of the user P are recognizable in the image, the face recognition module 530 or the ears positioning module 330 continues to operation 4036 where it determines ears location in the space covered by the TDSM based on the their location in the image. More specifically, in this case based on 3D data from the TDSM' image/model, the face recognition module 530 or the ears positioning module 330 determines the 3D position of the ear(s) in the sensing volume covered by the TDSM.

Optionally, in case the ears of the user P are recognizable in the image, the face recognition module 530 or the ears positioning module 330 proceeds to carry out operation 4038 for generating/updating a personal head model of the user P. For instance, in operation 4038 the face recognition module 530 or the ears positioning module 330 may determine/estimate the facial model of the user P based on the image by carrying out steps a, b and c as follows:

(a) operate facial recognition scheme/process to determine the locations of additional facial landmarks (e.g. other than the ears) in the user's face. For example, determining the locations of the nose bridge and the eyes and the distances between them.

(b) process the locations of the ear(s) and the locations of the additional facial landmarks in the user's P to obtain an estimate of certain personal anthropometric relations of the user's face. Accordingly a personal head model including for example certain predetermined anthropometric relations of the user's face which associate the location of the user's ears to other facial landmarks is determined.

(c) generate/update personal head model based on the anthropometric relations of the user's face as obtained for the current image of the user's face. In this regards it should be noted that the face recognition module may include or be associated with facial data reference data-storage (not specifically shown) which is configured and operable for storing personal head models of users. The users for which facial models are stored may include be registered users (e.g. regular users which are known/registered in the system) and for which facial model data may be stored permanently. Optionally the facial reference data-storage also stores facial models of transient users (not registered in the system), for at least as long as such users are engaged with a communication session and/or as long as such users are within the spaces covered by the TDSMs or SM of the system (e.g. the facial models for transient users may be deleted when the users leave the spaces covered by the system and/or when after their communication sessions terminate). Accordingly, before storing the personal head model determines in (b) the face recognition module 530 or the ears positioning module 330 first checks to see if a matching model already exist in the facial reference data storage. If not the model is stored as a new model. However if the matching model already exists, the existing model is updated based on the data obtained from the present image, namely based on the newly estimated model. In order to improve the accuracy of the stored personal head model of the user P during time, the updating may be performed while utilizing certain filtering schemes such as Kalman filter and/or PID filter, which allow the data obtained from plurality of measurements (e.g. from the plurality of images of the user) to be converged to form higher accuracy models.

It should be noted that operation 4038 is optional, and may be carried out in order to complete/update the head model based on the location of the ears and other facial landmarks in the image.

In case operation 4034 finds that the ears of the user P cannot be recognized in the image, the continues to operation 4040, where it determines whether the facial data reference data-storage of the face recognition module 530 or the ears positioning module 330 already stores a personal head model of the user's P face.

In case the reference data-storage has a personal head model of the user P, the face recognition module 530 or the ears positioning module 330 proceeds to carry out operation 4042 to determine the location of the ear(s) of the user P in the space, based on the personal head model of the user P and the location in the space of other facial landmarks identified in the image of the user obtained from the TDSM or SM.

Otherwise, in case the reference data-storage does not include personal head model of the user P, the face recognition module 530 or the ears positioning module 330 proceeds to carry out operation 4044 where it determines the location of the ear(s) of the user P in the space, based on a statistical anthropometric modelling approach. More specifically in this case the face recognition module 530 or the ears positioning module 330 determines the locations of one or more facial landmarks of the user in the space monitored by the TDSMs (e.g. by processing the TDSM's image), and utilizes one or more statistically stable anthropometric relations between the location of the ears of users relative to the locations of other facial landmarks on order to obtain an estimate of the location of the user's P ears. To this end, in 4044, the detected facial landmarks in the image and corresponding anthropometric data is essentially used in 4044 to deduce the location of the ears.

Additionally, in 4044 the personal head model may be constructed or further updated based for example on the facial landmarks of eyes, nose etc. of the user. Accordingly the head model is further updated as additional images of the user P are obtained and processed (see operation 4046). In this regards, even if in the ears are not visible in the image, the model may be updated by adjusting the locations of the facial landmarks of the model in accordance with the detected locations of the corresponding facial landmarks in the current image.

In this regards, the statistical anthropometric modelling approach implemented by the face recognition module 530 or the ears positioning module 330 of the present invention may include one or more of the following:

(a) An average face proportions approach. This is a simplified approach based on the fact that a typical/average human face typically follow certain proportion relations such as those described for example in http://dhs.dearbornschools.org/wp-content/uploads/sites/625/2014/03/facial-proportions-worksheet.pdf. To this end, in some embodiments the face recognition module 530 or the ears positioning module 330 utilizes the fact that the inter-pupillary-distance (IPD) is on average about ⅗ of the head width. Accordingly, by applying facial recognition to determine the locations in the TDSM or SM images of the facial landmarks corresponding to the user's pupils, the head dimensions and accordingly the ears positions can be estimated.

(b) Anthropometric modelling approach—This approach is based on available anthropometric statistical data obtained from measurements of plurality of users. To this end, in some embodiments the face recognition module 530 utilizes statistical anthropometric databases, such as available at https://www.facebase.org/facial_norms/ to derive empirical multi-variate functional relations between ears position of a user and various facial landmarks. This approach is sensitive to subtle relations in human subgroups and can account for instance for the combined effect of various parameters, such as wide nose with circular face etc. Accordingly, using the visible facial land marks in the image of the user P, the face recognition module 530 or the ears positioning module 330 can determine their shape (e.g. wide nose) and accordingly classify the user to a certain subgroup of humans such as Asian, Caucasian or others, Then, based on the classified subgroup, the face recognition module 530 or the ears positioning module 330 obtains the relevant accurate anthropometric relations for the user P.

Accordingly, as indicated in operation 4046, the face recognition module 530 or the ears positioning module 330 repeats the method 4000 per each image obtained from the TDSM(s) or SM(s) which includes the user P. Accordingly, typically after one or more images are captured, typically the ears of the user are reveled and personal head model of the user P is constructed (e.g. from scratch even if such model was not apriority included in the facial reference database. More specifically, in many cases the ears are exposed and visible to the camera, especially when following the head movement over time, when the user naturally turns the head. Direct detection of ears position is thus available and the personal anthropometric relations between facial landmarks and ears position, for the specific user P can be determined accurately.

Thus during the repeated analysis of images of the user's face, method 4000 provides for further updating such personal head model of the user to improve its accuracy. In other words, as more information and statistics is accumulated over time a more accurate and stable estimates personal head model of the user P is obtained. Accordingly, in some embodiments of the present invention method 4000 is implemented and used for locating and tracking the ears of the user of interest P thereby enabling to employ the method 1400B for producing/projecting binaural audible sound to the user's ears. In turn the output sound generator module 600 generates the confined/private audible sound field near the user ears, and thereby efficiently transmits audible sound to the user P.

To this end, the acoustic signal forms a localized audible sound field defining a private zone confined to the vicinity of the region between the designated location $Z_0$ and the acoustic transducer system 10. The area includes one or more bright zone regions where clearly audible and comprehendible audible sound is produced. Outside of the bright zone BZ a dark zone region is defined in which the sound is either not audible to the human ear, or its content cannot be clearly comprehended.

The invention claimed is:

1. A method for producing virtual binaural audio space, the method comprising:
   (a) providing staged audio data indicative of at least one audio data piece and a position of a virtual source of said audio data piece relative to a listener;
   (b) monitoring a user's head position to determine head positioning data indicative of location and orientation of a user's head, whereby the user is designated to be said listener of the audio data;
   (c) transmitting one or more ultrasound fields towards a one or more selected audio center points located in the vicinity of the user's head within a perimeter region surrounding the user's head for producing, via sound from ultrasound effect, left and right audible sound fields with said at least one audio data piece at respective left and right ears of said user; and
   wherein the method comprising:
   (d) determining at least one of azimuth and elevation of the virtual source relative to the user's head based on said position of the virtual source and said head positioning data;
   (e) adjusting locations of said one or more selected audio center points within said perimeter region in accordance with said at least one of the azimuth and elevation of the virtual source relative to the user's head;
   thereby controlling at least one parameter of said one or more ultrasound fields transmitted towards the one or more selected audio center points such that a difference between said respective left and right audible sound fields is perceived by the user as an audible sound field propagating to said user from said position of the virtual source and carrying said at least one audio data piece.

2. The method of claim 1, wherein said one or more ultrasound fields are produced by one or more transducer systems; wherein said head positioning data is further indicative of an orientation of the user's head; and wherein said head positioning is processed to determine one or more relative locations and orientations of the user's head with respect to said one or more transducer systems, to select at least one of said transducer systems for projecting said one or more ultrasound fields to said one or more selected audio centers.

3. The method of claim 1, wherein; said one or more selected audio center points comprise a single audio center point located within the perimeter region surrounding said user's head by a distance not exceeding 30 centimeters from the head; and wherein said controlling of the at least one parameter of said ultrasound fields comprises utilizing at least one of the azimuth and elevation of the virtual source relative to the user's head to determine a position of said single audio center point within said perimeter region such that acoustic interactions of said left and right audible sound fields with the user's head mimics a head related transfer function (HRTF) of said head from the position of the virtual source.

4. The method of claim 3, wherein a nominal azimuth and nominal elevation of said single audio center point relative to said user's head matches said azimuth and elevation of the virtual source relative to the user's head; and wherein said position of the single audio center point is maintained fixed under changes in an orientation of said user's head to thereby provide that said virtual source is perceived by the user to be at a fixed position relative to the user.

5. The method of claim 1, wherein said controlling of the at least one parameter of said ultrasound fields further comprises:
   in case the azimuth of said virtual source is within a certain angular range of relative to a symmetry plane of said user's head, selecting said one or more audio center points to includes a certain audio center point located at said azimuth relative to the head and within a perimeter region that surrounds said user's head by a distance not exceeding 30 centimeters from the head, such that interaction of said left and right audible sound fields with the user's head during their propagation from said certain audio center point towards the left and right ears of the user respectively mimics a head related transfer function (HRTF) effect of the head on sounds arriving the azimuth of the virtual source; and
   in case the azimuth of said virtual source exceeds said certain angular range, the method includes selecting said one or more audio center points to include at least two audio center points within said perimeter, and transmitting at least two ultrasound fields towards said at least two audio center points for separately producing said left and right audible sound fields.

6. The method of claim 1, wherein said one or more ultrasound fields comprise left and right ultrasound fields transmitted towards respective left and right audio center points located in the vicinity of said user's left and right ears, for separately producing said left and right audible sound fields at said user's left and right ears.

7. The method of claim 6 wherein said head positioning is processed to determine one or more relative locations and orientations of the user's head with respect to said one or more transducer systems, to select at least one of said transducer systems for use as a left transducer system for projecting sound field to a left ear of the user, and selecting at least one of said transducer systems as a right transducer system for projecting sound field to a right ear of the user, said selected left and right transducer systems being the same or different transducer systems from said one or more transducer systems.

8. The method of claim 6, wherein said controlling of the at least one parameter of said ultrasound fields further comprises at least one of the following:
adjusting the intensities of said one or more ultrasound fields such that said audible sound fields are above auditory level only within a maximal radius not exceeding a range of 25-50 CM from said left and right audio center points, thereby providing private virtual binaural audio space to said user;
adjusting a time delay between the left and right ultrasound fields in accordance with a difference between a distance of said virtual source to said left and right ears, respectively; and
utilizing a head related transfer function (HRTF) for applying spectral adjustment to frequency contents of said left and right ultrasound fields, respectively, in accordance with a position of said virtual source relative to said user's head.

9. The method of claim 6, wherein said controlling of the at least one parameter of said left and right ultrasound fields comprises utilizing at least one of said azimuth and elevation of the virtual source relative to the user's head to shift said left and right audio center points, respectively, relative to left and right locations of the left and right ears of the user such that acoustic interactions of said left and right audible sound fields with the user's head at least partially mimics a head related transfer function (HRTF) of said head from the position of the virtual source.

10. The method of claim 9, wherein intensities of said left and right ultrasound fields are selected such that said respective left and right audible sound fields are above auditory level within a radius R not exceeding a range of 50 cm from said left and right audio center points, respectively, and wherein the shifted left and right audio center points are spaced from left and right locations of the left and right ears, respectively, by a distance not exceeding said radius R.

11. The method of claim 1, wherein said one or more transducer systems are phased array ultrasound transducers, and wherein the method further comprises carrying out the following per each ultrasound field of said one or more ultrasound fields which is to be generated at a respective audio center point:
assigning an ultrasound transducer system of said one or more transducer systems to said ultrasound field, based on locations of said one or more transducers systems relative to the audio center point of said ultrasound field and based on the location of the head;
processing said at least one audio data piece based on the relative position between the assigned transducer system and the audio center point of said ultrasound field for generating a corresponding transducer channel adapted for operating the assigned transducer system, for generating the respective ultrasound field such that frequency contents of the ultrasound field generates the respective audible sound field with said at least one audio data piece via sound from ultrasound;
applying beam forming to transducer channel to produce beam-formed channel for operating phase arrays of assigned transducers to generate a respective ultrasound beams directed to the audio center point of said ultrasound field.

12. The method of claim 11, wherein:
said generating of the corresponding transducer channel comprises utilizing the audio data piece for determining frequency content of one or more ultrasound beams to be transmitted by the assigned transducer system towards said audio center point, wherein at least one of said ultrasound beams is an audio modulated ultrasound beam, whose frequency contents include at least two ultrasonic frequency components selected to produce said audible sound after undergoing non-linear interaction in a non-linear medium; and
said beam forming of the transducer channel comprises:
determining one or more distinct respective focal points for one or more ultrasound beams; and
processing the frequency content of the one or more ultrasound beams to form a beam-formed ultrasound channel comprising a set of phase shifted signals adapted for actuating elements of the respective phased array ultrasound transducers for generation of said one or more ultrasound beams focused on said distinct focal points.

13. An alerting method for use in producing audible alerts to a vehicle driver, the alerting method comprising: monitoring a vehicle environment and upon identifying at least one hazard/event, carrying out the method of claim 1, comprising generating said staged audio data such that said at least one audio data piece is indicative of said at least one identified hazard/event and said position of the virtual source corresponds to a position of said identified at least one hazard/event relative to a driver location in the vehicle.

14. A system for producing virtual binaural audio space, the system comprising:
(a) an audio session manager configured and operable to provide staged audio data indicative of at least one audio data piece and a position of a virtual source of said audio data piece relative to a listener;
(b) a head positioning module configured and operable to monitor user's head position to determine head positioning data indicative of location and orientation of a user's head, whereby the user is designated to be said listener of the audio data;
(c) a binaural ultrasound fields manager configured and operable for determining at least one of azimuth and elevation of the virtual source relative to the user's head generating signals of one or more ultrasound channels signals to be provided to one or more ultrasound transducers for transmitting one or more respective ultrasound fields towards one or more audio center points in the vicinity of the user's head within a perimeter region surrounding the user's head, to thereby produce, via sound from ultrasound effect, audible sound fields at said audio center points carrying said at least one audio data piece points and propagating from said audio center points towards left and right ears of said user to affect left and right audible sound fields perceived by said left and right ears of said user; and
(d) an output sound from ultrasound generator module configured and operable to process the one or more ultrasound channels for generating beam formed ultrasound channels for operating said transducers to transmit one or more ultrasound fields towards the one or more selected audio center points
wherein said binaural ultrasound fields manager is configured and operable for carrying out the following:
determine at least one of azimuth and elevation of the virtual source relative to the user's head based on said position of the virtual source and said head positioning data; and adjust locations of said one or more selected audio center points within said perimeter region in accordance with said at least one of the azimuth and elevation of the virtual source relative to the user's head;

thereby controlling at least one parameter of the ultrasound fields transmitted towards one or more audio center points such that a difference between said respective left and right audible sound fields is perceived by the user as an audible sound field propagating to said user from the direction of the virtual source and carrying said at least one audio data piece.

15. The system of claim 14, wherein said head positioning module is connectable to one or more sensing modules for receiving therefrom sensing data indicative of said user; and wherein the head detection module determining of the head positioning data comprises a pattern recognition system adapted to process said sensing data to detect said user's head and determine the location and orientation of the user's head relative to said one or more ultrasound transducer systems.

16. The system of claim 14, wherein; said binaural ultrasound fields manager utilizes the azimuth and elevation of the virtual source relative to select said one or more selected audio center points and control their locations such that:
   (a) the one or more selected audio center points are located within said perimeter region surrounding said user's head by a distance not exceeding 30 cm from the head; and
   (b) wherein respective locations of the audio center points within said perimeter region are adjusted such that audible sound fields, generated via sound from ultrasound effect at said audio center points, undergo acoustic interactions with the user's head to from said left and right audible sound fields at the user's ears, whereby said acoustic interaction mimics a head related transfer function (HRTF) applied by the user's head to sounds arriving thereto from the direction of the virtual source.

17. The system of claim 16 wherein said binaural ultrasound fields manager selects said audio center points to include a single audio center point located within said perimeter region at a nominal azimuth and elevation matching the azimuth and elevation of the virtual source relative to the head.

18. The system of claim 17 wherein said binaural ultrasound fields manager maintains the position of the single audio center point fixed under changes in an orientation of said user's head to thereby provide that said virtual source is perceived by the user to be at a fixed position relative to the user.

19. The system of claim 14 wherein:
   in case the azimuth of said virtual source is within a certain angular range of relative to a symmetry plane of said user's head, said binaural ultrasound fields manager selects said audio center points to include a certain audio center point located at said azimuth relative to the head and within a perimeter region that surrounding said user's head by a distance not exceeding 30 cm from the head, such that interaction of said left and right audible sound fields with the user's head during their propagation from said certain audio center point towards the left and right ears of the user respectively mimics a head related transfer function (HRTF) effect of the head on sounds arriving from the azimuth of the virtual source; and
   in case the azimuth of said virtual source exceeds said angular range, the binaural ultrasound fields manager selects said audio center points to include at least two audio center point within said perimeter for respectively transmitting at least two ultrasound fields towards said at least two audio center point to separately produce said left and right audible sound fields, via sound from ultrasound effect occurring at the at least two audio center points; and said binaural ultrasound fields manager utilizing an ultrasound head related transfer function (US-HRTF) for applying spectral adjustment to frequency contents of at least two ultrasound fields such that the left and right audible sound fields are perceived by the user as audible sound arriving from the direction of the virtual source.

20. The system of claim 14, wherein said binaural ultrasound fields manager selects said audio center points to include at least left audio center point in the vicinity of said user's left and right ears, for respectively transmitting at least two ultrasound fields towards said at least left and right audio center points to separately produce said left and right audible sound fields, via sound from ultrasound effect occurring at the left and right audio center points; and wherein said binaural ultrasound fields manager controlling said at least one parameter of said transducer channels' signals comprises utilizing an ultrasound head related transfer function (US-HRTF) m accordance with a direction of said virtual source relative to said user's head, thereby applying spectral adjustment to frequency contents of at least two ultrasound fields, such that the left and right audible sound fields are perceived by the user as audible sound arriving from the direction of the virtual source.

21. The system of claim 14, comprising a transducer selector module configured and operable for processing the head positioning data to determine one or more relative locations and orientations of the user's head with respect to said one or more transducer systems, and thereby selecting one or more selected transducer systems of said one or more transducer systems for projecting said ultrasound fields to said audio center points.

22. The system of claim 14, wherein said binaural ultrasound fields manager is configured and operable to further control the at least one parameter of the ultrasound fields by carrying out at least one of the following:
   adjusting intensities of said one or more ultrasound fields such that said audible sound fields generated therefrom are above auditory level only within a maximal radius not exceeding a range of 25-50 CM from said audio center points, thereby providing private virtual binaural audio space to said user;
   processing the at least one audio data piece based to generate one or more ultrasound channels each comprising signals for generating an ultrasound field whereby a frequency content of the ultrasound field is adapted for generating a respective audible sound field corresponding to said at least one audio data piece via sound from ultrasound effect:
   adjusting a time delay between the ultrasound channels in accordance with the position of said virtual source relative to the head;
   utilizing an ultrasound head related transfer function (US-HRTF) for applying spectral adjustment to frequency content of the ultrasound channels, respectively, whereby said US-HRTF is tuned in accordance with a position of said virtual source relative to said user's head;
   utilizing azimuth and elevation data of the virtual source relative to the user's head to set said one or more of the audio center points, relative to locations of left and right ears of the user, such that acoustic interactions of said left and right audible sound fields with the user's head at least partially mimics a head related transfer function (HRTF) of said head from the position of the virtual source.

23. The system of claim 14, comprising a localized sound from US beam generator adapted for processing each ultrasound channel of the ultrasound channels to generate data indicative of one or more of ultrasound beams to be transmitted by one or more of the transducer systems towards the audio center point corresponding to the ultrasound channels, wherein at least one of said ultrasound beams is an audio modulated ultrasound beam, whose frequency content includes at least two ultrasonic frequency components selected to produce said audible sound after undergoing non-linear interaction in a non-linear medium, and determining one or more distinct respective focal points for said one or more ultrasound beams in the vicinity of said audio center point for causing destructive interference between said one or more beams at one or more regions surrounding said audio center point to thereby form confined localized audible sound field in the vicinity of said audio center point.

24. The system of claim 14, wherein said one or more transducer systems are phased array ultrasound transducers, and wherein the system comprises a beam forming module adapted for processing the data indicative of one or more of ultrasound beams to generate a beam-formed ultrasound channel comprising a set of phase shifted signals adapted for actuating elements of the phased array ultrasound transducers for generating said one or more ultrasound beams focused on said distinct focal points.

25. An alerting system comprising the system for producing virtual binaural audio space according to claim 14, and a hazard notification monitor configured and operable for monitoring a vehicle environment and upon identifying at least one event of interest (e.g. hazard) in the vehicle environment, generating said staged audio data such that said at least one audio data piece is indicative of said at least one identified event of interest and said position of the virtual source corresponds to a position of said identified at least one event of interest relative to a driver location in the vehicle.

* * * * *